United States Patent
Bao et al.

(10) Patent No.: US 12,260,585 B2
(45) Date of Patent: Mar. 25, 2025

(54) SYSTEMS AND METHODS FOR VISUAL POSITIONING

(71) Applicant: BEIJING DIDI INFINITY TECHNOLOGY AND DEVELOPMENT CO., LTD., Beijing (CN)

(72) Inventors: Ling Bao, Beijing (CN); Bin Xu, Beijing (CN); Xiance Du, Beijing (CN); Jun Zhang, Beijing (CN); Xiaoqiang Teng, Beijing (CN); Zhiwei Ruan, Beijing (CN); Huanqing Zhou, Beijing (CN); Pengfei Xu, Beijing (CN); Ronghao Li, Beijing (CN); Runbo Hu, Beijing (CN); Hua Chai, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 376 days.

(21) Appl. No.: 17/807,719

(22) Filed: Jun. 18, 2022

(65) Prior Publication Data
US 2022/0319046 A1    Oct. 6, 2022

Related U.S. Application Data

(63) Continuation of application No. PCT/CN2020/137132, filed on Dec. 17, 2020.

(30) Foreign Application Priority Data

Dec. 18, 2019 (CN) .......................... 201911309118.1
Dec. 18, 2019 (CN) .......................... 201911310236.4
Dec. 18, 2019 (CN) .......................... 201911310246.8

(51) Int. Cl.
*G06T 7/73* (2017.01)
*G01S 17/89* (2020.01)
(Continued)

(52) U.S. Cl.
CPC ................ *G06T 7/74* (2017.01); *G01S 17/89* (2013.01); *G06T 7/10* (2017.01); *G06V 10/22* (2022.01);
(Continued)

(58) Field of Classification Search
None
See application file for complete search history.

(56) References Cited

U.S. PATENT DOCUMENTS

| 11,886,189 B2 * | 1/2024 | Karachalios ......... G06V 20/176 |
| 2002/0136458 A1 | 9/2002 | Nagasaka et al. |

(Continued)

FOREIGN PATENT DOCUMENTS

| CN | 102521817 A | 6/2012 |
| CN | 102629297 A | 8/2012 |

(Continued)

OTHER PUBLICATIONS

Bian, Xianzhang et al., Semantic Segmentation Based Alignment of Augmented Reality Images, Electronic Technology & Software Engineering, 2018, 5 pages.

(Continued)

*Primary Examiner* — Jiangeng Sun
(74) *Attorney, Agent, or Firm* — METIS IP LLC

(57) ABSTRACT

The embodiments of the present disclosure provide a visual positioning method, the method may include obtaining a positioning image collected by an imaging device; obtaining a three-dimensional (3D) point cloud map associated with an area where the imaging device is located; determining a target area associated with the positioning image from the 3D point cloud map based on the positioning image; and (Continued)

determining positioning information of the imaging device based on the positioning image and the target area.

17 Claims, 24 Drawing Sheets

(51) Int. Cl.
    *G06T 7/10*     (2017.01)
    *G06V 10/22*     (2022.01)
    *G06V 10/52*     (2022.01)
    *G06V 10/74*     (2022.01)
    *G06V 10/774*     (2022.01)
    *G06V 10/82*     (2022.01)
    *G06V 20/70*     (2022.01)

(52) U.S. Cl.
    CPC ............ *G06V 10/52* (2022.01); *G06V 10/761* (2022.01); *G06V 10/774* (2022.01); *G06V 10/82* (2022.01); *G06V 20/70* (2022.01); *G06T 2207/10028* (2013.01); *G06T 2207/20021* (2013.01); *G06T 2207/20081* (2013.01); *G06T 2207/20084* (2013.01); *G06T 2207/30242* (2013.01); *G06T 2207/30244* (2013.01)

(56) References Cited

U.S. PATENT DOCUMENTS

| | | | |
|---|---|---|---|
| 2007/0209003 A1 | 9/2007 | Obana et al. | |
| 2015/0172626 A1 | 6/2015 | Martini | |
| 2018/0211399 A1 | 7/2018 | Lee et al. | |
| 2018/0224863 A1* | 8/2018 | Fu ..................... | G01C 21/3848 |
| 2019/0026948 A1 | 1/2019 | Kellogg et al. | |
| 2019/0235062 A1* | 8/2019 | Zeng ..................... | G01S 7/4972 |
| 2019/0323843 A1* | 10/2019 | Yu ........................... | G01S 17/89 |
| 2020/0327692 A1 | 10/2020 | Lin et al. | |
| 2020/0372711 A1* | 11/2020 | Wu ........................ | G06V 20/20 |
| 2021/0044933 A1 | 2/2021 | Ding et al. | |

FOREIGN PATENT DOCUMENTS

| | | | | |
|---|---|---|---|---|
| CN | 102968766 | A | 3/2013 | |
| CN | 106023086 | A | 10/2016 | |
| CN | 106203244 | A | 12/2016 | |
| CN | 106940186 | A | 7/2017 | |
| CN | 107742311 | A | 2/2018 | |
| CN | 107796397 | A | 3/2018 | |
| CN | 108401461 | | 8/2018 | |
| CN | 108415032 | A | 8/2018 | |
| CN | 108537287 | A | 9/2018 | |
| CN | 108550190 | A | 9/2018 | |
| CN | 108682036 | A | 10/2018 | |
| CN | 108932475 | | 12/2018 | |
| CN | 109192054 | A | 1/2019 | |
| CN | 109544447 | A | 3/2019 | |
| CN | 109658445 | A | 4/2019 | |
| CN | 109801220 | A | 5/2019 | |
| CN | 109993793 | | 7/2019 | |
| CN | 110032965 | A | 7/2019 | |
| CN | 110472623 | A | 11/2019 | |
| CN | 110568447 | A | 12/2019 | |
| CN | 107742311 | B | * 2/2020 | ............... G06T 7/73 |
| CN | 111862204 | A | 10/2020 | |
| CN | 111862205 | A | 10/2020 | |
| CN | 111862337 | A | 10/2020 | |
| JP | 2007316812 | A | 12/2007 | |
| JP | 2011093199 | A | 5/2011 | |
| JP | 2013058060 | A | 3/2013 | |
| WO | 2017219391 | A1 | 12/2017 | |
| WO | 2018119889 | | 7/2018 | |
| WO | 2019153245 | A1 | 8/2019 | |
| WO | 2019157925 | | 8/2019 | |

OTHER PUBLICATIONS

Xu, Xiaosu et al., Visual-aid inertial SLAM method based on graph optimization in indoor, Journal of Chinese Inertial Technology, 25(3): 313-319, 2017.
International Search Report in PCT/CN2020/137132 mailed on Mar. 16, 2021, 10 pages.
Written Opinion in PCT/CN2020/137132 mailed on Mar. 16, 2021, 12 pages.
Wei, Yufeng et al., Visual Identification and Location Algorithm for Robot Based on the Multimodal Information, Opto-Electronic Engineering, 45(2): 170650-1-170650-12, 2018.
Ai, Qing-Lin et al., Three Dimensional Image Stiching Method of Robot Binocular Vision Based on Double Registration, Journal of Mechanical & Electrical Engineering, 35(10): 1110-1115, 2018.
Qi, Shaohua et al., Construction of Semantic Mapping in Dynamic Environments, Computer Science, 47(9): 198-203, 2020.
Yao, Hongyuan et al., UAV Remote Sensing image stitching Method based on improved SURF algorithm, Journal of Naval Aeronautical and Astronautical University, 2018, 7 pages.
Wang, Lina et al., Robust Perceptual Image Hash Using Gabor Filters, 2009 International Conference on Multimedia Information Networking and Security, IEEE, 2009, 4 pages.

* cited by examiner

200

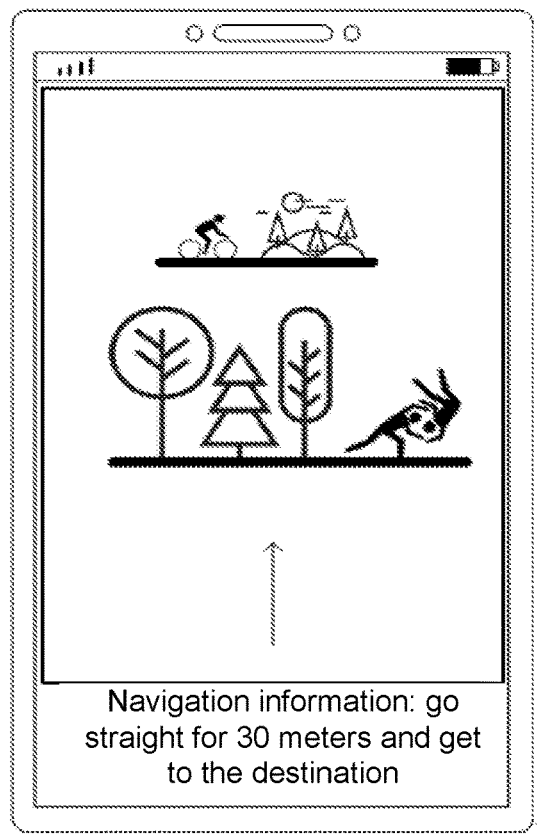

FIG. 27

S2310 obtaining a plurality of blocks by performing an image division on a visual positioning image, the plurality of blocks having an overlapping area, wherein there is an overlapping area between each two adjacent blocks — S2311

Obtaining a feature point set corresponding to each of the plurality of blocks by performing a visual feature extraction on the plurality of blocks — S2320

Combining the feature points with the same coordinate parameters, and determining a total feature point set corresponding to the visual positioning image according to the plurality of feature point set corresponding to the plurality of blocks — S2330

FIG. 28

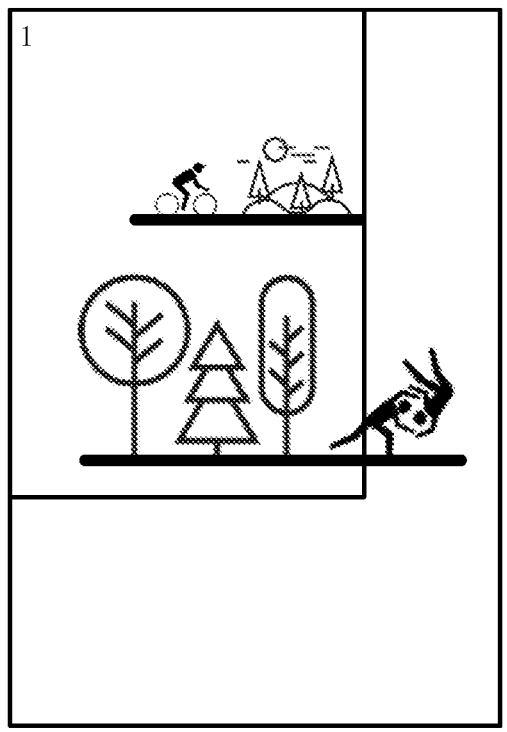
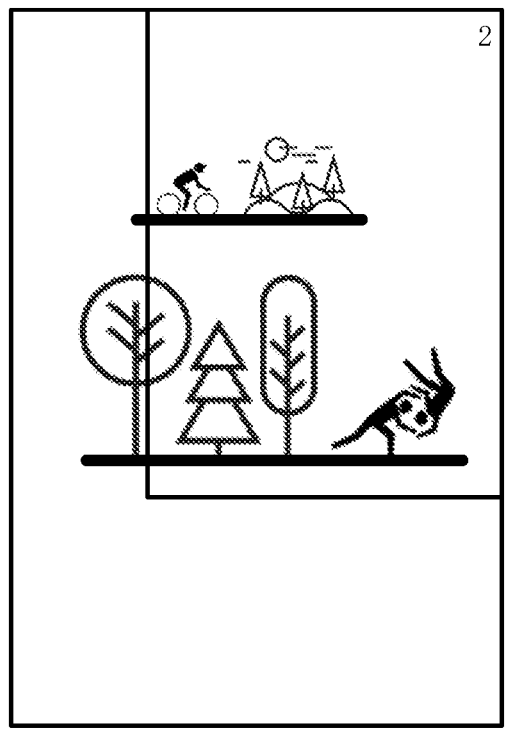
1
2
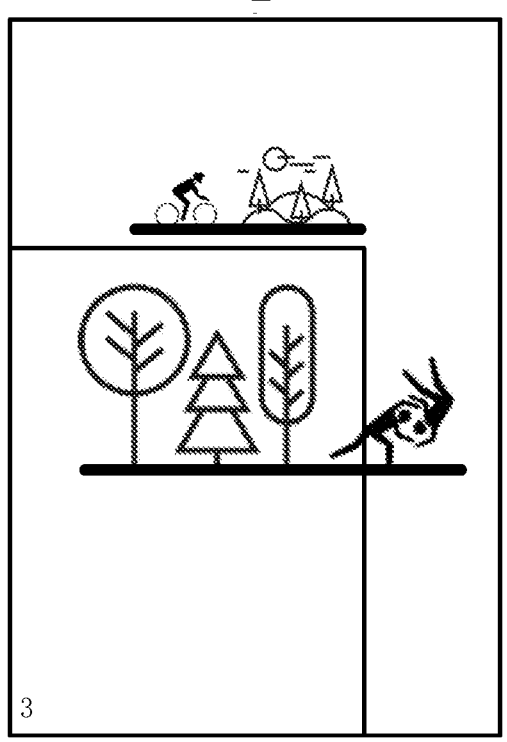
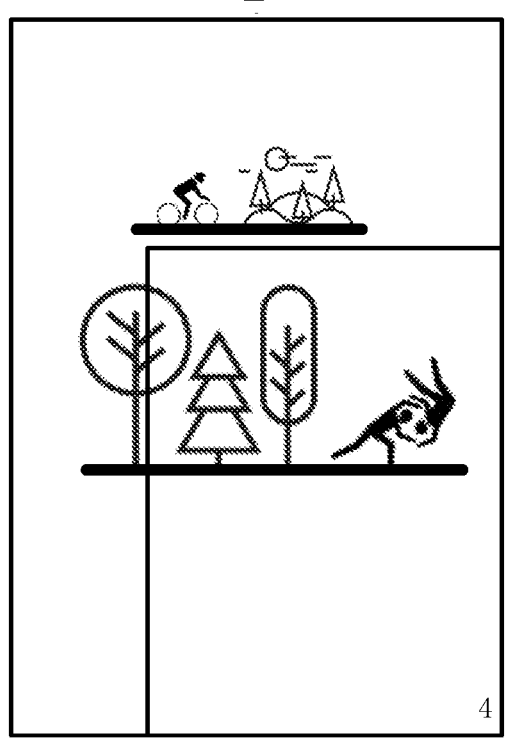
3
4
FIG. 29

SYSTEMS AND METHODS FOR VISUAL POSITIONING

CROSS-REFERENCE TO RELATED APPLICATION

This application is a Continuation of International Patent Application No. PCT/CN2020/137132, filed on Dec. 17, 2020, which claims priority to Chinese Patent Application No. 201911309118.1 filed on Dec. 18, 2019, Chinese Patent Application No. 201911310246.8 filed on Dec. 18, 2019, and Chinese Patent Application No. 201911310236.4 filed on Dec. 18, 2019, the entire contents of which are hereby incorporated by reference.

TECHNICAL FIELD

The present disclosure relates to the technical field of navigation technology, and in particular, to methods and systems for visual positioning.

BACKGROUND

With the development of technology, navigation and positioning functions have become increasingly indispensable in people's lives. The augmented reality (AR) navigation technology is increasingly favored by users due to its intuitiveness. High precision and low time consumption of visual positioning are keys for ensuring the precision and smoothness of AR navigation. Therefore, it is desirable to provide visual positioning methods and systems that are timely and accurate.

SUMMARY

According to an aspect of the present disclosure, a visual positioning method may be provided. The method may include obtaining a positioning image, the positioning image may be collected by an imaging device. The method may also include obtaining a three-dimensional (3D) point cloud map associated with an area where the imaging device is located. The method may also include determining a target area associated with the positioning image from the 3D point cloud map, based on the positioning image. The method may further include determining positioning information of the imaging device based on the positioning image and the target area.

According to an aspect of the present disclosure, a visual positioning system may be provided. The system may include at least one storage medium including a set of instructions for visual positioning and at least one processor. The at least one processor may communicate with the at least one storage medium. When executing the set of instructions, the at least one processor may be configured to direct the system to perform one or more of the following operations. The system may obtain the positioning image collected by an imaging device. The system may obtain the 3D point cloud map associated with an area where the imaging device is located. The system may also determine a target area associated with the positioning image from the 3D point cloud map based on the positioning image. The system may further determine the positioning information of the imaging device based on the positioning image and the target area.

According to another aspect of the present disclosure, a visual positioning system may be provided. The system may include: an obtaining module, configured to obtain a positioning image collected by an imaging device and a 3D point cloud map associated with an area where the imaging device is located; and a determination module, configured to determine the target area associated with the positioning image from the 3D point cloud map based on the positioning image, and determine positioning information of the imaging device based on the positioning image and the target area.

According to yet another aspect of the present disclosure, a computer-readable storage medium storing a set of instructions may be provided, wherein when a computer reads the set of instructions in the computer-readable storage medium, the computer executes a method. The method may include obtaining a positioning image collected by an imaging device; obtaining a 3D point cloud map associated with an area where the imaging device is located; determining a target area associated with the positioning image from the 3D point cloud map based on the positioning image; and determining positioning information of the imaging device based on the positioning image and the target area.

According to yet another aspect of the present disclosure, a visual positioning method may be provided. The method may include: obtaining a positioning image collected by an imaging device; extracting at least one visual feature point in the positioning image; matching the at least one visual feature point with the feature points in the target area to obtain at least one feature point pair; and calculating the positioning information of the imaging device based on the at least one feature point pair.

According to yet another aspect of the present disclosure, a visual positioning method may be provided. The method may include: obtaining an image collected by an imaging device; obtaining a plurality of blocks by performing an image division on the image, at least two blocks of the plurality of blocks having an overlapping area; obtaining a feature point set corresponding to each of the plurality of blocks by performing a visual feature extraction on the plurality of blocks; determining at least one visual feature point in the image based on a plurality of feature point sets corresponding to the plurality of blocks; and determining positioning information of the imaging device based on the at least one visual feature point.

According to yet another aspect of the present disclosure, a visual positioning method applied on an electronic device may be provided. The visual positioning method may include: separating a target space point cloud according to a vision image from a preset 3D point cloud map; obtaining a target 3D point clouds using the vision image from the target space point cloud; and calculating positioning information based on the target 3D point clouds.

In some embodiments, the separating a target space point cloud from a preset 3D point cloud map according to a vision image include: obtaining a target scene area that matches the vision image in a 2D projection image of the 3D point cloud map by performing a scene recognition based on the vision image; screening out target estimated coordinates in the scene area from estimated coordinates obtained by AR engine positioning; determining the target space point cloud from the 3D point cloud map according to the target estimated coordinates and the 2D projection image.

In some embodiments, the determination of the target space point cloud from the 3D point cloud map according to the target estimated coordinate and the 2D projection image may include: obtaining a value of a navigation distance that has been navigated from an initial navigation point from the AR engine and a matched radius parameter according to the value of the navigation distance, the radius parameter being proportional to the value of the navigation distance; separating a candidate image area from the 2D projection image based on the target estimated coordinates and the radius parameter; obtaining a 3D point cloud projected to the candidate image area from the 3D point cloud map to obtain the target space point cloud.

In some embodiments, after the positioning information based on the target 3D points is calculated, the visual positioning method may also include: updating the initial navigation point according to the calculated positioning information so that the value of the navigation distance may be calculated from the new initial navigation point in the next visual positioning.

In some embodiments, the separating a candidate image area from the 2D projection images based on the target estimated coordinates and the radius parameter may include: separating a circular image area from the 2D projection image according to the target estimated coordinates and the radius parameter; obtaining the moving direction of the electronic device; determining the target direction angle based on the moving direction; separating the candidate image area from the circular image area with the target direction angle as the central angle.

In some embodiments, the 2D projection image includes a plurality of scene areas, the obtaining a target scene area that matches the vision image in a 2D projection image of the 3D point cloud map by performing a scene recognition based on the vision image may include: obtaining the reconstructed image corresponding to each of the scene areas, wherein the reconstructed image may be an image used to reconstruct the 3D points projected in the scene area; determining the target scene area from the plurality of scenes areas according to the similarities between the vision image and the reconstructed images.

In some embodiments, the electronic device stores a scene recognition model configured to recognize the scene area. The obtaining a target scene area that matches the vision image in a 2D projection image of the 3D point cloud map by performing a scene recognition based on the vision image may include: obtaining the target scene area by categorizing the vision images using the scene recognition model.

In some embodiments, the obtaining matched target 3D points from the target space point cloud using the vision image may include: extracting visual feature points in the vision image; obtaining the 3D points matched with the visual feature points from the target space point cloud, which may be determined as the target 3D points.

In some embodiments, the calculating the position information based on the target 3D points may include calculating the pose information and a location coordinate of the electronic device according to the target 3D points, which may be determined as the positioning information.

According to yet another aspect of the present disclosure, a visual positioning device applied on an electronic device may be provided. The visual positioning device may include a separating module configured to separate a target space point cloud from a preset 3D point cloud map according to a vision image. The visual positioning device may also include an obtaining module configured to obtain target 3D points from the target space point cloud using the vision image. The visual positioning device may also include a positioning module configured to calculate the positioning information based on the target 3D points.

In some embodiments, the separating module may include a recognition sub-module configured to obtain a scene area that matches the vision image in a 2D projection image of the 3D point cloud map by performing a scene recognition based on the vision image. The separating module may also include a screening sub-module configured to screen out target estimated coordinates in the scene area from estimated coordinates obtained by AR engine positioning. The separating module may further include a determination sub-module configured to determine the target space point cloud from the 3D point cloud map according to the target estimated coordinates and the 2D projection image.

In some embodiments, the determination sub-module may be further configured to: obtain a value of a navigation distance that has been navigated from an initial navigation point from the AR engine; select a matched radius parameter according to the value of navigation distance, the radius parameter being proportional to the value of navigation distance; separate a candidate image area from the 2D projection image based on the target estimated coordinates and the radius parameter; obtain a 3D point cloud projected to the candidate image area from the 3D point cloud map to obtain the target space point cloud.

In some embodiments, the visual positioning device may also include an updating module configured to update the initial navigation point according to the calculated positioning information so that the value of the navigation distance may be calculated from the new initial navigation point in the next visual positioning.

In some embodiments, the determination sub-module may be further configured to: separate a circular image area from the 2D projection image according to the estimated coordinates and the radius parameter; obtain the moving direction of the electronic device; determine the target direction angle based on the moving direction; separate the candidate image area from the circular image area with the target direction angle as the central angle.

In some embodiments, the 2D projection image may include a plurality of scene areas, the recognition sub-module may be further configured to obtain a reconstructed image corresponding to each of the scene areas. The reconstructed image may be an image used to reconstruct a 3D point that projected on the scene area. The recognition sub-module may be further configured to determine the target scene area from the plurality of scene areas according to the similarities between the vision image and the reconstructed images.

In some embodiments, the electronic device stores a scene recognition model configured to recognize the scene area, and the recognition sub-module may be further configured to obtain the target scene area by categorizing the vision images using the scene recognition model.

In some embodiments, the obtaining module may include an extraction sub-module configured to extract visual feature points in the vision image. The obtaining module also may include a matching sub-module configured to obtain the 3D points matched with the visual feature points from the target space point cloud, which may be determined as the target 3D points.

In some embodiments, the positioning module may be further configured to calculate the pose information and a location coordinate of the electronic device according to the target 3D points, which may be determined as the positioning information.

According to yet another aspect of the present disclosure, an electronic device may be provided. The electronic device may include a processor and a storage device, wherein the storage device includes executable instructions executed by the processor, and the processor executes the executable instructions to perform the method described in any embodiment of the present disclosure.

According to yet another aspect of the present disclosure, a visual positioning method may be provided. The method may include: extracting a plurality of visual feature points in a visual positioning image; matching the plurality of visual feature points in the visual positioning image with feature points in a preset semantic three-dimensional (3D) point cloud map to obtain a plurality of feature point pairs according to the preset semantic 3D point cloud map, wherein the plurality of feature point pairs include feature point pairs with semantic annotations and feature point pairs without semantic annotations, the preset semantic 3D point cloud map is obtained by training a sample set including a plurality of 2D images, and preset areas of the plurality of 2D images have semantic annotations; and obtaining positioning information of the visual positioning image by performing a pose calculation based on a preset visual positioning algorithm and the plurality of feature point pairs.

In some embodiments, the obtaining positioning information of the visual positioning image by performing a pose calculation based on a preset visual positioning algorithm and the plurality of feature point pairs may include: obtaining a solution set including a preset count of the feature point pairs according to the plurality of the feature point pairs, the solution set including feature point pairs without semantic annotations; performing at least one iterative calculation on the solution set using a random sampling consensus algorithm to obtain a pose and a count of interior points corresponding to each iterative calculation, wherein an interior point represents a visual feature point whose reprojection value between the visual feature point and a feature point corresponding to the visual feature point in the 3D point cloud map is within a reprojection deviation; obtaining the positioning information of the visual positioning image based on the pose and interior points.

In some embodiments, the solution set may further include feature points with semantic annotations. The obtaining a solution set formed by a preset count of the feature point pairs according to the plurality of the feature point pairs may include: determining whether a count of feature point pairs with semantic annotations in the plurality of feature point pairs is greater than or equal to the first preset value; in response to determining that the count of feature point pairs with semantic annotations in the plurality of feature point pairs is greater than or equal to the first preset value, obtaining the first preset value count of feature point pairs with semantic annotations and adding them into the solution set, and obtaining a second preset value count of feature point pairs without semantic annotations and adding them into the solution set; in response to determining that the count of feature point pairs with semantic annotations in the plurality of feature point pairs is less than the first preset value, adding all the feature point pairs with semantic annotations in the plurality of feature point pairs into the solution set, and obtaining a calculated value of feature point pairs without semantic annotations and adding them into the solution set, the calculated value being a difference between the preset count and a count of all feature point pairs with semantic annotations.

In some embodiments, the method may also include determining the first preset value and the second preset value according to a preset attention rate and the preset count.

In some embodiments, the obtaining a solution set formed by a preset count of the feature point pairs according to a plurality of the feature point pairs may include: determining whether the count of the plurality of feature point pairs is greater or equal to the preset count; in response to the determination that the count is greater than or equal to the preset count, obtaining the solution set from the plurality of the feature point pairs; in response to the determination that the count is smaller than the preset count, determining that the positioning is failed.

In some embodiments, the obtaining the positioning information of the visual positioning image according to the pose and interior points may include: determining whether a current count of iterative calculations is equal to a preset maximum iterative count; in response to determining that the current count of iterative calculations is equal to the preset maximum iterative count, determining a pose corresponding to an iterative calculation with the most interior points as the positioning information of the visual positioning images.

According to yet another aspect of the present disclosure, a visual positioning device may be provided. The device may include an extraction module, a matching module, and a calculating module. The extraction module may be configured to extract a plurality of visual feature points in a visual positioning image. The matching module may be configured to match the visual feature points in the visual positioning image with the feature points in a preset semantic 3D point cloud map according to the preset semantic 3D point cloud map to obtain a plurality of feature point pairs. The plurality of feature point pairs may include feature point pairs with semantic annotations and feature point pairs without semantic annotations. The preset semantic 3D point cloud map may be obtained by training a sample set. The trained sample set may include a plurality of 2D images, and preset areas of the 2D images have semantic annotations. The calculating module may be configured to obtain positioning information of the visual positioning image by performing a pose calculation based on a preset visual positioning algorithm and the plurality of feature point pairs.

In some embodiments, the calculating module may be further configured to obtain the solution set formed by the preset count of the feature point pairs according to the plurality of the feature point pairs, the solution set may include feature point pairs without semantic annotations. The calculating module may be further configured to perform at least one iterative calculation on the solution set using a random sampling consensus algorithm to obtain a pose and a count of interior points corresponding to each iterative calculation, wherein an interior point represents a visual feature point whose reprojection value between the visual feature point and a feature point corresponding to the visual feature point in the 3D point cloud map is within a reprojection deviation. The calculating module may be further configured to obtain the positioning information of the visual positioning image according to the pose and interior points.

In some embodiments, the solution set may further include feature points with semantic annotations. The calculation module 1903 may be further configured to determine whether a count of feature point pairs with semantic annotations in the plurality of feature point pairs is greater than or equal to the first preset value. In response to the determination that the count of feature point pairs with semantic annotations in the plurality of feature point pairs is greater than or equal to the first preset value, the calculation module 1903 may be further configured to obtain the first preset value count of feature point pairs with semantic annotations and add them into the solution set, and obtain a second preset value count of feature point pairs without semantic annotations and add them into the solution set. In response to determining that the count of feature point pairs with semantic annotations in the plurality of feature point pairs is less than the first preset value, the calculation module 1903 may be further configured to add all the feature point pairs with semantic annotations in the plurality of feature point pairs into the solution set, and obtain a calculated value of feature point pairs without semantic annotations and add them into the solution set. The calculated value may be a difference between the preset count and a count of all feature point pairs with semantic annotations.

In some embodiments, the calculating module may be further configured to calculate a first preset value and a second preset value according to a preset attention rate and the preset count.

In some embodiments, the calculating module may be further configured to determine whether the count of the plurality of the feature point pairs is greater than or equal to a preset count; in response to the determination that the count is greater than or equal to the preset count, then obtain the solution set from the plurality of the feature point pairs; in response to the determination that the count is smaller than the preset count, then determine that the positioning is failed.

In some embodiments, the calculating module may be further configured to determine whether a current count of iterative calculations is equal to a preset maximum iterative count; in response to determining that the current count of iterative calculations is equal to the preset maximum iterative count, determine a pose corresponding to an iterative calculation with the most interior points as the positioning information of the visual positioning images.

According to yet another aspect of the present disclosure, a visual positioning device may be provided. The device may include a processor, a storage medium storing executable instructions executed by the processor, and a bus. When the visual positioning device runs, the processor and the storage medium may communicate via the bus, and the processor may execute the executable instructions to perform the method of any embodiment of the present disclosure.

According to yet another aspect of the present disclosure, a storage medium may be provided. A computer program may be stored on the storage medium, the computer program executes the method of any of the embodiments of the present disclosure when it may be operated by the processor.

According to yet another aspect of the present disclosure, a method for extracting visual feature points of an image. The method may include: obtaining a plurality of blocks by performing an image division on a visual positioning image, the plurality of blocks having an overlapping area; obtaining a feature point set corresponding to each of the plurality of blocks by performing a visual feature extraction for the block; combining feature points with same coordinate parameters in the overlapping area, and determining a total feature point set corresponding to the visual positioning image according to the plurality of feature points corresponding to the plurality of blocks.

In some embodiments, the obtaining a feature point set corresponding to each of the plurality of blocks by performing a visual feature extraction for the block may include: obtaining the plurality of feature point sets corresponding to each block by performing the visual feature extraction to each block in parallel, the count of feature points in the feature point set of each block being within the preset value range.

In some embodiments, the obtaining a plurality of blocks by performing an image division on a visual positioning image may include: obtaining the plurality of blocks by performing the image division on the visual positioning image, wherein there is an overlapping area between each two adjacent blocks of the plurality of blocks.

In some embodiments, the size of each of the blocks is M×N, the size of the overlapping area is m×n, and m×n=ρM×γN, ρ, and γ are preset coefficients less than 1 and greater than 0.

In some embodiments, the obtaining the plurality of feature point sets corresponding to each block by performing the visual feature extraction to each block in parallel may include: obtaining a extracted feature point set corresponding to each of the blocks by simultaneously performing the visual feature extraction on each of the blocks in parallel, wherein the count of feature points of the extracted feature point set is greater than or equal to the preset value; determining the feature point set from the extracted feature point sets, the count of feature points of the feature point set being within the preset value range.

In some embodiments, the determining the feature point set from the extracted feature point sets, the count of feature points of the feature point set being within the preset value range may include: determining q feature points from the extracted feature point sets according to the feature parameters of the feature points, wherein q is within the preset value range, the feature parameters include one or both of a response value and a scale parameter.

In some embodiments, each feature point may correspond to a scale parameter, when a plurality of feature points with the same coordinate parameters exist in the plurality of feature point sets, the combining the feature points with the same coordinate parameters in the overlapping area and determine the total feature point set corresponding to the visual positioning image according to a plurality of feature points corresponding to the plurality of blocks may include: deleting feature points whose scale parameter orders are greater than a threshold among the feature points with same coordinate parameters in the plurality of feature point sets; combining a plurality of deleted feature point sets as the total feature point set.

According to yet another aspect of the present disclosure, a device for extracting the visual feature points of an image. The device may include a separating module configured to perform an image division on a visual positioning image to obtain a plurality of blocks, wherein there are overlapping areas in the plurality of blocks. The device may include an extraction module configured to obtain a feature point set corresponding to each of the blocks by performing visual feature extraction to each of the blocks. The extraction module may be further configured to combine the feature points with the same coordinate parameters in the overlapping area, and determine a total feature point set corresponding to the visual positioning image according to the plurality of feature points corresponding to the plurality of blocks.

In some embodiments, the extraction module may be configured to obtain a feature point set corresponding to each of the blocks by performing visual feature extraction on each of the blocks in parallel. The count of feature points of the feature point set corresponding to each block may be within a preset value range.

In some embodiments, the separating module may be configured to obtain a plurality of blocks by perform an image division to the visual positioning image, wherein there is an overlapping area between each two adjacent blocks of the plurality of blocks.

In some embodiments, the size of each of the blocks is M×N, the size of the overlapping area is m×n, and m×n=γM×γN, where γ is a preset coefficient less than 1 and greater than 0

In some embodiments, the extraction module may be configured to obtain a extracted feature point set corresponding to each of the blocks by simultaneously performing the visual feature extraction for each of the blocks in parallel, wherein a count of feature points of the extracted feature point set is greater than or equal to the preset value. The extraction module may be further configured to determine the feature point set from the extracted feature point sets. The count of feature points of the feature point set is within the preset value range.

In some embodiments, the extraction module may be configured to determine q feature points from the extracted feature point sets according to the feature parameters of the feature points, wherein q is within the preset value range, and the feature parameters include one or both of the response value and the scale parameter.

In some embodiments, each feature point corresponds to a scale parameter, when a plurality of feature points with the same coordinate parameters exist in the plurality of feature point sets, the extraction module may be configured to delete feature points whose scale parameter orders are greater than a threshold among the feature points with same coordinate parameters in the plurality of feature point sets. The extraction module may be further configured to combine a plurality of deleted feature point sets as the total feature point set.

According to yet another aspect of the present disclosure, an electronic device may be provided. The device may include a processor, a storage medium and a bus. The storage medium may store machine-readable instruction which may be executed by the processor. When the electronic device runs, the processor and the storage medium may communicate with each other via the bus, and the processor may execute the machine-readable instruction to implement the method of any embodiments of the present disclosure.

According to yet another aspect of the present disclosure, a computer-readable storage medium may be provided. The computer-readable storage medium stores a computer program, the computer program executes the method of any of the embodiments of the present disclosure when it is operated by the processor.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 27 is a schematic diagram illustrating an exemplary user interface of a mobile phone in a process of extracting visual feature points of an image according to some embodiments of the present disclosure;

FIG. 28 is a flowchart illustrating an exemplary dialogue data processing method for multiple dialogues according to some embodiments of the present disclosure;

FIG. 29 is a schematic diagram for extracting visual feature points of an image according to some embodiments of the present disclosure;

DETAILED DESCRIPTION

Figure 1:
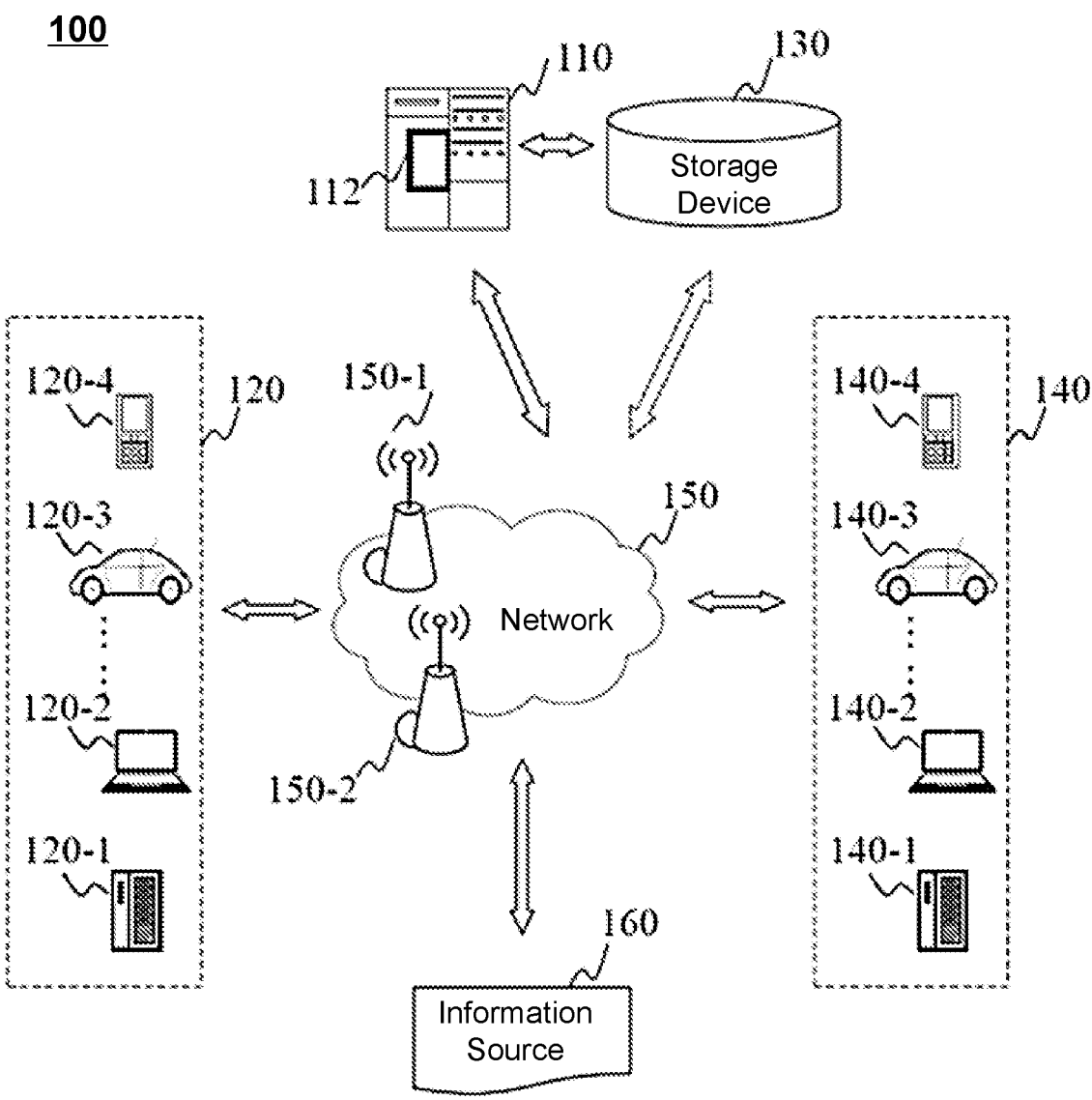
FIG. 1 is a schematic diagram illustrating an application scenario of a visual positioning system according to some embodiments of the present disclosure.

In order to illustrate technical solutions of the embodiments of the present disclosure, a brief introduction regarding the drawings used to describe the embodiments is provided below. Obviously, the drawings described below are merely some examples or embodiments of the present disclosure. Those having ordinary skills in the art, without further creative efforts, may apply the present disclosure to other similar scenarios according to these drawings. It should be understood that the exemplary embodiments are provided merely for better comprehension and application of the present disclosure by those skilled in the art, and not intended to limit the scope of the present disclosure. Unless obvious according to the context or illustrated specifically, the same numeral in the drawings refers to the same structure or operation.

It should be understood that the terms "system", "device", "unit" and/or "module" used in the specification are means used to distinguish different components, elements, parts, segments or assemblies. However, these words may be replaced by other expressions if they serve the same purpose.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added into the flowcharts. One or more operations may be removed from the flowcharts.

Embodiments of the present disclosure may be applied to different transport systems including, but are not limited to land, ocean, aerospace, or the like, or any combination thereof. For example, the vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. The application scenarios of different embodiments of the present disclosure include, but are not limited to, a webpage, a plug-in of a browser, a client terminal, a custom system, an internal analysis system, an artificial intelligence robot, or the like, or any combination thereof. It should be understood that the application scenarios of the systems and methods of the present disclosure are merely some examples or embodiments of the present disclosure, for those skilled in the art, the present disclosure may also be applied in other similar situations according to the drawings without any creative effort.

The terms "user", "user terminal", "shooting device", "imaging device", "imaging device terminal", "consumer", "demand user", etc. of the present disclosure re used interchangeably to refer to an individual, an entity, or a tool that may request or order a service. Similarly, the terms "driver", "driver terminal", "provider", "service provider", "service party" etc. of the present disclosure are used interchangeably to refer to an individual, an entity, or a tool that may provide a service or facilitate the providing of the service. In addition, the term "user" of the present disclosure may be a party that may request or order a service, or a party that may provide a service or facilitate the providing of the service.

FIG. 1 is a schematic diagram illustrating an application scenario of a visual positioning system 100 according to some embodiments of the present disclosure.

The visual positioning system 100 may be configured to determine positioning information of an imaging device according to a positioning image collected by the imaging device. An imaging device may be a photographing device with the function of capturing images, and the imaging device may include a camera. In some embodiments, the imaging device may be an individual imaging device, or a photographing device integrated on a smart device (e.g., a smartphone, a tablet, an enhancement reality device). In some embodiments, the visual positioning system 100 may obtain the positioning image collected by the imaging device and a 3D point cloud map associated with an area where the imaging device is located. The visual positioning system 100 may determine the positioning information of the imaging device based on the positioning image and the 3D point cloud map. As used herein, the visual positioning system 100 may be used in an airport, a railway station, a bus station, a shopping mall, a playground, a school, a square, a road, etc.

In some embodiments, the visual positioning system 100 may be an online service platform applied to provide online service. For example, the visual positioning system 100 may be applied to an online hailing service platform that provides transportation services. The online hailing service platform may provide transportation services such as a taxi call, a fast ride call, a tailored taxi call, a bus call, a carpool, a bus service, a driver employment, a pick-up service, a designated driving and other transport services. As another example, the visual positioning system 100 may also be applied to service platforms such as an express delivery, a takeaway, a trip (e.g., a trip). As another example, the visual positioning system 100 may be applied to a navigation service platform. In some embodiments, the visual positioning system 100 may be applied to a self-driving system. For the convenience of description, the following takes the navigation service platform as an example to describe the application of the visual positioning system 100. This is not intended to set restrictions, as the visual positioning system 100 may be applied to any service platform.

As shown in FIG. 1, the visual positioning system 100 may include a server 110, a first user terminal 120, a storage device 130, a second user terminal 140, a network 150, and an information source 160.

In some embodiments, the server 110 may be used to process information and/or data related to the visual positioning system 100. For example, the server 110 may be used to determine the target area associated with the imaging device in the 3D point cloud map. In some embodiments, server 110 may be a single server or a server group. The server group may be centralized or distributed (e.g., server 110 may be a distributed system). In some embodiments, the server 110 may be local or remote. For example, server 110 may access information and/or data stored in the first user terminal 120, the second user terminal 140, and/or storage device 130 via the network 150. As another example, the server 110 may be directly connected to the first user terminal 120, the second user terminal 140, and/or storage device 130 to access stored information and/or data. In some embodiments, the server 110 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof.

In some embodiments, server 110 may include a processing device 112. The processing device 112 may process information and/or data related to the visual positioning system 100 to perform one or more functions described in the present disclosure. For example, the processing device 112 may obtain a positioning request sent by the first user terminal 120 and/or the second user terminal 140. The processing device 112 may also obtain a positioning image collected by the first user terminal 120 and/or the second user terminal 140 (or a corresponding imaging device). The processing device 112 may also obtain a 3D point cloud map associated with an area where the first user terminal 120 and/or the second user terminal 140 (or a corresponding imaging device) is located. The processing device 112 may determine the positioning information of the first user terminal 120 and/or the second user terminal 140 (or a corresponding imaging device) based on the positioning image and the 3D point cloud map. In some embodiments, the processing device 112 may also initially position the imaging device via a Global Positioning System (GPS). In some embodiments, the processing device 112 may include one or more processing engines (e.g., single-core processing engine(s) or multi-core processing engine(s)). Merely by way of example, the processor 112 may include a central processing unit (CPU), an application-specific integrated circuit (ASIC), an application-specific instruction-set processor (ASIP), a graphics processing unit (GPU), a physical processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The storage device 130 may be used to store data and/or instructions associated with visual positioning. In some embodiments, the storage device 130 may store the 3D point cloud map. In some embodiments, the storage device 130 may store the positioning image obtained from the first user terminal 120 and/or the second user terminal 140. In some embodiments, the storage device 130 may store data and/or instructions executed or used by the server 110 to perform the exemplary methods described in the present disclosure. In some embodiments, the storage device 130 may include a mass storage, a removable storage, a volatile read-and-write memory, a read-only memory (ROM), or the like, or any combination thereof. Exemplary mass storage may include a magnetic disk, an optical disk, a solid-state disk, etc. Exemplary removable storage may include a flash drive, a floppy disk, an optical disc, a memory card, a compression disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the storage device 130 may be connected to the network 150 to communicate with one or more components of the visual positioning system 100 (e.g., the server 110, the first user terminal 120, the second user terminal 140). One or more components of the visual positioning system 100 may access the data or instructions stored in the storage device 130 via the network 150. In some embodiments, the storage device 130 may be directly connected to or communicate with one or more components of the visual positioning system 100 (e.g., the server 110, the first user terminal 120, the second user terminal 140). In some embodiments, the storage device 130 may be part of the server 110. In some embodiments, the storage device 130 may be an individual storage.

In some embodiments, the first user terminal 120 may be an individual, a tool, or other entities directly associated with a visual positioning request. The user may be a visual positioning requester. In the present disclosure, the terms "user", "user terminal" may be used interchangeably. In some embodiments, the first user terminal 120 may include a desktop computer 120-1, a laptop 120-2, an onboard device 120-3, and a mobile device 120-4, or the like, or any combination thereof. In some embodiments, the mobile devices 120-4 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, smart clothing, a smart backpack, a smart accessory, or the like, or any combination thereof. In some embodiments, a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google™ Glass, an Oculus Rift, a HoloLens, a Gear VR, etc. In some embodiments, the onboard device 120-3 in the vehicle may include an on-board computer, an on-board television, etc.

In some embodiments, the second user terminal 140 may be a device similar or identical to the first user terminal 120. In some embodiments, the second user terminal 140 may include a desktop computer 140-1, a notebook computer 140-2, a vehicle device 140-3, and a mobile device 140-4, or the like, or any combination thereof.

In some embodiments, the first user terminal 120 and/or the second user terminal 140 may include a device with a positioning technique. In some embodiments, the first user terminal 120 and/or the second user terminal 140 may communicate with another positioning device to determine positions of the first user terminal 120 and/or the second user terminal 140. In some embodiments, the first user terminal 120 and/or the second user terminal 140 may send the positioning information to the server 110. In some embodiments, the first user terminal 120 and/or the second user terminal 140 may include a device with the function of capturing images. In some embodiments, the first user terminal 120 and/or the second user terminal 140 may include an image collection device. In some embodiments, the first user terminal 120 and/or the second user terminal 140 may connect and communicate with the image collection device to collect images through the image collection device.

In some embodiments, the first user terminal 120 and/or the second user terminal 140 may correspond to a transportation tool. The transportation tool may also be referred to as a vehicle. It may be envisaged that the vehicle may be an electric vehicle, a fuel cell vehicle, a hybrid vehicle, or a conventional internal combustion engine vehicle, for example, a transportation tool, a coupe, a sedan, a pickup truck, a station wagon, a sports utility vehicle (SUV), a minivan or modified car.

The transportation tool may be equipped with various sensors installed to a body. When the transportation tool travels along a trajectory, the sensor may be configured to capture data. For example, the sensor may be a combination of a LiDAR scanner configured to scan the surroundings and obtain the point cloud and/or a 3-D camera for obtaining digital images. As another example, the sensor may be one or more sensors used in a navigation unit, such as a GPS receiver, and one or more inertial measurement unit (IMU) sensors. The GPS refers to a global navigation satellite system that provides geographic positioning and time information to a GPS receiver. The IMU refers to an electronic device that measures and provides a vehicle's specific force, angular rate, and sometimes a magnetic field surrounding the vehicle, using various inertial sensors. The GPS receiver and the IMU sensors provide real-time posture information of the transportation tool including a position and a direction of the transportation tool at each timestamp when the transportation tool is marching, the information also includes.

The network 150 may facilitate exchange of information and/or data. In some embodiments, one or more components of the visual positioning system (e.g., the server 110, the first user terminal 120, the storage device 130, the second user terminal 140) may send information and/or data to other components of the visual positioning system 100 via the network 150. For example, the server 110 may obtain a positioning request from the first user terminal 120 via the network 150. In some embodiments, the network 150 may be a wired network or a wireless network or the like, or any combination thereof. Merely by way of example, the network 150 may include a cable network, a wired network, a fiber optic network, a telecommunications network, an internal network, an Internet, a local area network (LAN), a wide area network (WAN), a wireless local area network (WLAN), a metropolitan area network (MAN), a public switched telephone network (PSTN), a bluetooth network, a zigbee network, a near field communication (NFC) network, a global system for mobile communications (GSM) network, a code division multiple access (CDMA) network, a time division multiple access (TDMA) network, a general packet radio service (GPRS) network, an enhanced data rates for GSM evolution (EDGE) networks, a wideband code division multiple access (WCDMA) network, a high speed downlink packet access (HSDPA) network, a long term evolution (LTE) network, a user data protocol (UDP) network, a transmission control protocol/Internet protocol (TCP/IP) network, a short message service (SMS) network, a wireless application protocol (WAP) network, a ultra-wideband (UWB) network, infrared, or the like, or any combination thereof. In some embodiments, the visual positioning system 100 may include one or more network access points. For example, the network 150 may include wired or wireless network access points (e.g., 150-1, 150-2), through which one or more components of the visual positioning system 100 may be connected to the network 150 to exchange data and/or information.

The information source 160 refers to a source that provides additional information for the visual positioning system 100. The information source 160 may be used to provide information related to visual positioning, such as positioning time information, weather information, laws and regulations information, news information, living information, life guide information, etc. The information source 160 may be in the form of a separate central server, or may be in the form of a plurality of servers connected through a network, and may also be in the form of an individual device. When the information source 160 is in the form of an individual device, these devices may enable a cloud server to connect the individual devices connected with it and form information source 160 together through a user-generated content, such as uploading texts, voices, images, videos, etc., to the cloud server.

It should be noted that the visual positioning system 100 is merely provided for purposes of illustration, and is not intended to limit the scope of the present disclosure. For those skilled in the art, various modifications or variations may be made according to the description of the present disclosure. For example, the visual positioning system 100 may further include a database. As another example, the visual positioning system 100 may achieve similar or different functions on other devices. However, those variations and modifications do not depart from the scope of the present disclosure.

Figure 2:
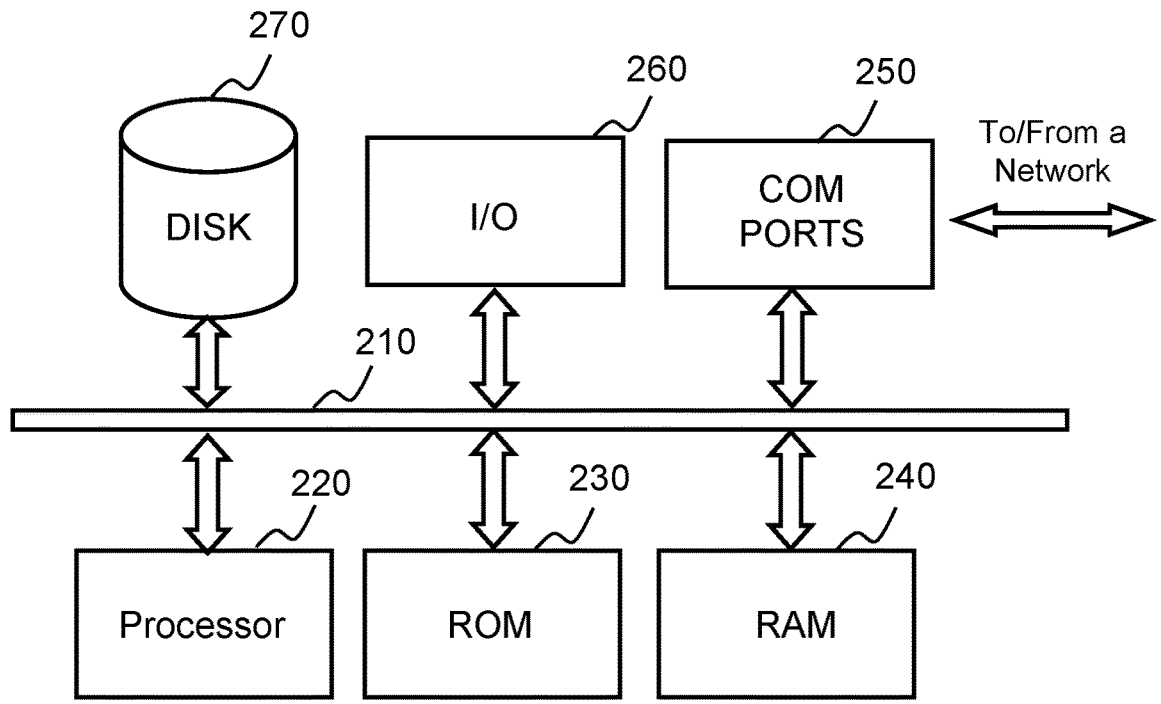
FIG. 2 is a schematic diagram illustrating an exemplary computing device according to some embodiments of the present disclosure.

FIG. 2 is a schematic diagram illustrating an exemplary computing device 200 according to some embodiments of the present disclosure.

In some embodiments, the server 110 and/or the first user terminal 120 and/or the second user terminal 140 may be implemented on the computing device 200. For example, the processing device 112 may implement and execute the functions disclosed in the present disclosure on computing device 200. As shown in FIG. 2, the computing device 200 may include an internal bus 210, a processor 220, a read-only memory (ROM) 230, a random memory (RAM) 240, a communication port 250, an input/output interface 260, and a hard disk 270.

The processor 220 may execute computing instructions (e.g., program codes) and perform functions of the visual positioning system 100 in accordance with techniques described in the present disclosure. The computing instructions may include programs, objects, components, data structures, procedures, modules, and functions (the functions refer to the particular functions described in the present disclosure). For example, processor 220 may process images or text data obtained from any of the other components of the visual positioning system 100. In some embodiments, processor 220 may include a microcontroller, a microprocessor, a reduced instruction set computer (RISC), an application specific integrated circuit (ASIC), an application specific instruction set processor (ASIP), a central processing unit (CPU), a graphics processing unit (GPU)), a physical processing unit (PPU), a microcontroller unit, a digital signal processor (DSP), a field programmable gate arrays (FPGA), an advanced RISC machine (ARM), a programmable logic device (PLD), and any circuits or processors capable of executing one or more functions, or the like, or any combination thereof.

The storage devices of the computing device 200 (e.g., the ROM 230, the RAM 240, the hard disk 270, etc.) may store data/information obtained by any other components of the visual positioning system 100. Exemplary ROMs may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. Exemplary RAMs may include a dynamic RAM (DRAM), a double rate synchronous dynamic RAM (DDR SDRAM), a static RAM (SRAM), a thyristor RAM (T-RAM), and a zero capacitance (Z-RAM), etc.

The input/output interface 260 may be used to input or output signals, data or information. In some embodiments, the input/output interface 260 may enable a user to contact the visual positioning system 100. In some embodiments, the input/output interface 260 may include an input device and an output device. An exemplary input device may include a keyboard, a mouse, a touch screen, and a microphone, or the like, or any combination thereof. An exemplary output device may include a display device, a speaker, a printer, a projector, or the like, or any combination thereof. An exemplary display device may include a liquid crystal display (LCD), a light emitting diode (LED) based display, a flat panel display, a curved display, a television equipment, a cathode ray tube (CRT), or the like, or any combination thereof.

The communication port 250 may be connected to a network for data communication. The connection may be a wired connection, a wireless connection, or a combination of both. The wired connection may include, for example, an electrical cable, an optical cable, a telephone wire, or the like, or a combination thereof. The wireless connection may include, for example, a Bluetooth link, a Wi-Fi link, a WiMax link, a WLAN link, a ZigBee link, a mobile network link (e.g., 3G, 4G, 5G, etc.), or the like, or a combination thereof. In some embodiments, communication port 250 may be and/or include a standardized port, such as RS232, RS485, etc. In some embodiments, the communication port 250 may be a specially designed communication port.

For understanding convenience, only one processor is exemplified in FIG. 2. However, it should be noted that the computing device 200 in the present disclosure may include a plurality of processors, therefore the operations and/or methods implemented by one processor in the present disclosure may also be implemented by a plurality of processors independently or together. For example, if in the present disclosure, the processor of the computing device 200 executes operations 1 and 2, it should be noted that the operations 1 and 2 may also be executed by two different processors of the computing device 200 independently or together (e.g., the first processor may execute operation 1, the second processor may execute operation 2, or the first second processor and the second processor execute operations 1 and 2 together).

Figure 3:
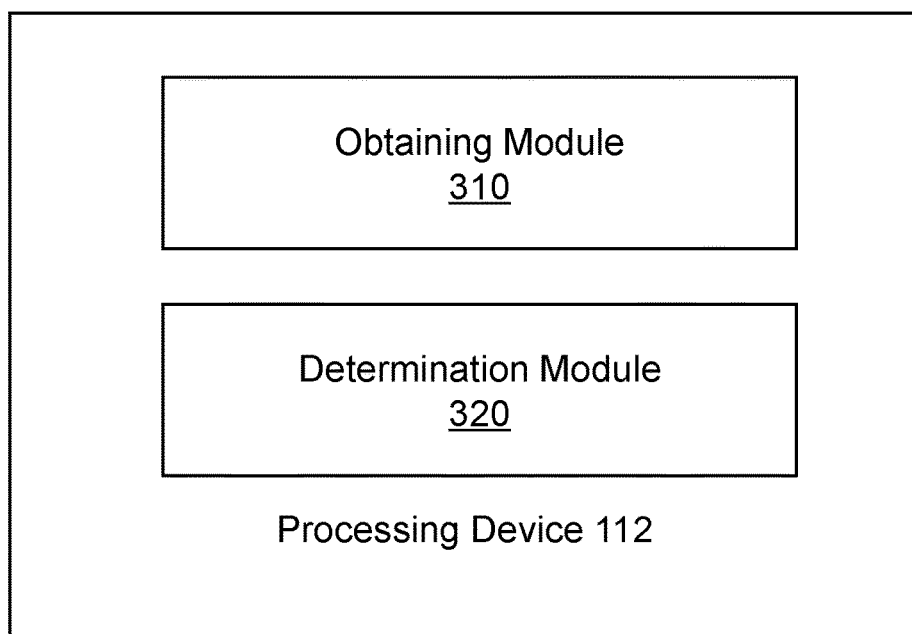
FIG. 3 is a block diagram illustrating an exemplary processing device according to some embodiments of the present disclosure.

FIG. 3 is a block diagram illustrating an exemplary processing device 112 according to some embodiments of the present disclosure.

As shown in FIG. 3, the processing device 112 may include an obtaining module 310 and a determination module 320.

The obtaining module 310 may be configured to obtain a positioning image collected by an imaging device. More descriptions for obtaining the positioning image may be found in FIG. 4 and the descriptions thereof, and the descriptions of which are not repeated here.

In some embodiments, the obtaining module 310 may acquire a 3D point cloud map associated with an area where the imaging device is located. More descriptions for the obtaining of the 3D point cloud map may be found in FIG. 4 and the descriptions thereof, and the descriptions of which are not repeated here.

The determination module 320 may be configured to determine positioning information of the imaging device based on the positioning image and the 3D point cloud map. In some embodiments, the determination module 320 may also determine a target area associated with the positioning image from the 3D point cloud map based on the positioning image. The determination module 320 may also extract at least one visual feature point in the positioning image, and match the at least one visual feature point to the feature points in the target area to obtain at least one feature point pair. The positioning information of the imaging device may be then calculated based on at least one feature point pair. More descriptions for the determining of the positioning information of the imaging device may be found in FIG. 4 and the descriptions thereof, and the descriptions of which are not repeated here.

In some embodiments, the determination module 320 may also determine one or more restricting conditions associated with the range of the target area based on the positioning image. The determination module 320 may determine the target area from the 3D point cloud map based on the one or more restricting conditions. The one or more restricting conditions may be related to at least one of a scene corresponding to the positioning image, an initial estimated position of the imaging device, or azimuth information of the imaging device. More descriptions for determining the target area associated with the positioning image may be found in FIG. 4 and the descriptions thereof, and the descriptions of which are not repeated here.

It should be understood that the system and modules shown in FIG. 3 may be implemented in various ways. For example, in some embodiments, the system and its modules may be implemented by hardware, software, or a combination of both. The hardware may be implemented using dedicated logic. The software may be stored in a memory, executed by an appropriate instruction execution system, such as a microprocessor or a dedicated design hardware. Those skilled in the art will appreciate that the methods and systems described above may be implemented using computer-executable instructions and/or processor control code, for example, such code are provided on a carrier medium such as a disk, CD or DVD-ROM, or a programmable memory of a read-only memory (firmware), or a data carrier such as an optical or electronic signal carrier. The system and its modules of the present disclosure may not only be implemented by very large scale integrated circuits (VLSIs), gate arrays, semiconductors such as logic chips, transistors, etc., or hardware circuits of programmable hardware devices such as field programmable gate arrays, programmable logic devices, etc., but also be implemented by, for example, the software executed by varieties of processors, or implemented by a combination of the hardware circuits and the software (e.g., firmware) described above.

It should be noted that the above descriptions for the processing device and its modules are for description convenience only, and the present disclosure should not be limited to the scope of the embodiments mentioned. It will be appreciated that for those skilled in the art, after understanding the principle of the system, the individual modules may be arbitrarily combined without departing from this principle, or the subsystem is connected to other modules. For example, the obtaining module 310 and the determination module 320 may be different modules in a system, or a module implementing the functions of two or more modules described above. As another example, each module may share a storage module, or each module may also have a respective storage module. The variations like these are within the scope of the present disclosure.

Figure 4:
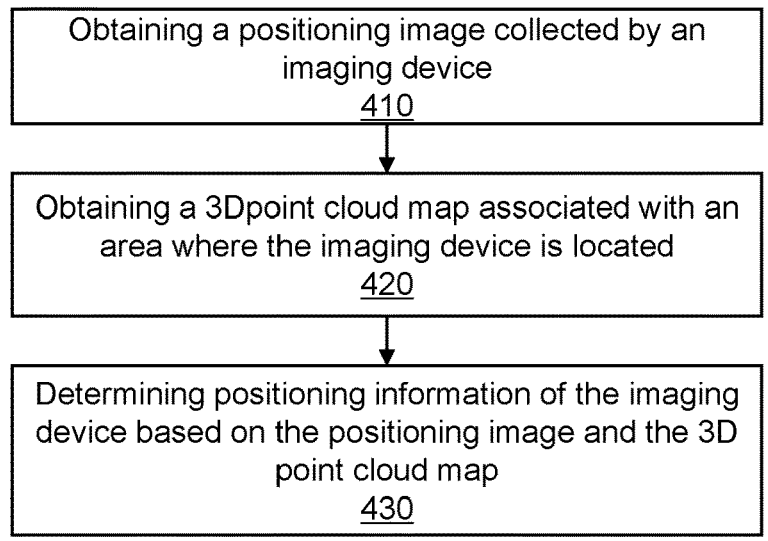
FIG. 4 is a flowchart illustrating an exemplary visual positioning method according to some embodiments of the present disclosure.

FIG. 4 is a flowchart illustrating an exemplary visual positioning method according to some embodiments of the present disclosure. The process 400 may be performed by the visual positioning system 100. For example, the process 400 may be executed by the processing device 112 described in FIG. 3, the first user terminal 120, or the second user terminal 140.

In 410, a positioning image collected by an imaging device may be obtained. In some embodiments, operation 410 may be performed by the obtaining module 310.

The positioning image refers to an image for determining the position of the imaging device. The positioning image may represent a scene within the imaging vision range of the imaging device. The scene may include an indoor scene or an outdoor scene. For example, the scene may be an outdoor scene. The positioning image may include image representations of one or more objects in the scene. The one or more objects may include characters, flowers, trees, buildings, etc. As another example, the scene may be an indoor scene, the one or more objects may include signs (e.g., house counts, billboards, etc.).

In some embodiments, the positioning image may include initial positioning information of the imaging device when the imaging device collects the positioning image. The initial positioning information may include pose information when the imaging device collects the positioning image, including an initial estimated position of the imaging device, estimated direction information, etc. The initial positioning information may be obtained by a positioning device associated with the imaging device. The positioning device may include a GPS receiver, an IMU sensor, etc. For example, the initial positioning information may include GPS positioning information, positioning information corrected by an algorithm, etc.

In some embodiments, the positioning image may be captured by the imaging device. In some embodiments, the positioning image may be stored in an imaging device, the storage device 130, the ROM 230 or the RAM 240. The imaging device may be a photographing device with a photographing image function. In some embodiments, the imaging device may be an individual photographing device, or an imaging device integrated on other devices. For example, an imaging device may be an individual camera. As another example, the imaging device may be an imaging device integrated on a smart device. In some embodiments, the smart device may be a smartphone, a tablet, a drone, etc., and the imaging device (e.g., a camera) may be integrated on the smart device. In some embodiments, the smart device may include an augmented reality (AR) device, a smart bracelet, smart glasses, a smart helmet, a virtual reality (VR) device. In some embodiments, the imaging device may be carried by a pedestrian and images may be collected as it travels. In some embodiments, the imaging device may collect at least one positioning image at time intervals. For example, a time interval may be 0.5 seconds, 1 second, 2 seconds, 10 seconds, 60 seconds, etc., which is not limited in the present disclosure.

In some embodiments, the obtaining module 310 may communicate with the first user terminal 120, the second user terminal 140, and/or the storage device 130 to obtain the positioning image. For example, the obtaining module 310 may obtain the positioning image from the first user terminal 120, the second user terminal 140 directly or through the network 150. As another example, the obtaining module 310 may obtain the stored positioning image directly or through the network 150 from the storage device 130 or the RAM 240. As another example, the obtaining module 310 may call a data interface directly to obtain the positioning image from the imaging device.

In 420, a 3D point cloud map associated with an area where the imaging device is located may be obtained. In some embodiments, operation 420 may be performed by the obtaining module 310.

In some embodiments, the processing devices may obtain the 3D point cloud map from the storage device 130, the ROM) 230, the RAM 240, or other storage devices or databases.

In some embodiments, the area where the imaging device is located may be a geographic area where the imaging device is located. For example, the geographic area may include an airport, a railway station, a bus station, a school, a hospital, a shopping mall, a road, etc.

In some embodiments, the obtaining module 310 may determine the area where the imaging device is located according to the initial positioning information collected by the imaging device. For example, the initial estimated position included in the initial positioning information may be in a mall, and the obtaining module 310 may determine the area where the imaging device is located may be in the mall.

The 3D point cloud map may be a 3D map associated with a geographic area. For example, a 3D map of an airport, a 3D map of a train station, a 3D map of a mall, etc. The 3D point cloud map may be a 3D map model that represents a geographic area generated based on point cloud data. The point cloud data may include a set of data points associated with one or more objects in surroundings of a body (e.g., a vehicle, an imaging device). The surroundings of the body may refer to an environment around the body and one or more objects (including biological objects and non-biological objects). The data points of the point cloud data may correspond to physical points or areas of the object in the space around an estimated position of the body (e.g., the vehicle, the imaging device). The one or more objects around the body may include a billboard, a pedestrian, an animal, a plant, a table, and a chair, etc. In some embodiments, the point cloud data may be obtained by a sensor (e.g., LiDAR) installed on the body. For example, the sensor may emit laser pulses to scan the surroundings of the body. The laser pulse may be reflected by the physical points in the surroundings and returns to the sensor. The sensor may generate the point cloud data representing the surroundings based on one or more features of the returned laser pulse. In some embodiments, the point cloud data may be collected within a time period (e.g., 1 second, 2 seconds) when the body (e.g., the vehicle, the imaging device) stops on a road or drives along a road. During the collection of point cloud data, the sensor may be rotated within a scanning angle (e.g., 360 degrees, 180 degrees, 120 degrees) and scan the surroundings with a specific scan frequency (e.g., 10 Hz, 15 Hz, 20 Hz).

In some embodiments, the 3D point cloud map may be reconstructed based on a plurality of 2D images. In some embodiments, a 2D image may be an image captured in advance. The processing device 112 may reconstruct the 3D point cloud map by a 3D reconstruction technology based on the plurality of 2D images captured in advance. Exemplary 3D reconstruction technologies may include a shape from texture (SFT)) method, a shape from shading method, a multi-view stereo (MVS) method, a structure from motion (SFM) method, a time-of-flight (ToF) method, a structured light method, a Moire schlieren method, or the like, or any combination thereof.

In some embodiments, the 3D point cloud map associated with the area where the imaging device is located may be a 3D point cloud map corresponding to the area where the imaging device is located, i.e., the 3D point cloud map may describe a scene in the area where the imaging device is located. For example, if the imaging device is located in a waiting room of Beijing Capital International Airport (BCIA), the 3D point cloud map may describe a scene in BCIA. The map may be a 3D point cloud map of 50 km×50 km around the BCIA, or a 3D point cloud map of Shunyi District, Beijing.

In some embodiments, the obtaining module 310 may communicate with the first user terminal 120, the second user terminal 140, and/or the imaging device to obtain the initial positioning information of the imaging device, and determine the area where the imaging device is located according to the initial positioning information. In some embodiments, the obtaining module 310 may obtain the 3D point cloud map including the area where the imaging device is located from the storage device 130 based on the area where the imaging device is located.

In 430, positioning information of the imaging device may be determined based on the positioning image and the 3D point cloud map. In some embodiments, operation 430 may be performed by the determination module 320.

In some embodiments, the positioning information of the imaging device may include location information and posture information (i.e., pose information) of the imaging device. The pose information may refer to a position and/or a direction of the imaging device relative to a coordinate system. The coordinate system may be any suitable coordinate system with a fixed origin and/or one or more fixed axes, such as a geographic coordinate system. The coordinate system may have any count of dimensions. For example, the coordinate system may be a 2D coordinate system or a 3D coordinate system. The position of the imaging device in the coordinate system may be represented as coordinates of the imaging device in coordinate system. For example, the position information of the imaging device in the geographic coordinate system may be represented by a longitude, a latitude, and/or an altitude. The direction of the imaging device (i.e., posture information) may be represented as one or more Euler angles in the coordinate system. For example, the direction of the imaging device may be represented as one or more of the yaw angle, the pitch angle and/or the roll angle.

In some embodiments, a target area associated with the positioning image may be determined from the 3D point cloud map based on the positioning image. In some embodiments, the target area associated with the positioning image may be an area in the 3D point cloud map that describes a scene reflected or represented by the positioning image. In some embodiments, the determination module 320 may determine the target area associated with the positioning image from the 3D point cloud map based on the positioning image. Specifically, the determination module 320 may determine one or more restricting conditions associated with a range of the target area based on the positioning image. The determination module 320 may determine the target area from the 3D point cloud map based on the one or more restricting conditions. The one or more restricting conditions may be related to at least one of the scene corresponding to the positioning image, the initial estimated position of the imaging device, and azimuth information of the imaging device. More descriptions for the determining of the target area associated with the positioning image may be found in FIG. 5 and the descriptions thereof, and the descriptions of which are not repeated here.

In some embodiments, determination module 320 may determine the positioning information of the imaging device based on the positioning image and the target area. Specifically, the determination module 320 may extract at least one visual feature point in the positioning image. The determination module 320 may also match the at least one visual feature point to the feature points in the target area to obtain at least one feature point pair. The positioning information of the imaging device may then be calculated based on the at least one feature point pair. More descriptions for the determining of the positioning information of the imaging device based on point cloud data within the target area may be found in FIG. 7-FIG. 12 and the descriptions thereof, and the descriptions of which are not repeated here.

In some embodiments, the determination module 320 may obtain a semantic 3D point cloud map. The determination module 320 may extract at least one visual feature point in the positioning image, and match the at least one visual feature point to the feature points in the semantic 3D point cloud map to obtain at least one feature point pair. The positioning information of the imaging device may then be calculated based on the at least one feature point pair. More descriptions for the determining of the positioning information of the imaging device based on the semantic 3D point cloud map may be found in FIG. 13-FIG. 19 and the descriptions thereof, and the descriptions of which are not repeated here. More for the extracting the visual feature points may be referred to in the detailed description in FIG. 20-35.

It should be noted that the above description regarding the process 400 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, in operations 410-430, a plurality of continuously captured positioning images as well as the 3D point cloud map associated with the imagining device may be obtained. A plurality of positioning information of the imaging device may be determined according to the plurality of positioning images and the 3D point cloud map. The final positioning information of the imaging device may be determined according to the plurality of positioning information of the imaging device.

Some embodiments of the present disclosure have proposed a visual positioning method to implement accurate positioning of the imaging device. In general, when the visual positioning is performed, a search is performed in the entire space of the 3D point cloud map according to the location of the imaging device. As the growth of a scale of the 3D point cloud map, such a search manner may increase the time-consuming of the positioning and reduce the accuracy of the positioning. To improve the efficiency and accuracy of the positioning, first the target area may be determined from the 3D point cloud map, then the positioning information may be obtained by searching in the target area. In this way, the search range of the positioning information may be narrowed from the entire 3D point cloud map to the target area, which may reduce the time-consuming of the positioning and improve the efficiency and accuracy of the positioning.

Figure 5:
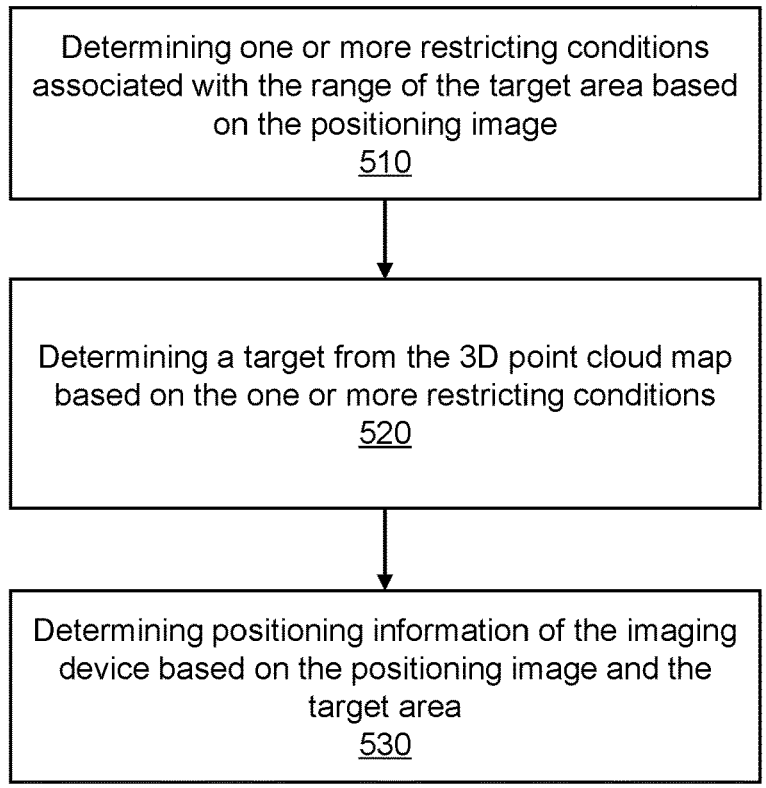
FIG. 5 is a flowchart illustrating an exemplary method for determining a target area according to some embodiments of the present disclosure.

FIG. 5 is a flowchart illustrating an exemplary method for determining a target area according to some embodiments of the present disclosure. Operation 430 in FIG. 4 may be executed according to the process 500.

In 510, one or more restricting conditions associated with the range of the target area may be determined based on the positioning image. In some embodiments, operation 510 may be performed by the determination module 320.

In some embodiments, a range of the target area may include a location, an azimuth, a spatial range of the target area in the 3D point map. The restricting conditions may be restrictions on the range of the target area. In some embodiments, the restricting conditions may be related to at least one of the scene corresponding to the positioning image, the initial estimated position of the imaging device, and the azimuth information of the imaging device.

In some embodiments, the restricting conditions may be scene restrictions when the restricting conditions are related to the scene corresponding to the positioning image. The scene restrictions may include recognizing the scene represented or described by the positioning image, and matching the scene described by the positioning image with the scene described by the 3D point cloud map to determine the target area corresponding to the positioning image. For example, if the scene described by the positioning image includes a clothing area, a dining area, a fresh food area, etc. in the mall, the target area determined by performing scene restrictions to the 3D point cloud map may be the clothing area, the dining area, the fresh food area, etc. in the mall described in the 3D point cloud map.

In some embodiments, the restricting conditions may be estimated position restrictions when the restricting conditions are related to the initial estimated position of the imaging device. The estimated position restrictions may be to determine the target area corresponding to the positioning image in the 3D point cloud map according to the initial estimated position of the imaging device. The target area determined by performing estimated position restrictions on the 3D point cloud map may be an area of arbitrary shape centered on the initial estimated position of the imaging device. For example, the target area determined by performing estimated position restrictions on the 3D point cloud map may be a circular, a rectangular, a rhombus, an ellipse, etc. centered on the initial estimated position of the imaging device.

In some embodiments, the restricting conditions may be azimuth information restrictions when the restricting conditions are related to the azimuth information of the imaging device. The azimuth information restrictions may be to determine the target area corresponding to the positioning image in the 3D point cloud map according to the azimuth information of the imaging device. For example, the target area determined by performing azimuth information restrictions on the 3D point cloud map may include an area in the 3D point cloud map that is located within a certain angle range on both sides of a moving direction of the imaging device.

In 520, the target area may be determined from the 3D point cloud map based on the one or more restricting conditions. In some embodiments, operation 520 may be performed by determination module 320.

In some embodiments, the determination module 320 may determine the target area from the 3D point cloud map based on the one or more restricting conditions. For example, the determination module 320 may determine the target area based on one or more restricting conditions of all the restricting conditions. As another example, the target area may be determined merely based on the scene restrictions. As another example, the target area may be determined based on the scene restrictions and the estimated position restrictions. As another example, the target area may be determined based on the scene restrictions, the estimated position restrictions, and the azimuth information restrictions. The present disclosure set no limitations on the selection of restricting conditions.

In some embodiments, a scene recognition may be performed to the positioning image to obtain a first area that matches the scene described by the positioning image in the 3D point cloud map. As used herein, the first area matched with the scene described by the positioning image in the 3D point cloud map may refer to an area in the 3D point cloud map where the described scene includes the scene described by the positioning image or an area in the 3D point cloud map where the described scene is the same as or similar to the scene described by the positioning image.

In some embodiments, the determination module 320 may obtain a plurality of reconstructed images for reconstructing the 3D point cloud map. Each reconstructed image may correspond to a scene, and each scene may correspond to one area of the 3D point cloud map, i.e., each reconstructed image may correspond to one area of the 3D point cloud map. The reconstructed image that matches the positioning image may be determined from the plurality of reconstructed images according to similarities between the positioning image and the plurality of reconstructed images. The first area may be determined from the plurality of areas of the 3D point cloud map based on the area corresponding to the reconstructed image that matches the positioning image. For example, the area corresponding to a reconstructed image with a maximum similarity may be determined as the first area.

In some embodiments, the first area may be obtained by processing the positioning image and the 3D point cloud map using a trained scene recognition model. For example, the positioning image and the 3D point cloud map may be input into the scene recognition model, and the scene recognition model may output the first area. The scene recognition model may be constructed based on a neural network model, and the scene recognition model may be pre-trained. More descriptions for the scene recognition model may be found in FIG. 7, and the descriptions of which are not repeated here.

In some embodiments, the determination module 320 may determine the target area based on the first area. For example, the determination module 320 may designate the first area as the target area. As another example, the determination module 320 may obtain the initial estimated position of the imaging device, and determine a second area from the first area based on the initial estimated position of the imaging device. The determination module 320 may determine the target area based on the second area.

In some embodiments, the initial estimated position of the imaging device may be obtained by a positioning module associated with the imaging device (e.g., a positioning chip in the imaging device or a positioning chip in a user terminal related to the imaging device). For example, the initial estimated position of the imaging device may be determined based on a GPS positioning signal of the imaging device.

In some embodiments, the determination module 320 may determine a geometric area including the initial estimated position in the first area of the 3D point cloud map as the second area based on the initial estimated position. For example, the second area may be an area in the first area whose distance to the initial estimated position is within a certain threshold. Further, for example, a circular area in the first area of the 3D point cloud map with the initial estimated position as the center, R as the radius may be determined as the second area. As another example, a geometric area of other shapes (e.g., a trapezoidal, an elliptical, a diamond, a triangle, a polygon, etc.) in the first area of the 3D point cloud map with the initial estimated position as the center may be determined as the second area. More descriptions for the determining of the second area may be found in FIG. 7, and the descriptions of which are not repeated here.

In some embodiments, the determination module 320 may determine the target area based on the second area. For example, the determination module 320 may designate the second area as the target area. For example, the determination module 320 may determine a third area from the second area based on the azimuth information of the imaging device. The determination module 320 may designate the third area as the target area.

In some embodiments, the azimuth information may include one or more areas along a moving direction of the imaging device. For example, the determination module 320 may map a rectangular area in the second area with the initial estimated position as a starting point, the moving direction of the imaging device as a mapping direction. A length of the rectangular area may be a length from the initial estimated position along the moving direction of the imaging device, and a width of the rectangular area may be a sum of lengths of the sides extending 90° from the starting point to the left and right sides of the moving direction. That is, the moving direction may be alongside a diagonal of the rectangular area. The rectangular area may be determined as the third area. In some embodiments, the determination module 320 may also map an area of any shape in the second area with the initial estimated position as the starting point, the moving direction of the imaging device as the mapping direction. The shape of the area may include a triangular, a diamond, an elliptical, etc., which is not limited in the present disclosure.

In some embodiments, the azimuth information of the imaging device may further include an angular range of the moving direction of the imaging device. The angular range of the moving direction of the imaging device may refer to an angular range of two sides of the moving direction of the imaging device. In some embodiments, the determination module 320 may determine the third area from the second area based on the angular range of the moving direction. In some embodiments, the determination module 320 may take the moving direction of the imaging device as a line and rotate a certain angle respectively to both sides to obtain the angular range of the imaging device movement. In the present disclosure, the angles of rotation to the two sides may be the same or different. For example, it may be rotated 30° to the left and 20° to the right. As another example, it may be rotated 40° to the left and 40° to the right. In some embodiments, the determination module 320 may determine an area within the angular range of the moving direction in the second area as the third area.

Figure 7:
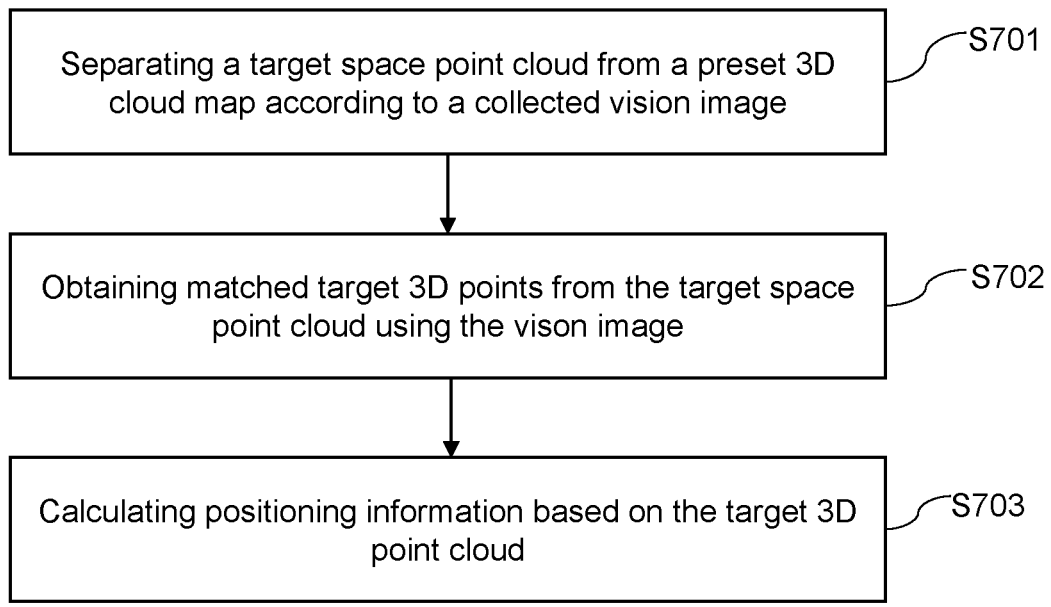
FIG. 7 is a flowchart illustrating an exemplary visual positioning method according to some embodiments of the present disclosure.
Figure 8:
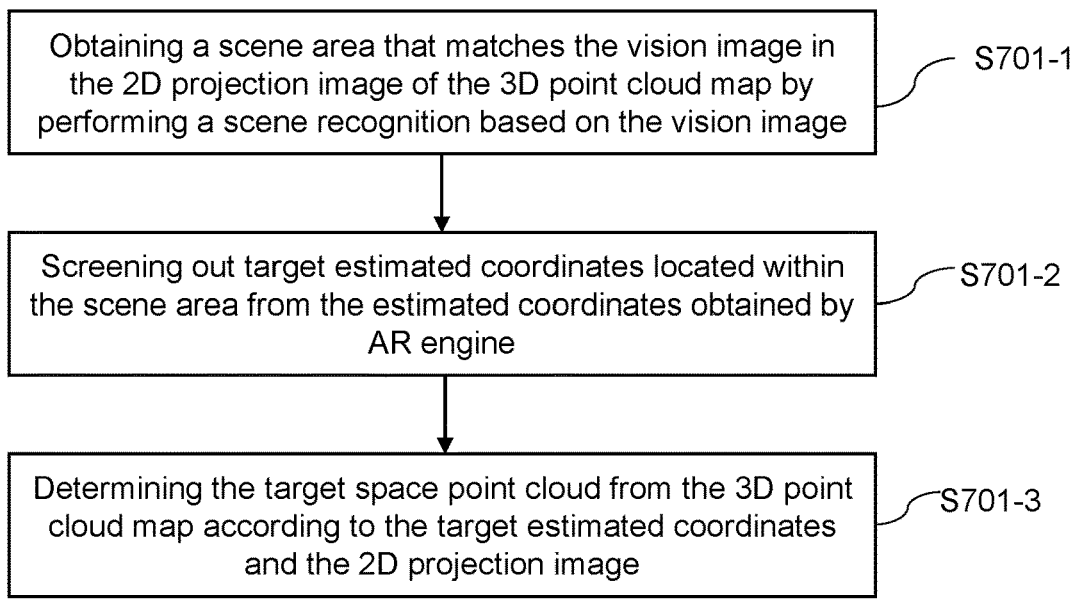
FIG. 8 is a flowchart illustrating an exemplary process of the operation S701 in FIG. 7 according to some embodiments of the present disclosure.
Figure 10:
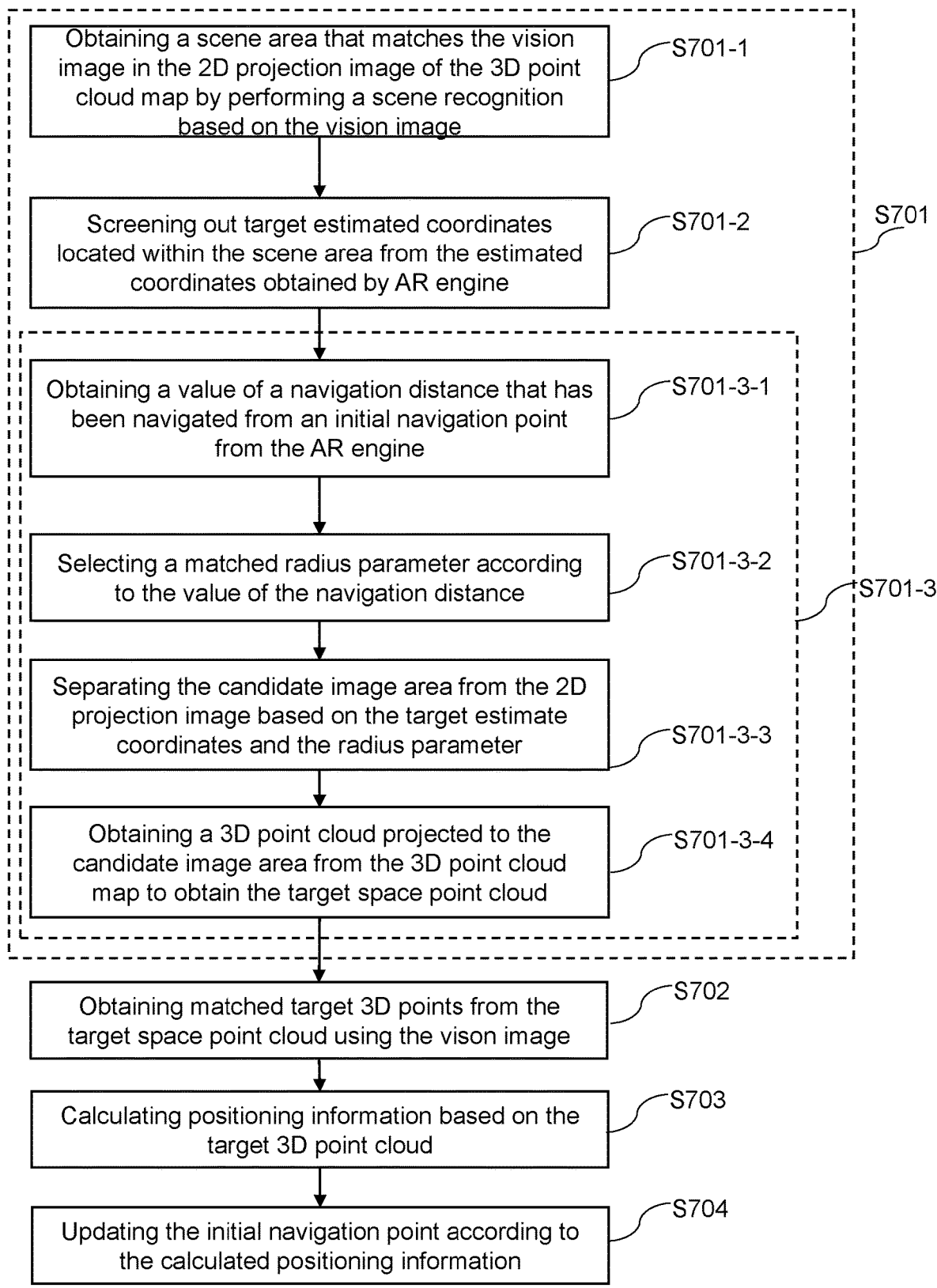
FIG. 10 is a flowchart illustrating an exemplary visual positioning method according to some embodiments of the present disclosure.

More descriptions for the determining of the target area by using one or more restricting conditions may be found in FIG. 7, FIG. 8, and FIG. 10, and the descriptions of which are not repeated here. In some embodiments, the determination module 320 may designate the third region as the target area.

In 530, positioning information of the imaging device may be determined based on the positioning image and the target area. In some embodiments, operation 530 may be performed by the determination module 320.

In some embodiments, the determination module 320 may determine the positioning information of the imaging device based on the positioning image and the target area. Specifically, the determination module 320 may extract at least one visual feature point in the positioning image. The determination module 320 may also match the at least one visual feature point with the feature points in the target area to obtain at least one feature point pair. The positioning information of the imaging device may then be calculated based on the at least one feature point pair. More descriptions for the determining of the positioning information of the imaging device based on point cloud data within the target area may be found in FIG. 7-FIG. 12, and the descriptions of which are not repeated here.

It should be noted that the above description regarding each of the flows is merely provided for purposes of illustration, and not intended to limit the scope of the present specification. For persons having ordinary skills in the art, multiple variations and modifications may be made under the teachings of the present disclosure. However, those modifications and variations do not depart from the scope of the present disclosure. For example, a plurality of positioning images may be continuously photographed, and a plurality of target areas may be determined for the plurality of positioning images based on one or more restricting conditions. An average area may be determined based on the plurality of target areas. The average area may be designated as the target area.

The method of narrowing the search space from the entire 3D point cloud map to the target area and performing visual positioning will be described in detail below.

Figure 6:
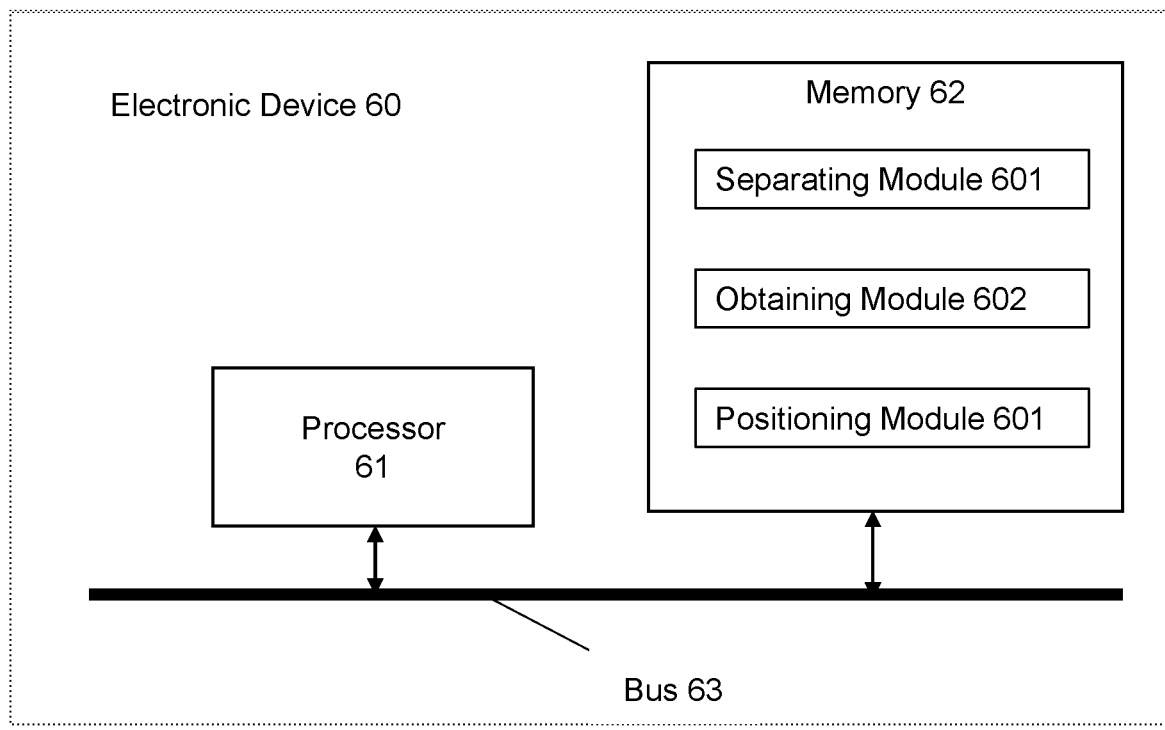
FIG. 6 is a schematic diagram illustrating an exemplary electronic device 60 according to some embodiments of the present disclosure.

FIG. 6 is a schematic diagram illustrating an exemplary electronic device 60 according to some embodiments of the present disclosure. In some embodiments, the electronic device 60 may include a server 110, a first user terminal 120, or a second user terminal 140 and other calculating devices.

The electronic device 60 may include a processor 61, a memory 62, and a bus 63. The memory 62 may store machine-readable instructions which may be executed by the processor 61 (e.g., executing instructions corresponding to a separating module 601, an obtaining module 602, or a positioning module 603 of the device in FIG. 12), when the electronic device 60 runs, the processor 61 and the memory 62 communicates through the bus 63.

It may be understood that the electronic device 60 for applying visual positioning method mentioned in the embodiments of the present disclosure may be the server 110, or the first user terminal 120 and/or the second user terminal 140, or a combination of the server 110 and a user terminal (e.g., the first user terminal 120 or the second user terminal 140). That is, the visual positioning method provided by the embodiments of the present disclosure may be executed by the user terminal, or may be executed by the server 110, and may also be executed by the server 110 and the user terminal.

For example, when the method is executed by the user terminal (e.g., the first user terminal 120 or the second user terminal 140), after the user terminal responds to the user's request, the server 110 may request obtaining the 3D point cloud map corresponding to the current environment (e.g., the area where the imaging device is located). The visual positioning method provided by the embodiments of the present disclosure may be executed based on the 3D point cloud map. As another example, when the method is executed by server 110, after the server 110 receives a feedback of visual positioning request of the user terminal, the server 110 may execute the visual positioning method provided by the embodiments of the present disclosure according to a vision image (or positioning image) fed back from the user terminal or a vision image collected by the other image collection devices carried by a positioner. As still another example, when the method is co-executed by the server 110 and the user terminal, after responding to the request of the user, the user terminal may collect a vision image and send it to the server 110. The server 110 may execute the visual positioning and send the positioning result to the user terminal for display. In this way, the server 110 and the user terminal co-work to execute the visual positioning method provided by the embodiments of the present disclosure.

Referring to FIG. 7, FIG. 7 is a flowchart illustrating an exemplary visual positioning method according to some embodiments of the present disclosure. As shown in FIG. 7, the process 700 includes the following operations.

In S701, a target space point cloud may be separated from a preset 3D point cloud map according to a collected vision image.

In S702, matched target 3D points may be obtained from the target space point cloud using the vision image.

In S703, positioning information may be calculated based on the target 3D point cloud.

The above vision image may be an image collected by an image collection device placed in a location where a positioner is located. For example, the image collection device may be the first user terminal 120 and/or the second user terminal 140 held by the positioner. As another example, the image collection device may be the camera carried by the positioner to communicate with the electronic device 60.

The preset 3D point cloud map may be a 3D reconstruction map model required in the AR navigation service. The preset 3D point cloud map may be a 3D model corresponding to a navigation environment where AR navigation may be implemented. The preset 3D point cloud map may be generated in advance by 3D reconstruction and stored in the electronic device 60. It may be understood that, in some embodiments, navigable environment would expand continuously with demands of users. With the expansion of the navigable environment, the preset 3D point cloud map will update accordingly, and the scale of the preset 3D point cloud map will be augmented as well. For example, for navigation scenes such as an airport or a train station, etc., with the expansion or transformation of the airports or train stations, the corresponding preset 3D point cloud map will be updated, and the scale of the corresponding preset 3D point cloud map will be augmented as well.

Alternatively, the above-described way of generating the preset 3D point cloud map may include collecting information of images to be reconstructed (equivalent to the 2D image in FIG. 4, or the reconstructed image in FIG. 5) in a plurality of angles of a plurality of positions in the navigable environment, performing 3D reconstruction based on the collected information of the images to be reconstructed, and obtaining the preset 3D point cloud map representing the navigable environment. In some embodiments, the preset 3D point cloud map may be obtained by performing 3D reconstruction using a trained neural network model based on the collected information of the images to be reconstructed. In some embodiments, the trained neural network model may be obtained by training an initial neural network model based on training samples. A training sample may include an image to be reconstructed, which may be used as an input for training the initial neural network module. The training sample may further include a reconstructed 3D point cloud map corresponding to the image to be reconstructed. The reconstructed 3D point cloud map may be used as a label (i.e., an expected output) to train the initial network model to obtain the trained neural network model.

The target space point cloud may be a portion of the preset 3D point cloud map, and also a portion of the preset 3D point cloud map related to the vision image according to an evaluation. For example, if the preset 3D point cloud map is a 3D model, the target space point cloud may be a portion of the preset 3D point cloud map related to the vision image in any direction or any size in the 3D model. The target space point cloud may also be referred to as the target area.

The target 3D points may be 3D points in the target space point cloud corresponding to visual feature points in the vision image. It may be understood that the target space point cloud and the preset 3D point cloud map may be both formed by 3D points.

The positioning information may be information used to represent the position and posture of the positioner. For example, the information may include pose information and location coordinates.

In the embodiment of the present disclosure, the target space point cloud may be firstly determined from the preset 3D point cloud map quickly through the visual image, and then the matched target 3D points may be obtained from the target space point cloud using the visual image. Finally, the corresponding positioning information may be calculated using the target 3D points. That is, by narrowing the search range of target 3D points from the entire preset 3D point cloud map to the target space point cloud, the time consumption of searching the target 3D points may be shortened and the accuracy of the searched target 3D points may be improved, thereby improving the efficiency and accuracy of the positioning.

For the convenience of understanding, the following describes an instance that a user uses a mobile device (e.g., a mobile phone) for AR navigation.

A 3D point cloud map corresponding to the navigable environment may be stored in the mobile device. In the process of the AR navigation service, at each preset time interval, a real-time picture in the vision of the camera of the mobile device may be used as a vision image. The target space point cloud used for searching the target 3D points may be determined using the vision images. Then the matched target 3D points may be searched from the target space point cloud using the vision image, so that the target 3D points may be used to calculate the pose information and the position coordinate of the current positioning of the user. Thus, the mobile device may quickly obtain the relatively accurate positioning information of the user to ensure the accuracy and fluency of the AR navigation service.

Specific details of the embodiments of the present disclosure are described as follows.

The purpose of the operation S701 is to obtain a space point cloud that is associated with the vision image and that is as small as possible. In order to achieve this purpose, the operation S701 may be implemented in any of the following ways.

The first implementation way may include one or more of the following operations. a scene recognition may be performed based on the vision image to determine the target space point cloud. That is, the space point cloud related to the vision image may be determined from the 3D point cloud map using a scene recognition technology.

Alternatively, a scene area (also referred to as the first area) matched with the vision image may be determined from a 2D projection image of the 3D point cloud map by performing a scene recognition to the vision image. The scene area may be designated as the target area, and the space point cloud formed by the 3D points mapped to the target area may be designated as the target space point cloud.

The 2D projection image may be a projection image obtained by projecting all the 3D points in the 3D point cloud map to a horizontal plane (i.e., coordinates of all 3D points in the Z-axis direction are the same or are 0 after projection). Each image coordinate in the 2D projection image (i.e., each coordinate point in the 2D image) corresponds to a plurality of 3D points in the same Z direction (i.e., horizontal geographic locations of the plurality of 3D points corresponding to each image coordinate are the same, while their locations in the vertical direction are different). The image coordinates in the 2D projection image may correspond to location coordinates in the navigable environment. It may be understood that each image coordinate in the 2D projection image may correspond to all 3D points in the navigable environment in which the 3D point cloud map may be represented by 3D points with the corresponding location coordinates (i.e., the same position on X-axis and Y-axis).

The 2D projection image may be divided into a plurality of image areas in advance, and the 3D points corresponding to each image area may represent a part of the real scene in the navigable environment. For the convenience of description, an image area of the 2D projection image may be referred to as a scene area. In some embodiments, a manner for dividing the 2D projection image may include a shape division, a terrain division, a functional division, etc. The shape division may be to divide the 2D projection image according to the shape of the geographic area. For example, the 2D projection image may be divided into round residential areas, square schools, elliptical malls, etc. The terrain division may be to divide the 2D projection image into different areas according to altitudes of the 3D points corresponding to the image coordinates of the 2D projection image. For example, the 2D projection image may be divided into different areas according to vertical coordinates −50~0 meters, 0~10 meters, 10~20 meters, 20~30 meters, etc., of the 3D points. The functional division may be to divide the 2D projection image according to functions of different areas. For example, the 2D projection image may be divided into a catering area, a clothing area, a daily supermarket, a public channel area, etc. As another example, when the navigable environment is a mall which includes a shop A, a shop B, a shop C, and a public channel D, etc., then the 2D projection image corresponding to the 3D point cloud map may be divided into scene areas A, B, C and D in advance. The 3D points projected in the scene area A may represent the shop A, the 3D points projected in the scene area B may represent the shop B, the 3D points projected in the scene area C may represent the shop C, and the 3D points projected in the scene area D may represent the public channel D.

In some embodiments, the ways of performing the scene recognition on the vision image to obtain the scene area may include any of the following ways.

1) The Scene Recognition May be Performed Using Similarities Between Images

First, a reconstructed image (i.e., a 2D image) corresponding to each scene area may be obtained. It may be understood that a reconstructed image may be an image for reconstructing the 3D point cloud map, and the reconstructed image corresponding to the scene area may include an image for reconstructing 3D points projected in the scene area. The reconstructed image corresponding to the scene area may be a portion of the image for reconstructing the 3D point cloud map.

Next, similarities between the vision image and the reconstructed images may be calculated. For example, vector distance values between feature vectors corresponding to the vision image and the reconstructed images may be calculated. the vector distance values may be determined as the similarities between the vision image and the reconstructed images. Methods for calculating vector distance values may include a projection contrast, a block comparison, etc. As another example, the similarities between the vision image and the reconstructed images may also be calculated and determined by pixel points comparison and gravity center comparison, etc.

Finally, the target area may be determined from the plurality of scene areas according to the similarities between the vision image and the reconstructed images. For example, a scene area corresponding to a reconstructed image with a maximum similarity may be designated as the target area. As another example, a scene area corresponding to a reconstructed image with a maximum of an average of similarities determined using different methods may be designated as the target area.

2) The Scene Recognition May be Performed Using a Neural Network Model:

First, the scene recognition model may be obtained. The scene recognition model may be used to distinguish scene areas. It may be understood that the scene recognition model may be obtained by training a selected neural network model in advance. Alternatively, the training of the scene recognition model may include the following operations. Reconstructed images for reconstructing 3D point cloud map may be determined as sample images. A scene area corresponding to each reconstructed image may be taken as a corresponding sample label of the sample image. The neural network model may be trained using the sample images to obtain the scene recognition model for categorizing scene areas.

Second, the vision image may be input into the scene recognition model, and the scene area output from the scene recognition model may be determined as the target area.

The second implementation way may include one or more of the following operations. the second way may further reduce the scale of space point cloud related to the vision image on the basis of the first implementation way to further improve the matching accuracy and matching speed. Specifically, the reducing of the scale of space point cloud may be implemented in the following way.

Alternatively, FIG. 8 is a flowchart illustrating an exemplary process of the operation S701 in FIG. 7 according to some embodiments of the present disclosure. As shown in FIG. 8, the operation S701 may include the following operations.

In S701-1, a scene area (i.e., the first area) that matches the vision image in the 2D projection image of the 3D point cloud map may be obtained by performing a scene recognition based on the vision image. The operation S701-1 may be similar to or the same as the operation for performing the scene recognition to the vision image to obtain the scene area described in the first implementation way of the operation S701 of the process 700 as illustrated in FIG. 7, the descriptions of which are not repeated here.

In S701-2, one or more target estimated coordinates located within the scene area may be screened out from estimated coordinates obtained by AR engine positioning.

The AR engine may be an AR core (e.g., Arkit, Arcore, EASYAR) installed in the electronic device 60. When the AR engine is providing AR navigating service, it may provide a real-time estimated location coordinate and estimated pose information of the imaging device, and take the image coordinate corresponding to the real-time estimated location coordinate in the 2D projection image as the estimated coordinate. In some embodiments, at least one estimated coordinate may be obtained through the AR engine during each positioning period.

It may be understood that the accuracy of the estimated coordinate provided by the AR engine is unstable. That is, it may happen that adjacent two estimated coordinates output by the AR engine may jump within the 2D projection image, that is, the estimated coordinate with a relatively great deviation with the real location may appear. Therefore, limiting the target estimated coordinate within the target area may reduce the impacts of instability of the accuracy of estimated location coordinate provided by the AR engine.

Using the target area as a condition to screen target estimated coordinates to avoid impacts on the accuracy of the target space point cloud obtained due to the unstable accuracy of the location coordinates provided by the AR engine.

Of course, when operation S701-2 is executed, the situation may occur that the target estimated coordinates are not obtained. That is, the estimated coordinates obtained through the AR engine during the current period do not belong to the target scene area. In response to this situation, when the obtained estimated coordinates do not belong to the target scene area, it may be determined that positioning failed in the current period and the process is ended, to wait for the start of the next positioning process. It may be understood that the process of visual positioning is periodic, with fairly short intervals. Therefore, determining the occurrence of positioning failure in the current period in operation S701-2 and ending the process may reduce the time consumption of the positioning so that the next period of visual positioning may start. Therefore, the user experience may not be affected and the accuracy of the visual positioning may be ensured.

In S701-3, the target space point cloud may be determined from the 3D point cloud map according to the target estimated coordinates and the 2D projection image.

In some embodiments, the above way of determining target space point cloud from the 3D point cloud map according to the target estimated coordinates and the 2D projection image may include determining a candidate image area from the 3D point cloud map (i.e., a second area). The candidate image area may be designated as the target area, and then designating the space point cloud formed by the 3D points projected in the second area as the target space point cloud.

Through the operations S701-1 to S701-3, the two restricting conditions of scene recognition and estimating coordinates may be combined. The target space point cloud may be determined from the 3D point cloud, which may ensure the relativity of obtained target space point cloud and the vision image, and in the meantime reduce the scale of the target space point cloud.

It may be understood that the more accurate the candidate image area is, the more accurate the determined target space point cloud may be. The accuracy of the candidate image area is mainly reflected in a plurality of aspects, such as location and size, etc.

On the one hand, the accuracy of the location of the candidate image area may be ensured by the target estimated coordinates.

Alternatively, to ensure that the location of the candidate image area is accurate enough, when there is only one target estimated coordinate, the candidate image area (or the second area) may be determined from the 2D projection image with the target estimated coordinate as its base point. For example, the candidate image area may be a circular image area determined in the 2D projection image with the corresponding image coordinate in the 2D projection image as its center. As another example, the candidate image area may be an image area of any shape (e.g., a polygon, an oval, an irregular shape) determined in the 2D projection image with the corresponding image coordinate in the 2D projection image as its center.

Alternatively, in order to ensure the accuracy of the location of candidate image area, when there are a plurality of target estimated coordinates, the candidate image area may be determined from the 2D projection image with an average value of the target estimated coordinates as its base point. For example, the image area may be a circular image area determined in the 2D projection image with the corresponding average value of the plurality of target estimated coordinates in the 2D projection image as its center. As another example, the candidate image area may be an image area of any shape (e.g., a polygon, an oval, an irregular shape) determined in the 2D projection image with the corresponding average value of the plurality of target estimated image coordinates in the 2D projection image as its center.

On the other hand, the size of the candidate image area may be determined by an area radius or a length between the center and each boundary of the candidate image area.

In some embodiments, the size of the determined candidate image area from the 2D projection image may be fixed. That is, an applicable area radius may be obtained as a radius parameter through mass tests. Thus, after the base point is obtained, a candidate image area including the base point may be obtained according to the radius parameter. For example, with the base point as the center, the radius parameter as the radius, a circular image area may be obtained in the 2D projection image and designated as the candidate image area. As another example, through mass tests, a suitable shape and size (e.g., an area, lengths between the center and the boundaries, etc.) of candidate image area may be obtained and determined as the reference shape and the reference size. Thus, after the base point is obtained, a candidate image area including the base point may be obtained according to the reference shape and the reference size.

In some embodiments, in order to improve the self-adaptiveness, the size of the candidate image area determined from the 2D projection image may not be fixed. That is, a plurality of applicable area radii may be obtained by mass tests. After the base point is obtained, the matched radius parameters may be obtained from the plurality of areas radii, and a candidate image area including the base point may be obtained according to the radius parameters.

In some embodiments, a rectangular image area with a size of Mm×Nm is also obtained in the 2D projection image with the base point as the area center may be determined as the candidate image area. Where M and N may be positive (e.g., 5, 10, 20, 50, 100, 500). The candidate image area may also be of other shapes or sizes, which is not limited in the present disclosure. The following will perform specification on the candidate image area using radius parameter as a specific implementation way.

Figure 9:
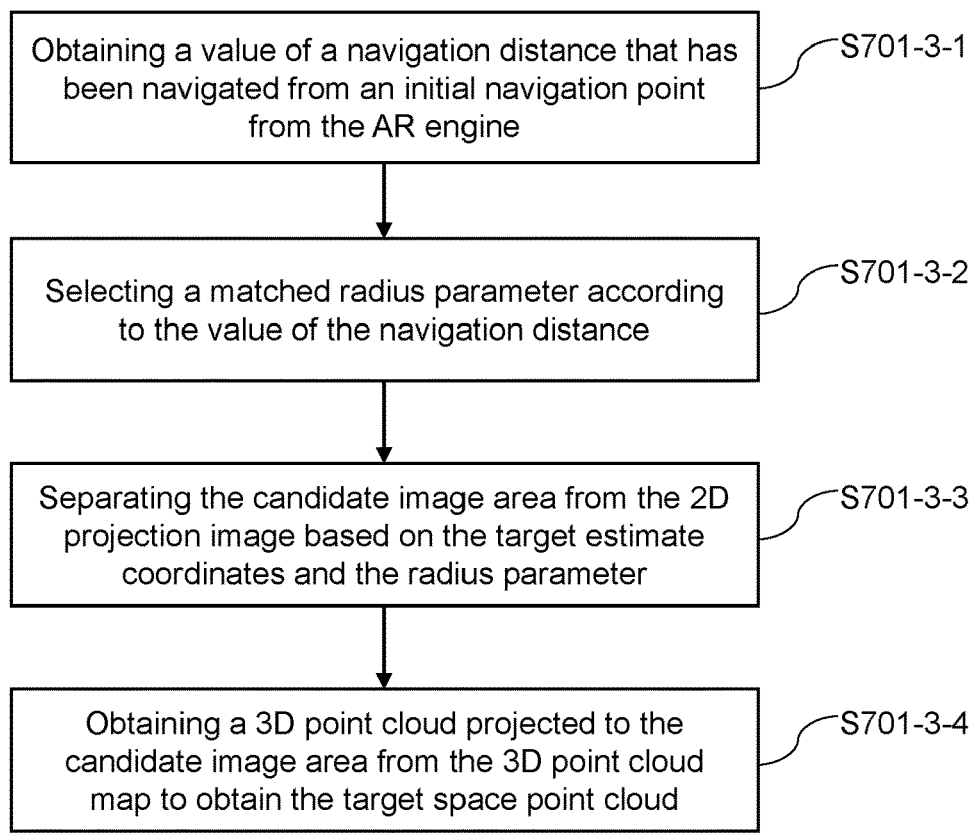
FIG. 9 is a flowchart illustrating an exemplary process of the operation S701-3 in FIG. 7 according to some embodiments of the present disclosure.

In some embodiments, to ensure the relativity between the target space point cloud corresponding to the candidate image area and the vision image, a matched radius parameter may be determined according to a navigation distance that has been navigated. The farther the navigation distance that has been navigated is, the larger a cumulative deviation of the positioning may be. In order to ensure the accuracy of the selected candidate image area, the corresponding radius parameter needs to be larger. FIG. 9 is a flowchart illustrating an exemplary process of the operation S701-3 in FIG. 7 according to some embodiments of the present disclosure. As shown in FIG. 9, the operation S701-3 may include the following operations.

In S701-3-1, a value of a navigation distance that has been navigated from an initial navigation point may be obtained from the AR engine.

The value of the navigation distance that has been navigated may be a value of a navigation distance starting from the initial navigation point output from AR engine.

In S701-3-2, a matched radius parameter may be selected according to the value of the navigation distance.

In some embodiments, a plurality of distance intervals may be separated, and each distance interval may correspond to a radius parameter. It may be understood that the larger the distance value corresponding to the distance interval is, the greater the corresponding radius parameter is. Therefore, the matched radius parameter may be selected through determining the distance interval to which the value of the navigation distance belongs. For example, the radius parameter corresponding to 0-1 meters is R, the radius parameter corresponding to 1-2 meters is 2R, and the radius parameter corresponding to 3-4 meters is 3R. If the navigation distance from the initial navigation point output from the AR engine is 2 meters, the matched radius parameter may be 2R. In some embodiments, the value of the navigation distance may form a linearly related correspondence with the radius parameter. For example, the value of the navigation distance equals a multiplies the radius parameter, a is a positive number greater than 2.

In S701-3-3, the candidate image area may be separated from the 2D projection image based on the target estimate coordinates and the radius parameter.

In S701-3-4, a 3D point cloud projected to the candidate image area may be obtained from the 3D point cloud map to obtain the target space point cloud.

In some embodiments, the initial navigation point may be a starting location point of the electronic device 60 to enable the AR navigation.

In some other embodiments, the initial navigation point may further be a location point successfully obtained by the previous visual positioning. FIG. 10 is a flowchart illustrating an exemplary visual positioning method according to some embodiments of the present disclosure. As shown in FIG. 10, the visual positioning method may further include the following operations.

in S704, the initial navigation point may be updated according to the calculated positioning information.

Thus, the value of the navigation distance may be calculated from the updated initial navigation point in the next visual positioning, which may avoid the possible occurrence of unnecessary enlargement of the candidate image area when adopting self-adaptive radius parameter selection mechanisms. The next visual positioning process may be similar to the previous visual positioning process. More specific descriptions may be found in operations S701-S703, and the descriptions of which are not repeated here.

The third implementation way may further reduce the scale of the target space point cloud on the basis of the second implementation way. A difference between the third implementation and the second implementation way is that the above implement way of determining the target area from the 2D projection image according to the target estimated coordinates includes the following operations.

(1) The candidate image area may be separated from the 2D projection image according to the target estimate coordinates and the radius parameter. For example, a circular image area may be separated based on the target estimated coordinates and the radius parameter.

(2) The moving direction of the electronic device 60 may be obtained. For example, the moving direction may be a speed direction perceived by a magnetic gauge installed in the electronic device 60.

(3) A target direction angle may be determined based on the moving direction. It may be understood that there may also be deviations in the moving direction provided by electronic device 60. To reduce the deviations, the target direction may be determined based on the moving direction. The target direction angle is used to represent a possible directional range of the actual moving direction. In some embodiments, the movement direction may be determined as the centerline, and a second direction and a third direction may be obtained by rotating to both sides by a certain angle. The angle between the second direction and the third direction may be designated as the target direction angle. For example, if an angle between the moving direction and a preset first direction is 90°, the designated angle is 60°, then the angle between the first direction and the second direction is 30°, and the angle between the first direction and the third direction is 150°, thus, the angle between 30° and 150° compared to the first direction may be determined as the target direction angle. In some embodiments, the preset first direction may be any direction or may be a specific direction (e.g., northward). In some embodiments, the angle between the second direction and the moving direction and the angle between the third direction and the moving direction may be the same, or may be different. That is, taking the moving direction as the centerline, the designated angle rotated to both sides may be the same, or may be different.

(4) The target area may be separated from the candidate image area with the target direction angle as a central angle. Alternatively, taking the base point determined according to the target estimated coordinates in the candidate image area as a fixed point of the central angle, the range of the central angle in the candidate image area may be determined as the target area. For example, taking the target direction angle as the central angle, the center of the circular image area as the fixed point of the central angle, a sector target area may be separated from the circular image area.

The purpose of the operation S702 is to obtain 3D points for calculating positioning information from the target space point cloud. Alternatively, the operation S702 may include extracting visual feature points in the vision image; obtaining 3D points that match the visual feature point from the target space point cloud to be used as the target 3D points. In some embodiments, the methods for extracting visual feature points may include but not limited to a scale-invariant feature transform (SIFT) method, a graphics processing unit method, a scale-invariant feature transform (siftGPU) method, an oriented fast and rotated brief (ORB) method, and other extracting ways. It may be understood that the way for obtaining the 3D points that match the visual feature points may include calculating a distance between a feature vector corresponding to each 3D point and a feature vector corresponding to each visual feature point, and determining the matched target 3D points based on the distance. In some embodiments, the target 3D points that match the visual feature points may be obtained from the target space point cloud using a method such as a word-bag tree or a violent match, etc.

Apparently, when a data count of 3D points in the 3d point cloud map is huge, there may be huge workload using the relative visual positioning method (e.g., directly comparing the visual feature points with each 3D point), which may increase time consumption and deviations for the matched target 3D points.

The operation S703 may calculate the pose information and the location coordinate of the electronic device 60 according to the target 3D points and take them as the positioning information. The methods may include, but are not limited to, a RANSAC algorithm, a P3P solution, a direct linear transformation method, etc.

In the embodiments of the present invention, the visual positioning uses multiple conditions to restrict the search range of target 3D points to a comparatively small target space point cloud associated with the vision image. The restricting conditions used may be priori information provided by the AR engine which is easy to obtain.

Figure 11:
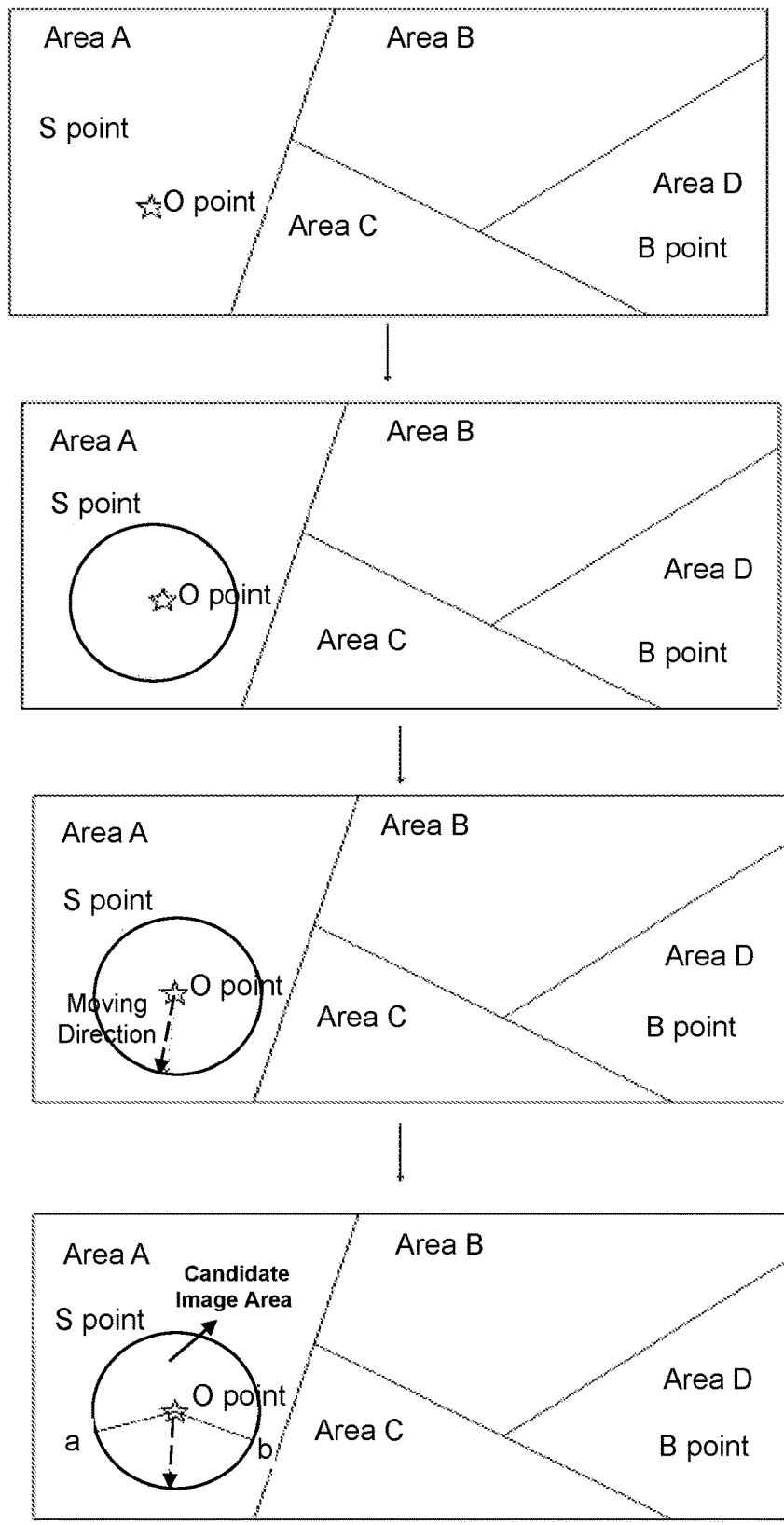
FIG. 11 is a schematic diagram illustrating an exemplary 2D projection image according to some embodiments of the present disclosure.

The visual positioning method will be described below in conjunction with FIG. 11. FIG. 11 is a schematic diagram illustrating an exemplary 2D projection image according to some embodiments of the present disclosure. It should be noted that in the FIG. 11, a user needs to navigate from an S point to an E point, and the visual positioning may be performed periodically with t as a time interval during the AR navigation process.

In S1, a frame of vision image may be captured at time point 2t.

In S2, a scene area corresponding to the vision image may be determined as an area in FIG. 11 by performing a scene recognition.

In S3, an estimated coordinate provided by an AR engine may be obtained, and if the estimated coordinate is located in an area (e.g., the estimated coordinate is an 0 point in an area), operation S4 may be performed.

In S4, a value of the navigation distance that has been navigated starting from an initial navigation point may be obtained from the AR engine. If the positioning is not successful at the time point t, the value of navigation distance that has been navigated may be the value of the navigation distance starting from the S point. If the positioning is successfully at the time point t, and the positioning point is A point (not shown in FIG. 11), the value of the navigation distance that has been navigated may be the distance value of the navigation distance that has been navigated from the A point.

In S5, a matched radius parameter may be selected according to the navigation distance that has been navigated.

In S6, a circular candidate image area (e.g., the circular area in an area shown in FIG. 11) with O point as the center and the radius parameter as the radius may be obtained.

In S7, a moving direction of the electronic device 60 may be obtained.

In S8, a second direction Oa and a third direction Ob in the two sides of the moving direction with O point as a vertex and the moving direction as a central line may be determined.

In S9, an angle aOb may be determined as a center angle, and an arc area corresponding to the angle aOb in the candidate image area may be determined as the target area.

In S10, a 3D point cloud constructed by the 3D points projecting in the target area may be determined as the target space point cloud.

In S11, visual feature points may be extracted from the vision image.

In S12, the target 3D points matched with the visual feature points may be selected in the target space point cloud using a word-bag tree matching method.

In S13, pose information and a positioning coordinate of the current user may be calculated based on the target 3D points.

Based on the same invention conception, the embodiments of the present disclosure further provide a visual positioning device 600 corresponding to the visual positioning method. As the principle of problem-solving of the visual positioning device in the embodiments of the present disclosure is similar to that of the visual positioning method, the embodiments of the device may refer to the embodiments of the method, which will not be repeated here.

Figure 12:
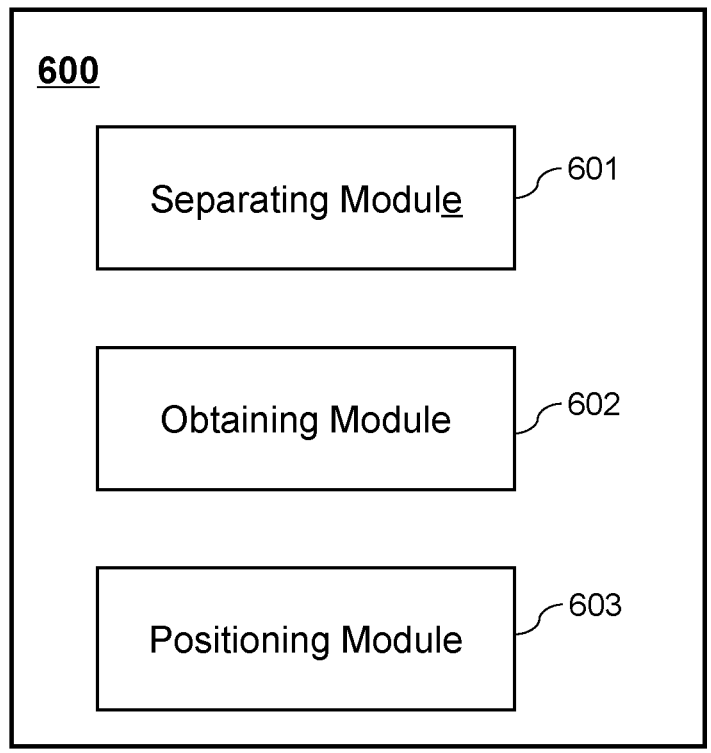
FIG. 12 is a schematic diagram illustrating an exemplary visual positioning device 600 according to some embodiments of the present disclosure.

FIG. 12 is a schematic diagram illustrating an exemplary visual positioning device 600 according to some embodiments of the present disclosure. As shown in FIG. 12, the visual positioning device 600 may include a separating module 601, an obtaining module 602, and a positioning module 603. The visual positioning device 600 may be one or more other modules in FIG. 3 except the obtaining module 310 and the determination module 320, or may be the determination module 320 in processing device 112.

The separating module 601 may be configured to separate a target space point cloud from a preset 3D point cloud map according to a collected vision image.

The obtaining module 602 may be configured to obtain matched target 3D points from the target space point cloud using the vision image.

The positioning module 603 may be configured to calculate positioning information based on the target 3D points.

In a possible embodiment, the separating module 601 may include a recognition sub-module, a screening sub-module, and a determination sub-module.

The recognition sub-module may be configured to obtain a scene area that matches the vision image in a 2D projection image of the 3D point cloud map by performing a scene recognition based on the vision image.

The screening sub-module may be configured to screen out target estimated coordinates in the scene area from estimated coordinates obtained by AR engine positioning.

The determination sub-module may be configured to determine the target space point cloud from the 3D point cloud map according to the target estimated coordinates and the 2D projection image.

In some embodiments, the determination sub-module may be further configured to perform the following operations.

The determination sub-module may obtain a value of a navigation distance that has been navigated from an initial navigation point from the AR engine.

The determination sub-module may select a matched radius parameter according to the value of the navigation distance. The radius parameter may be proportional to the value of the navigation distance.

The determination sub-module may separate a candidate image area from the 2D projection image based on the target estimated coordinates and the radius parameter.

The determination sub-module may obtain a 3D point cloud projected to the candidate image area from the 3D point cloud map to obtain the target space point cloud.

In some embodiments, the visual positioning device 600 may also include an updating module.

The updating module may be configured to update the initial navigation point according to the calculated positioning information so that the value of the navigation distance may be calculated from the new initial navigation point in the next visual positioning.

In some embodiments, the determination sub-module may be further configured to perform the following operations.

The determination sub-module may separate a circular image area from the 2D projection image according to the target estimated coordinates and the radius parameter.

The determination sub-module may obtain the moving direction of the electronic device 60;

The determination sub-module may determine the target direction angle based on the moving direction;

The determination sub-module may separate the candidate image area from the circular image area with the target direction angle as the central angle.

In some embodiments, the 2D projection map includes a plurality of scene areas, the recognition sub-module may be further configured to perform the following operations.

The recognition sub-module may obtain the reconstructed image corresponding to each of the scene areas. A reconstructed image may be an image used to reconstruct the 3D points projected in the scene area.

The recognition sub-module may determine the target scene area from the plurality of scenes areas according to the similarities between the vision image and the reconstructed images.

In some embodiments, the electronic device 60 stores a scene recognition model. The scene recognition model may be configured to recognize the scene area, and the recognition sub-module may be further configured to perform the following operation.

The recognition sub-module may obtain the target scene area by categorizing the vision images using the scene recognition model.

In some embodiments, the obtaining module 602 may include an extracting sub-module and a matching sub-module.

The extracting sub-module may be configured to extract visual feature points in the vision image.

The matching sub-module may be configured to obtain the 3D points matched with the visual feature points from the target space point cloud, which may be determined as the target 3D points.

In some embodiments, the positioning module 603 may be further configured to perform the following operation.

The positioning module 603 may calculate pose information and a location coordinate of the electronic device 60 according to the target 3D points, which may be determined as the positioning information.

Descriptions about the processing flows of each module and the interaction flows between the modules in the visual positioning device may be referred to in the related descriptions in the method embodiments, which will not be described in detail herein.

The embodiments of the present disclosure further provide a computer readable storage medium, which stores computer programs. When the program is executed by the processor 61, it executes the operations of the visual positioning method.

Specifically, the storage medium may be a general storage medium such as a removable disk, a hard disk etc. When the computer programs on the storage medium is executed, the visual positioning method may be executed to solve problems of long-time consumption and low positioning accuracy when the 3D point cloud map too complex and the scale of the 3D point cloud map is too large, so as to shorten the time of visual positioning and ensure the accuracy of the positioning, thereby ensuring the correctness and fluency of the AR navigation and improving the user experience.

Some embodiments of the present disclosure have proposed a visual positioning method. In some embodiments, a semantic annotation may be performed on a 2D image, and a semantic 3D point cloud map may be obtained based on a relationship between the 2D image and the 3D point cloud map. The processing device may perform feature extractions on the 2D image to obtain a plurality of feature points. The plurality of feature points extracted from the 2D image may be matched with the semantic 3D point cloud map to obtain feature point pairs. The obtained feature point pairs may be determined as a solution set to perform a pose calculation. The solution set may be calculated iteratively using a random sampling consensus algorithm, and the pose and interior points corresponding to each iteration may be obtained. A pose and a position corresponding to an iterative calculation with the most interior points among the iterative calculations may be determined as the positioning information of the imaging device.

Figure 13:
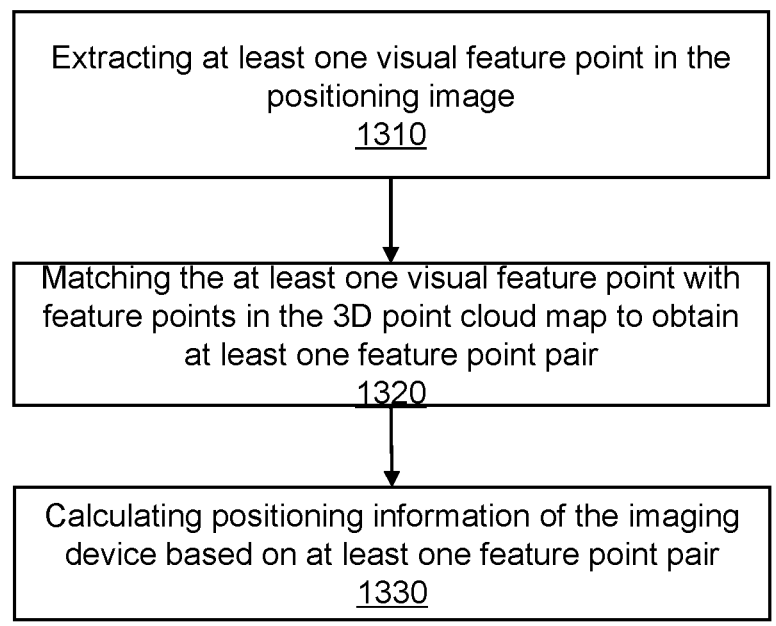
FIG. 13 is a flowchart illustrating an exemplary method for determining positioning information according to some embodiments of the present disclosure.

FIG. 13 is a flowchart illustrating an exemplary method for determining positioning information according to some embodiments of the present disclosure . . . .

In 1310, at least one visual feature point may be extracted in the positioning image.

A visual feature point refers to a feature point in the image that may be recognized and processed by the processing device (e.g., the processing device 112 or the determination module 320). The feature point may be a point representing image features. For example, the feature point may be a point where the image grayscale value is severely changed or a point in the edge of the image with a large curvature. For example, the visual feature points may include feature points extracted using a histogram of oriented gradient (HOG), a scale-invariant feature transform (SIFT), a graphics processing unit, a scale-invariant feature transform (siftGPU), a speeded up robust feature (SURF), an oriented fast and rotated brief (ORB), local binary pattern (LBP), a Haar-like features (HAAR), etc. In some embodiments, the processing device may extract the at least one visual feature point of the positioning image. In some embodiments, the methods for extracting the visual feature points may include but not limited to a scale-invariant feature transform (SIFT) method, a graphics processing unit method, a scale-invariant feature transform (siftGPU) method, an oriented fast method, a rotated brief (ORB) method, etc.

In 1320, the at least one visual feature point may be matched with feature points in the 3D point cloud map to obtain at least one feature point pair.

In some embodiments, the 3D point cloud map may include a semantic 3D point cloud map. Further the processing device may match the visual feature points extracted from the positioning image with the feature points in the semantic 3D point cloud map to obtain at least one feature point pairs.

In some embodiments, the processing device may determine a target area from the 3D point cloud map, and match the visual feature points with the feature points of the target area in the semantic 3D point cloud map to obtain at least one feature point pair. The matching methods may include, but are not limited to, a word-bag tree matching, a violent matching, etc. The feature point pair represents a pair of feature points composed of a visual feature point in the positioning image and a feature point in the corresponding semantic 3D point cloud map. The two feature points in this pair of feature points may indicate a same object or a same part of an object.

A semantic 3D point cloud map refers to a 3D point cloud map including semantic information of reference objects. A semantic 3D point cloud map may also be referred to as a 3D point cloud map with a semantic annotation. As used herein, a semantic annotation refers to identifying reference objects in an image (e.g., a 2D image or a 3D point cloud map) and annotating semantic information of the reference objects. The semantic information of the reference objects may include coordinate information of the reference objects, attribute information of the reference objects, etc. Reference objects may include objects with high identification (e.g., signs) in the scene. As used herein, the identification may represent or reflect differences between different objects. If an object in the scene is significantly different from other objects in the scene, for example, the differences between the object and other objects are greater than a certain threshold, it may be considered that the object has a high identification, and it may be designated as a reference object. In some embodiments, the reference objects may include signs, billboards, shop logos, etc. Attribute information of a reference object represents feature attributes of the reference object. The reference objects may include signboard cards. For example, the attribute information of a reference object may include a billboard, a brand of the billboard, an area of the billboard, a type of advertisement (e.g., a public service advertisement, a commercial advertisement, etc.).

A semantic 3D point cloud map may be understood as a 3D point cloud map with semantic information of reference objects. In some embodiments, a semantic 3D point cloud map may be obtained by performing a semantic annotation to a 3D point cloud map without semantic annotation. In some embodiments, a semantic 3D point cloud map may be obtained by performing manually the semantic annotation to the 3D point cloud map without semantic annotation.

In some embodiments, 2D images for reconstructing a 3D point cloud map may be obtained and annotated. The semantic 3D point cloud map may be reconstructed based on the annotated 2D images so as to automatically annotate the 3D point cloud map.

In some embodiments, the processing device may obtain a semantic 3D point cloud map based on a trained neural network model. Specifically, the processing device may obtain the trained neural network model and a plurality of 2D images that are not labeled with the reference objects, and perform semantic annotations to the plurality of 2D images that are not labeled with reference objects based on the trained neural network model. An image labeled with reference objects may be also refers to an image with a semantic annotation. In some embodiments, the trained neural network model may be obtained by training a plurality of groups of training samples. Each group of training sample may include one or more sample images that are not labeled with reference objects and training labels including sample images labeled with reference objects.

In some embodiments, a semantic 3D point cloud map may be determined based on a plurality of images with semantic annotations. Specifically, the processing device may obtain one or more images labeled with reference objects and one or more images that are not labeled with reference objects, and extract visual feature points in the one or more images that are not labeled with reference objects. The visual feature points may be associated with (i.e., correspond to) the reference objects in the images labeled with reference objects. Then the processing device may label the images that are not labeled with reference objects based on the related visual feature points, and obtain the images labeled with reference objects. The processing device may further perform a 3D reconstruction on the plurality of images labeled with reference objects to obtain the semantic 3D point cloud map.

Figure 14:
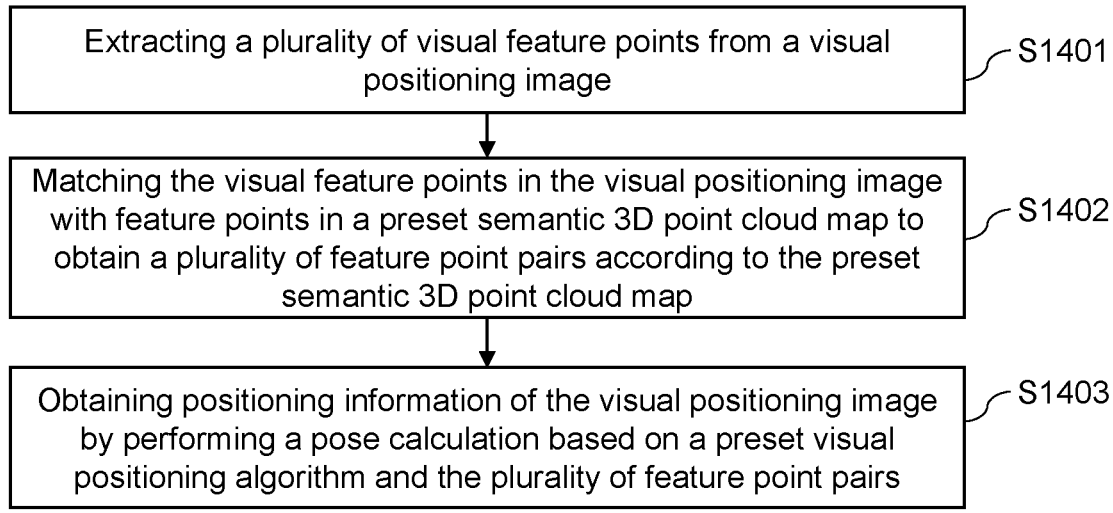
FIG. 14 is a flowchart illustrating an exemplary visual positioning method according to some embodiments of the present disclosure.

More descriptions for the obtaining of semantic 3D point cloud map, may be found in FIG. 14, and the descriptions of which may not be repeated here.

In some embodiments, the at least one feature point pair may include at least one feature point pair with a semantic annotation and/or at least one feature point pair without a semantic annotation. A feature point pair with a semantic annotation may indicate that the feature point in the feature point pair from the 3D point cloud map includes semantic information.

In 1330, positioning information of the imaging device may be calculated based on at least one feature point pair.

In some embodiments, the positioning information of the imaging device may be calculated using the random sample consensus algorithm (Ransac). Specifically, the processing device may obtain a first count of feature point pairs from the at least one feature point pair to form a solution set. The processing device may perform at least one iterative calculation on the solution set using a random sampling consensus algorithm to obtain a pose and a count of interior points corresponding to each iterative calculation, wherein an interior point represents a visual feature point whose reprojection value between the visual feature point and a feature point corresponding to the visual feature point in the 3D point cloud map is within a reprojection deviation. The processing device may determine the positioning information of the imaging device according to the pose and the count of interior points. In some embodiments, the solution set may include feature point pairs without semantic annotations and feature point pairs with semantic annotations. More descriptions for using RANSAC to calculate the positioning information of the imaging device may be found in FIGS. 14-18, and the descriptions of which may not be repeated here.

The following will perform detailed description on the method for performing the semantic annotation to the 3D point cloud map and performing visual positioning using the semantic 3D point cloud map.

Referring to FIG. 14, FIG. 14 is a flowchart illustrating an exemplary visual positioning method according to some embodiments of the present disclosure. The process 1400 may be executed by a server or a service terminal in a visual positioning system, as shown in FIG. 14, the process 1400 may include the following operations.

In S1401, a plurality of visual feature points may be extracted from a visual positioning image.

The visual positioning image (also referred to as positioning image or vision image) may be an image to be positioned uploaded by a user through a mobile device. The user may directly capture the image through the mobile device and upload the image as the visual positioning image. Alternatively, the user may select an image from an album after photographing and upload the image as the visual positioning image. The mobile device may be any mobile device capable of shooting or image storage, such as a mobile phone, a tablet, a smartwatch, etc. The ways for uploading the visual positioning image and selecting the mobile device may be set according to user's demands, and which is not limited in the present disclosure.

Alternatively, the extraction of visual feature point may use a visual feature extraction method to extract visual feature points on the input visual positioning image. The visual feature extraction method may include but not limited to a scale-invariant feature transform (SIFT) method, a graphics processing unit method, a scale-invariant feature transform (siftGPU) method, an oriented fast and rotated brief (ORB) method, etc., which is not limited in the present disclosure. The visual feature extraction method may be set according to user's demands, which is not restricted by the embodiments.

In S1402, the visual feature points in the visual positioning image may be matched with feature points in a preset semantic 3D point cloud map to obtain a plurality of feature point pairs according to the preset semantic 3D point cloud map.

The plurality of feature points may include feature point pairs with semantic annotations and feature point pairs without semantic annotations. In some embodiments, the preset semantic 3D point cloud map may be obtained by training a training sample set. The training sample set may include a plurality of 2D images. Preset areas of the plurality of 2D images may have semantic annotations. In some embodiments, the training sample set may include a plurality of 2D images without semantic annotations, and labels may be semantic 3D point cloud maps. In some embodiments, the training sample set may include a plurality of 3D point cloud maps, and labels may be semantic 3D point cloud maps. In some embodiments, the semantic 3D point cloud maps used as the labels in the training sample set may be reconstructed according to 2D images with semantic annotations, and the 2D images with semantic annotations may be manually annotated, or automatically annotated. For example, an automatic annotation of a 2D image may be performed according to a trained neural network model. A training sample set of the trained neural network model for annotating 2D images may include a plurality of 2D images without semantic annotations, and labels may be 2D images with semantic annotations.

The semantic annotations may be location information (e.g., a longitude, a latitude, an altitude, etc.), or related information of an area where the current feature point pair is located (e.g., a clothing area, a fresh food area, a catering area in the mall, etc.)

The visual feature points extracted from the visual positioning image and the preset 3D point cloud map may be performed a 2D-3D matching, that is, 2D pixel points in the visual positioning image may be matched with 3D points in the preset semantic 3D point cloud. Each 2D pixel point in the visual positioning image and one corresponding 3D point in the preset semantic 3D point cloud map may form a feature point pair. Specifically, the 2D-3D matching may be matching the 2D pixel points in the visual positioning image and the pixel points in the plurality of 2D reconstructed images used for reconstructing the preset semantic 3D point cloud map. Each pixel point in the plurality of 2D reconstructed images may correspond to a 3D point in the preset semantic 3D point cloud map. Further, a corresponding relationship between the 2D pixel points in the visual positioning image and the 3D points in the preset semantic 3D point cloud map may be established, and one or more feature point pairs may be formed.

Alternatively, the methods for matching may include, but are not limited to, a word-bag tree matching method, a violent matching method, etc. The matching method may be set according to user's demands, which is not limited in the present disclosure.

In some embodiments, the training process of the preset semantic 3D point cloud map may include the following operations.

First, manual annotations need to be performed on 2D images in an image database. The manual annotation may include framing preset areas in the 2D images one by one and annotating the preset areas. The preset areas in the 2D images may be framed by, for example, rectangles, polygons, etc., or may be determined by manually drawing framing areas, which is not limited in the present disclosure. After the preset areas are determined, they need to be manually annotated. The contents of the annotation may include but not limited to specific location coordinates corresponding to the annotations, information represented by the annotations, etc.

Subsequently, the annotated image library may be input into the 3D point cloud map, and, auto annotations of the 3D points in the 3D point cloud corresponding to the visual feature points in the preset areas may be implemented based on the 2D-3D matching relationship.

Finally, according to the annotated semantic 3D point cloud map, the preset semantic 3D point cloud map used in the present disclosure may be generated.

In some embodiments, the semantic 3D point cloud map may be generated based on a trained neural network model. In some embodiments, the neural network model may be obtained through training based on a plurality of images without semantic annotations. Specifically, the neural network model may be obtained through training with one or more sample images without semantic annotations as training samples, and one or more semantic 3D point cloud maps as labels.

In some embodiments, the neural network model may be obtained through training with one or more 3D point cloud maps as training samples, and one or more semantic 3D point cloud maps as the labels.

In some embodiments, the neural network model may be obtained through training with one or more sample images without semantic annotations as training samples, and one or more sample images with semantic annotations as labels. In some embodiments, the processing device may input a plurality of 2D images to the trained neural network model to automatically annotate on the 2D images. The processing device may further perform a 3D reconstruction based on the plurality of images with semantic annotations to obtain the semantic 3D point cloud map.

Since the preset semantic 3D point cloud map includes a large count of annotated feature points, the accuracy and success rate of the positioning may be significantly improved in use.

Alternatively, in one embodiment of the present disclosure, a preset area of a 2D image may be a signage area, a landmark area, etc. For example, there is a signage at the entrance of each shop in a mall, and the preset areas may be an area including the signage. The semantic annotation may be location information of the signage, such as the floor of the signage. For example, a signage is labeled with 3012, it indicates that a store with the signage is at No. 12 on the 3rd floor, and the shop information (e. g., xxx shop) may be annotated on the signage as well. Since the preset area is the annotated area, all the visual feature points in the preset area may include the corresponding annotations as well.

In S1403, positioning information of the visual positioning image may be obtained by performing a pose calculation based on a preset visual positioning algorithm and the plurality of feature point pairs.

Alternatively, in one embodiment of the present disclosure, the pose calculation may be performed through an improved RANSAC algorithm.

Alternatively, after the pose calculation is performed, the current calculation results need to be stored, and the final positioning information may be further determined according to the stored results.

According to the visual positioning method provided by the embodiments of the present disclosure, the visual feature points in the visual positioning images and the corresponding feature points in the preset semantic 3D point cloud maps may be matched. After that, the pose calculation may be performed according to the preset visual positioning algorithm and the plurality of feature point pairs. The preset semantic 3D point cloud map obtained by training the 2D images with semantic annotations is used in the matching of the feature point pairs, which may effectively fuse the semantic information in the preset semantic 3D point cloud map to the pose calculation of the visual positioning image. Thus, according to the method provided by the present disclosure, the problems of low positioning accuracy and difficult positioning when visual positionings are performed on some indoor scenes may be solved and the positioning accuracy may be improved.

Figure 15:
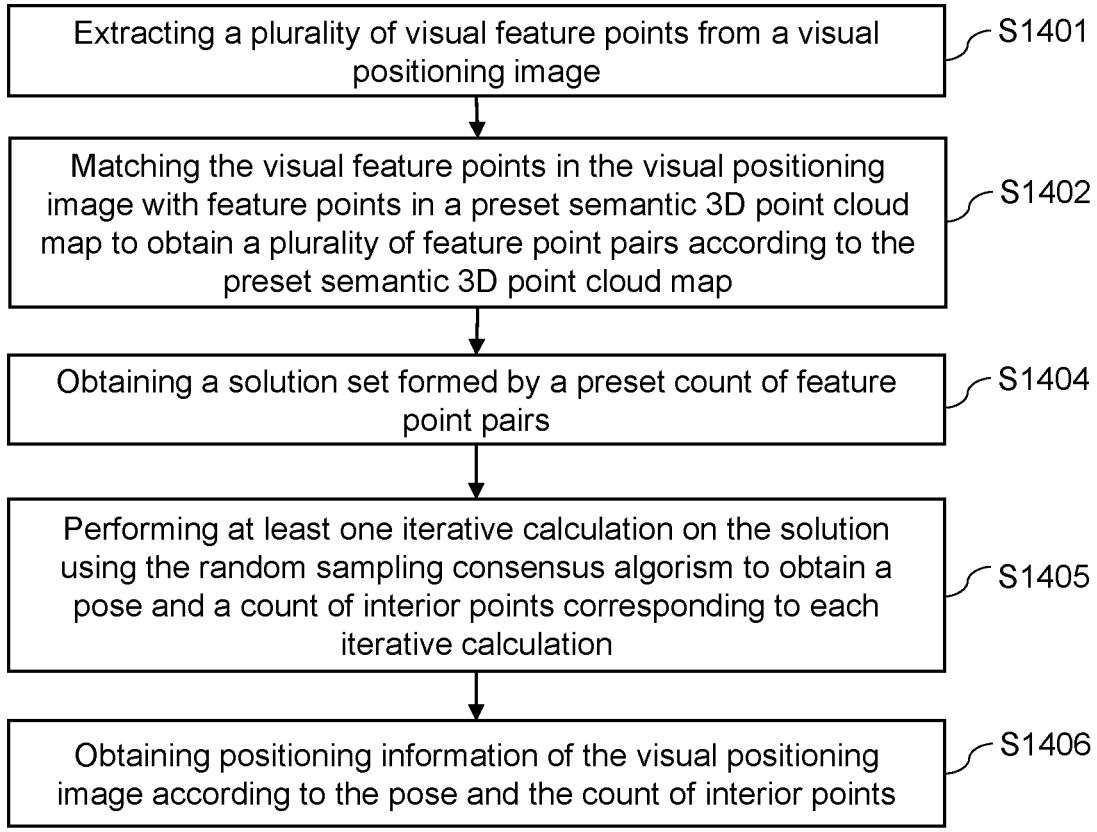
FIG. 15 is a flowchart illustrating an exemplary visual positioning method according to some embodiments of the present disclosure.

FIG. 15 is a flowchart illustrating an exemplary visual positioning method according to some embodiments of the present disclosure. As shown in FIG. 15, the operation S1403 may include the following operations.

In S1404, a solution set formed by a preset count (i.e., a first count) of feature point pairs may be obtained.

The solution set may include feature point pairs without semantic annotations.

Alternatively, the solution set may also include feature point pairs with semantic annotations, that is, the solution set may include feature point pairs with and without semantic annotations, it may only include feature point pairs with semantic annotations, or it may only include feature point pairs without semantic annotations, which is not limited in the present disclosure.

Alternatively, in one embodiment of the present disclosure, the preset count (i.e., the first count) may be any integer between 12-20, and the specific count may be set according to user's demands, which is not limited in the present disclosure. In some embodiments, the preset count (i.e., the first count) may be any integer other than 12-20 (e.g., 1-11, 21-100 or 120-150), and may be adjusted according to specific conditions, which is not limited in the present disclosure.

In S1405, at least one iterative calculation may be performed on the solution set using the random sampling consensus algorism to obtain a pose and a count of interior points corresponding to each iterative calculation.

An interior point represents a visual feature point whose reprojection value between the visual feature point and a feature point corresponding to the visual feature point in the 3D point cloud map is within a reprojection deviation.

In some embodiments, an interior point may be a point where a deviation between a pose calculated from the remaining feature points except the solution set and a pose calculated from the feature points in the solution set during the operation is smaller than the reprojection deviation. Among them, a pose calculation set may be obtained by subtracting the solution set from all feature point pairs. The reprojection deviations corresponding to all feature point pairs in the pose calculation set may be calculated respectively. When it is less than the preset reprojection error, the number of interior points corresponding to the pose is increased by one, and the information such as the pose and the number of interior points obtained after each iterative calculation may be saved when one or more of reprojection deviations corresponding to the feature point pairs are smaller than the preset reprojection deviation, then the count of the interior points corresponding to the pose may plus one, and the information such as the pose and the count of interior points obtained after each iterative calculation is performed may be stored.

Alternatively, in one embodiment of the present disclosure, the preset reprojection deviation may be any integer between 8 to 20 pixels, and the specific count may be set according to the user's demand, which is not limited in the present disclosure. In some embodiments, the preset reprojection deviation may be any integer other than 8 to 20 pixels (e.g., 1-7, 21-50), and may be adjusted according to different situations, which is not limited in the present disclosure. It will be understood that in order to ensure the accuracy of interior point selection, a small value may be selected as the preset reprojection deviation.

In S1406, positioning information of the visual positioning image may be obtained according to the pose and the count of interior points.

Figure 16:
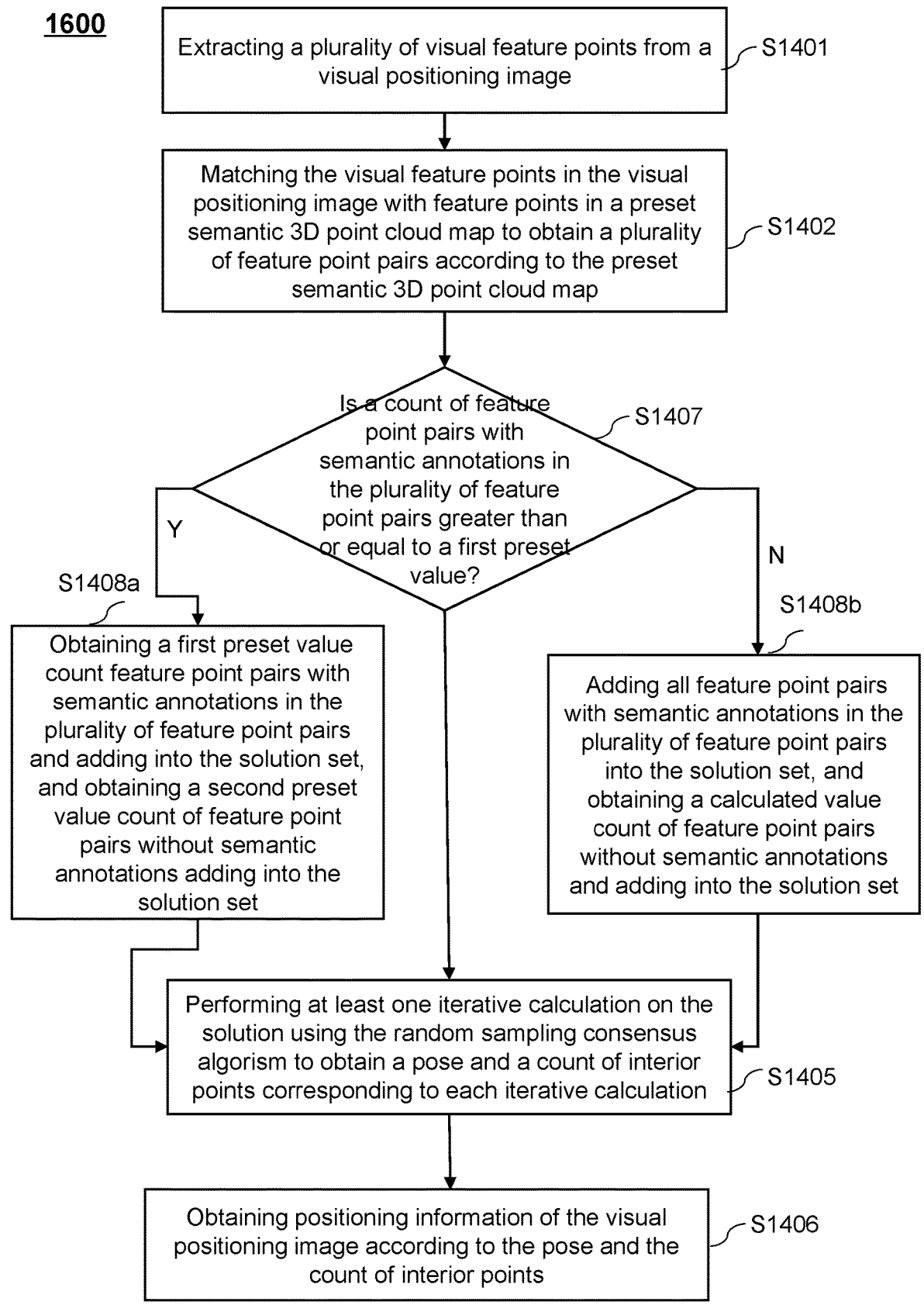
FIG. 16 is a flowchart illustrating an exemplary visual positioning method according to some embodiments of the present disclosure.

FIG. 16 is a flowchart illustrating an exemplary visual positioning method according to some embodiments of the present disclosure. As shown in FIG. 16, the operation S1404 may include the following operations.

In S1407, whether a count of feature point pairs with semantic annotations in the plurality of feature point pairs is greater than or equal to a first preset value (i.e., a threshold count) may be determined.

In response to determining that the count of feature point pairs with semantic annotations is greater than or equal to the first preset value (i.e., the threshold count), then operation S1408a may be performed. In S1408a, a first preset value count (i.e., a second count) feature point pairs with semantic annotations in the plurality of feature point pairs may be obtained and added into the solution set, and a second preset value count (i.e., a third count) of feature point pairs without semantic annotations may be obtained and added into the solution set. The first preset value count and the second preset value count may be both smaller than the total count of the feature point pairs in the solution set (i.e., the preset count). More descriptions for the first preset value, the second preset value, and the preset count may be found in the following description, and the descriptions of which will not be limited here.

When the solution set includes the first preset count (i.e., the second count) of feature point pairs with semantic annotations, due to the high identification degree of the feature point pairs with semantic annotations, the results obtained through pose calculation based on the solution set may be highly accurate, thereby achieving accurate positioning.

Otherwise, in response to determining that the count of feature point pairs with semantic annotations is smaller than the first preset value (i.e., the threshold count), then operation S1408b may be performed. In S1408b, all feature point pairs with semantic annotations in the plurality of feature point pairs may be added into the solution set, and a calculated value count (i.e., a fourth count) of feature point pairs without semantic annotations may be obtained and added into the solution set.

The calculated value may be a difference between the preset count (i.e., the first count) and the count of all feature point pairs with semantic annotations. In some embodiments, the calculated value may also be a certain value in a range including the difference between the preset count (i.e., first count) and the count of all feature point pairs with semantic annotations. Specifically, a value may be selected from the range as the calculated value. For example, the difference between the preset count (i.e., the first count) and the count of all feature point pairs with semantic annotations is 8, then the range to which the calculated value belongs may be plus or minus 2 feature point pairs, that is, 6-10, and a value (e.g., 7) may be randomly selected from the range 6-10 and be determined as the calculated value.

The first preset value (i.e., the threshold count) and the second preset value may be obtained by calculation according to a preset attention rate and the preset count (i.e., first count).

The preset attention rate (equivalent to the attention rate in FIG. 13) may be a ratio of the feature point pairs with semantic annotations to be selected to the preset count (i.e., the first count) of feature point pairs. If the preset count (i.e., the first count) is N and the preset attention rate is Ratio, the first preset value may be N*Ratio, and the second preset value may be N*(1−Ratio).

Alternatively, in one embodiment of the present disclosure, the preset attention rate may be a value between 0.5 and 0.8, and the preset attention rate may be set according to user's demands, which is not limited in the present disclosure. In some embodiments, the preset attention rate may be a value between 0.5 and 0.8 (e.g., 0.1 and 0.5, 0.8 and 1.0), and may be adjusted according to different situations, which is not limited in the present disclosure. In some embodiments, the preset attention rate may be adjusted based on the first preset value. For example, a fixed first preset value may be set to adjust the preset attention rate. As another example, the preset attention rate may decrease with the increase of the preset count (i.e., the first count). For example, if the first preset value is M, when the preset count increases, to keep the first preset value unchanged, the preset attention rate may be decreased.

For example, if the preset count (i.e., the first count) is 20 and the preset attention rate is 0.8, then the first preset value is 16 and the second preset value is 4, which represents that if a count of feature point pairs in the feature point pairs with semantic annotations is bigger than or equal to 16, 16 feature point pairs may be selected from the feature point pairs with semantic annotations and added into the solution set, and 4 feature point pairs may be selected from the feature point pairs without semantic annotations and added into the solution set; if the count of feature point pairs in the feature point pairs with semantic annotations is 12, which is smaller than 16, then all the feature point pairs with semantic annotations may be added into the solution set, and the current calculated value is 8 (i.e., 20−12=8), and 8 feature point pairs may be selected from the feature point pairs without semantic annotations and added into the solution set.

Figure 17:
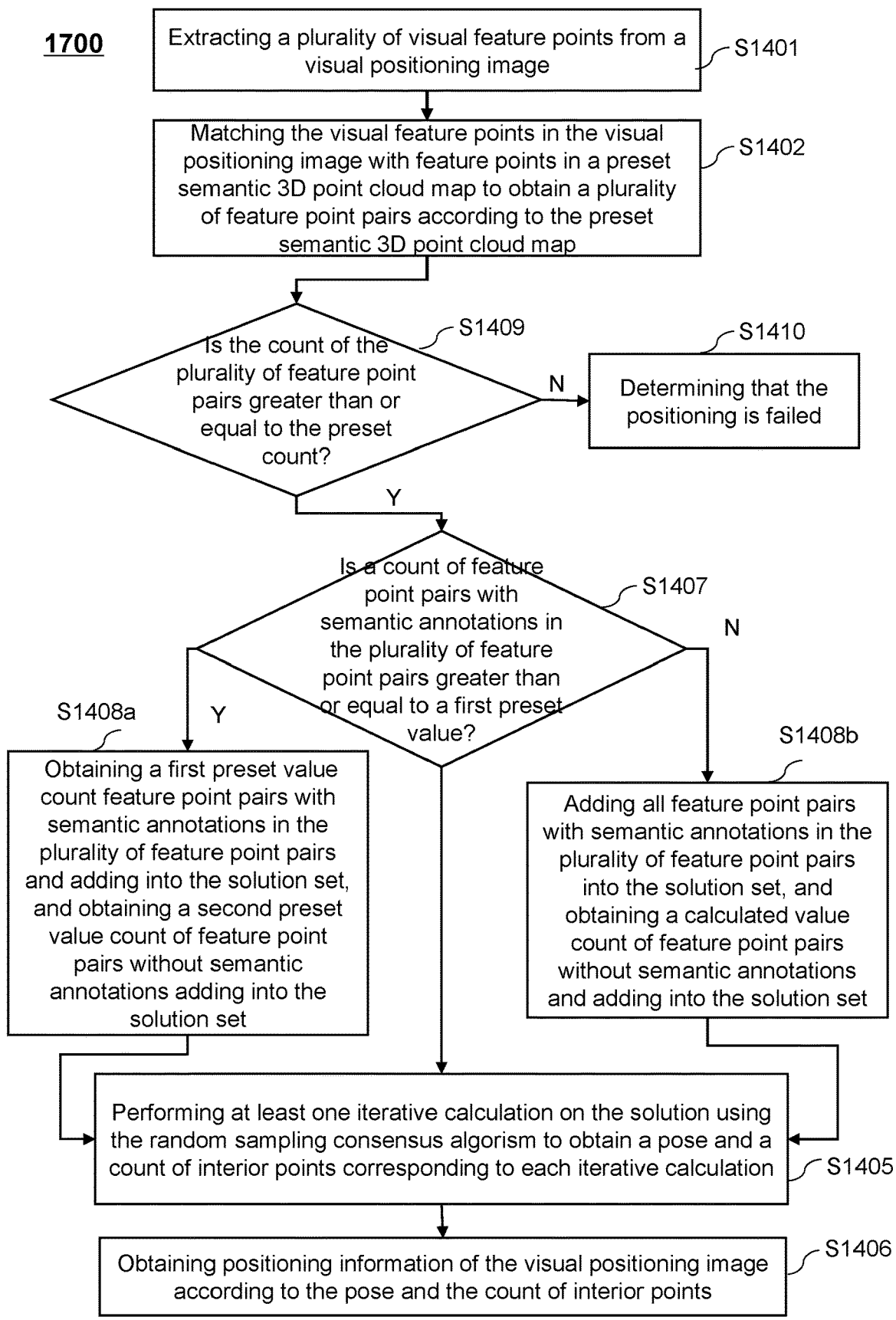
FIG. 17 is a flowchart illustrating an exemplary visual positioning method according to some embodiments of the present disclosure.

FIG. 17 is a flowchart illustrating an exemplary visual positioning method according to some embodiments of the present disclosure. As shown in FIG. 17, the operation S1404 may include the following operations.

In S1409, whether the count of the plurality of feature point pairs is greater than or equal to the preset count (i.e., the first count) may be determined.

In response to determining that the count of the plurality of feature point pairs is greater than or equal to the preset count (i.e., the first count), the solution set may be obtained from the plurality of feature point pairs, that is, operation S1407 may be performed.

In response to determining that the count of the plurality of feature point pairs is less than the preset count (i.e., the first count), operation S1410 may be performed. In S1410, that the positioning is failed may be determined.

When the count of the plurality of feature point pairs is less than the preset count, it represents that the count of matched feature point pairs is not enough for resolving and the visual positioning is failed; otherwise, the count of matched feature point pairs in the solution set is equal to or greater than the preset count, and perform the subsequent operations.

Figure 18:
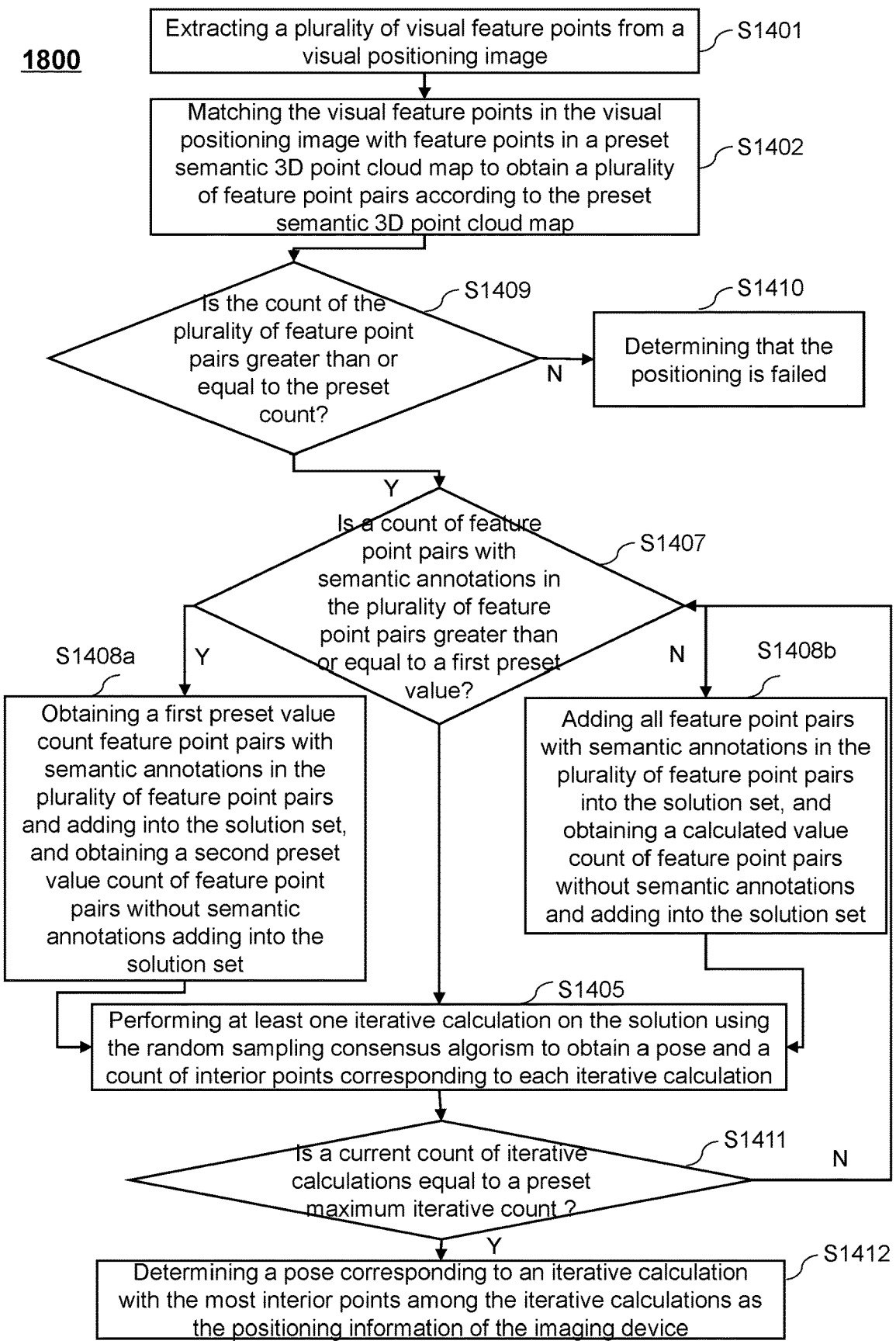
FIG. 18 is a flowchart illustrating an exemplary visual positioning method according to some embodiments of the present disclosure.

FIG. 18 is a flowchart illustrating an exemplary visual positioning method according to some embodiments of the present disclosure. As shown in FIG. 18, the operation S1406 may include the following operations.

In S1411, whether a current count of iterative calculations is equal to a preset maximum iterative count (also referred to as an iterative count threshold) may be determined.

In response to determining that the current count of iterative calculations is equal to the preset maximum iterative count (also referred to as the iterative count threshold), operation S1412 may be performed. In S1412, a pose corresponding to an iterative calculation with the most interior points among the iterative calculations may be determined as the positioning information of the imaging device.

In response to determining that the current count of iterative calculations is equal to the preset maximum iterative count (also referred to as the iterative count threshold), the iterative calculations may be stopped and the pose corresponding to an iterative calculation with the most interior points among the iterative calculations may be determined as the final positioning result of the imaging device according to a result saved in each of the iterative calculations.

In response to determining that the current count of iterative calculations is less than the maximum iterative count, then return to S1407, and a new solution set may be obtained and pose calculations and corresponding interior points calculations may be performed.

Alternatively, in one embodiment of the present disclosure, the maximum iterative count may be any integer between 30 and 200, the maximum iterative count may be set according to user's demands, which is not limited in the present disclosure. In some embodiments, the maximum iterative count may be any integer (e.g., 1-29, 201-300) other than 30-200, and may be adjusted according to different situations, which is not limited in the present disclosure.

Based on the same invention concept, the embodiments of the present disclosure further provide a visual positioning device corresponding to the visual positioning method. As the principle of problem-solving of the visual positioning device in the embodiments of the present disclosure is similar to that of the above visual positioning method, the embodiments of the visual positioning device may refer to the embodiments of the visual positioning method, whose beneficial effects will not be repeated here.

Figure 19:
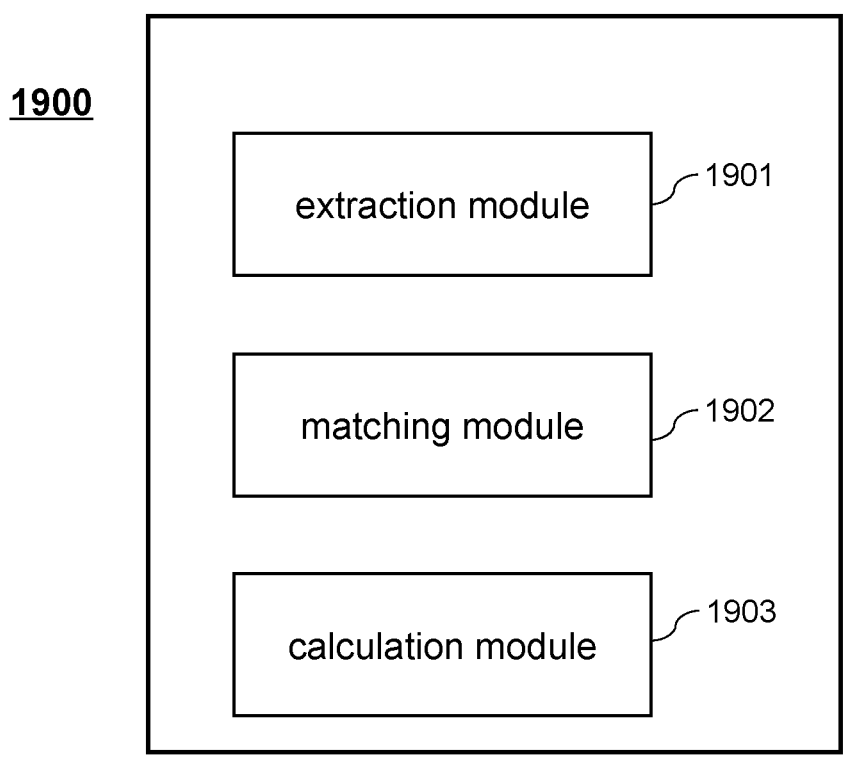
FIG. 19 is a schematic diagram illustrating an exemplary visual positioning device according to some embodiments of the present disclosure.

Referring to FIG. 19, FIG. 19 is a schematic diagram illustrating an exemplary visual positioning device according to some embodiments of the present disclosure. As shown in FIG. 19, the visual positioning device may include an extraction module 1901, a matching module 1902, and a calculation module 1903. The visual positioning device may be one or more other modules other than the obtaining module 310 and the determination module 320 in FIG. 3, or may be the determination module 320 of the processing device 112.

The extraction module 1901 may be configured to extract a plurality of visual feature points in a visual positioning image.

The matching module 1902 may be configured to match the plurality of visual feature points in the visual positioning image with feature points in a preset semantic 3D point cloud map to obtain a plurality of feature point pairs according to the preset semantic 3D point cloud map. The plurality of feature point pairs may include feature point pairs with semantic annotations and feature point pairs without semantic annotations. The preset semantic 3D point cloud map may be obtained by training a sample set including a plurality of 2D images, and preset areas of the plurality of 2D images have semantic annotations.

The calculation module 1903 may be configured to obtain positioning information of the visual positioning image based on to preset visual positioning algorithm and the plurality of feature point pairs by performing a pose calculation.

Alternatively, the calculation module 1903 may be further configured to obtain a solution set formed by a preset count (i.e., a first count) of feature point pairs. The solution set may include feature point pairs without semantic annotations.

At least one iterative calculation may be performed on the solution set using a random sampling consensus algorism to obtain a pose and a count of interior points corresponding to each iterative calculation. An interior point represents a visual feature point whose reprojection value between the visual feature point and a feature point corresponding to the visual feature point in the 3D point cloud map is within a reprojection deviation.

The positioning information of the visual positioning image may be obtained according to the pose and counts of interior points.

Alternatively, the solution set may further include feature points with semantic annotations.

The calculation module 1903 may be further configured to determine whether a count of feature point pairs with semantic annotations in the plurality of feature point pairs is greater than or equal to a first preset value (i.e., a threshold count).

In response to determining that the count of feature point pairs with semantic annotations in the plurality of feature point pairs is greater than or equal to the first preset value (i.e., threshold count), a first preset value count (i.e., a second count) of feature point pairs with semantic annotations may be obtained and added into the solution set, and a second preset value count (i.e., a third count) of feature point pairs without semantic annotations may be obtained and added into the solution set.

In response to determining that the count of feature point pairs with semantic annotations in the plurality of feature point pairs is less than the first preset value (i.e., threshold count), all the feature point pairs with semantic annotations in the plurality of feature point pairs may be into the solution set, and a calculated value (i.e., a fourth count) of feature point pairs without semantic annotations may be obtained and added into the solution set. The calculated value may be a difference between the preset count and a count of all feature point pairs with semantic annotations.

Alternatively, the calculation module 1903 may be further configured to calculate the first preset value and the second preset value according to a preset attention rate and the preset count.

Alternatively, the calculation module 1903 may be further configured to determine whether the count of plurality of feature point pairs is greater than or equal to the preset count.

In response to determining that the count of plurality of feature point pairs is greater than or equal to the preset count, the solution set may be obtained from the plurality of the feature point pairs.

In response to determining that the count of plurality of feature point pairs is less than the preset count, that the positioning is failed may be determined.

Alternatively, the calculation module 1903 may be further configured to determine whether a current count of iterative calculations is equal to a preset maximum iterative count.

In response to determining that the current count of iterative calculations is equal to the preset maximum iterative count, the pose corresponding to an iterative calculation with the most interior points among the iterative calculations may be determined as the positioning information of the visual positioning images.

It should be noted that the above descriptions of the various processes are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the feature point pairs may be randomly selected from the solution set to calculate the positioning information.

Some embodiments of the present disclosure proposed a method for extracting visual feature points of images, and the accuracy of extraction of the visual feature points may be improved during visual positioning. When visual positioning is performed, visual feature points in positioning images may be extracted, and the accuracy of the extraction of the visual feature points directly affects the accuracy of the visual positioning. Therefore, to improve the accuracy and precision of the positioning, when the visual feature points are extracted, the positioning image may be divided into a plurality of blocks with overlapping areas, and a count of feature points in each block may be controlled so as to enable the extracted feature points to uniformly and integrally distributed over the positioning image.

Figure 20:
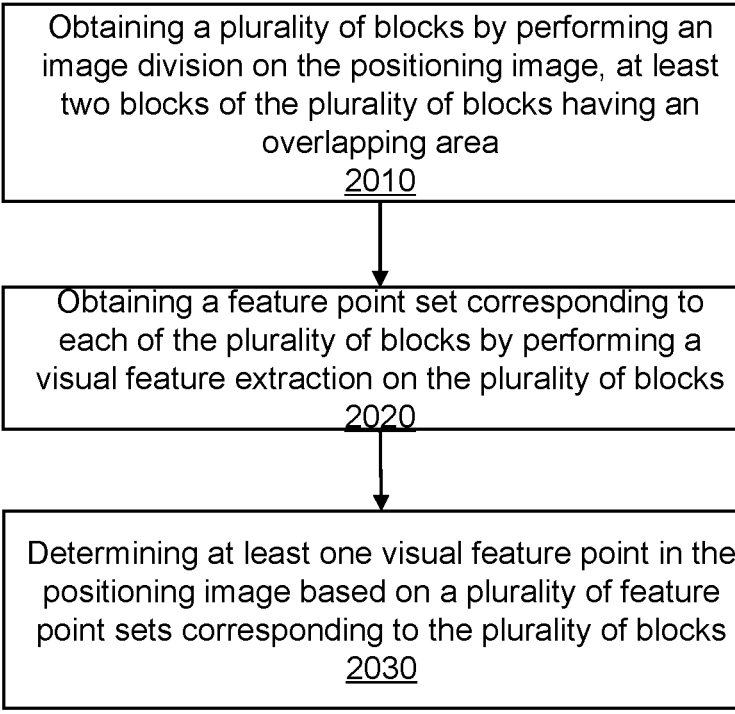
FIG. 20 is a flowchart illustrating an exemplary method for extracting visual feature points according to some embodiments of the present disclosure.

FIG. 20 is a flowchart illustrating an exemplary method for extracting visual feature points according to some embodiments of the present disclosure. Operation 1310 in FIG. 13 may be performed according to the method for extracting visual feature points described in FIG. 20.

In 2010, a plurality of blocks may be obtained by performing an image division on the positioning image, at least two blocks of the plurality of blocks having an overlapping area.

In some embodiments, a processing device (e.g., the processing device 112, the determination module 320) may perform the image division on the positioning image to obtain the plurality of blocks. Two or more blocks in the plurality of blocks may have an overlap area. The overlapping area refers to a superposed area of the blocks. The way of division may be any feasible one, as long as it enables the positioning image to be divided into a plurality of blocks. For example, the positioning image may be divided into two blocks vertically or horizontally, with an overlapping area in the two blocks. As another example, the positioning image may be divided into four blocks vertically or horizontally. As another example, the positioning image may be divided into four blocks in a direction parallel to its diagonal. At least two adjacent blocks have an overlapping area.

In some embodiments, the positioning image may also be divided into a plurality of blocks with an overlapping area between each two adjacent blocks in the plurality of blocks.

In some embodiments, the positioning image may be divided into a plurality of blocks with the same size and/or shape, with an overlapping area between each two adjacent blocks. The size of each of the plurality of blocks is M×N, wherein M is a length of the block in horizontal direction, and N is a length of the block in vertical direction. The size of the overlapping area may be m×n, and m×n=ρM×γN, wherein ρ and γ are preset coefficients that are smaller than 1 and greater than 0. In some embodiments, values of ρ and γ may be set according to different situations.

In 2020, a feature point set corresponding to each of the plurality of blocks may be obtained by performing a visual feature extraction on the plurality of blocks.

In some embodiments, the visual feature extraction may be performed to each of the divided blocks and the feature point set corresponding to each block may be obtained. The feature point set represents a set formed by feature points. The visual feature extractions refer to extracting the visual feature points of the blocks.

In some embodiments, a count of feature points in the feature point set corresponding to each block may be the same. In some embodiments, in order to ensure that the count of feature points in the feature point set extracted from each block is the same, each block may adopt a different extraction criterion. For example, the count of the feature points in the feature point set extracted from each block may be designated. As significances of image features of different blocks are different, different extraction criteria may be adopted to different blocks (e.g., extraction parameters with large gradients may be used for a block with a high significance of image features, and extraction parameters with small gradients may be used for a block with a low significance of image features) to ensure that the count of the extracted feature points corresponding to each block is the same. In some embodiments, the count of feature points in the feature point set corresponding to each block may be different.

In some embodiments, the processing device may parallel perform visual feature extractions to each block to obtain a plurality of feature point sets corresponding to the plurality of blocks, and the count of feature points in the feature point set of each block is within the preset range. The preset range may be determined manually or a default setting of the visual positioning system 100, and may be adjusted according to different situations.

Specifically, the processing device may perform visual feature extractions to the plurality of blocks in parallel to obtain a plurality of candidate feature point sets corresponding to the plurality of blocks, and determine the feature point set from the candidate feature point sets. The performing visual feature extractions to the plurality of blocks in parallel may be performing visual feature extractions to the plurality of blocks simultaneously. A candidate feature point set may be a feature point set to be processed. The count of candidate feature points may be greater than or equal to a preset value. The preset value may be a value set in advance. In some embodiments, the processing device may sort on one or both of a response value and a scale parameter of each of the feature points in the candidate feature point set, and determine feature points with large response values and/or scale parameters, as the feature point set. The count of feature points in the feature point set may be a fifth count. The response value and the scale parameter may be parameters for representing the feature points, and a feature point may be distinguished from other feature points through response values or scale parameters. For example, the response value may correspond to a grayscale value, a brightness value, or a pixel value. In some embodiments, the processing device may also randomly select the fifth count of feature points from the candidate feature point set as the feature point set. The fifth count may be within the preset range.

Figure 23:
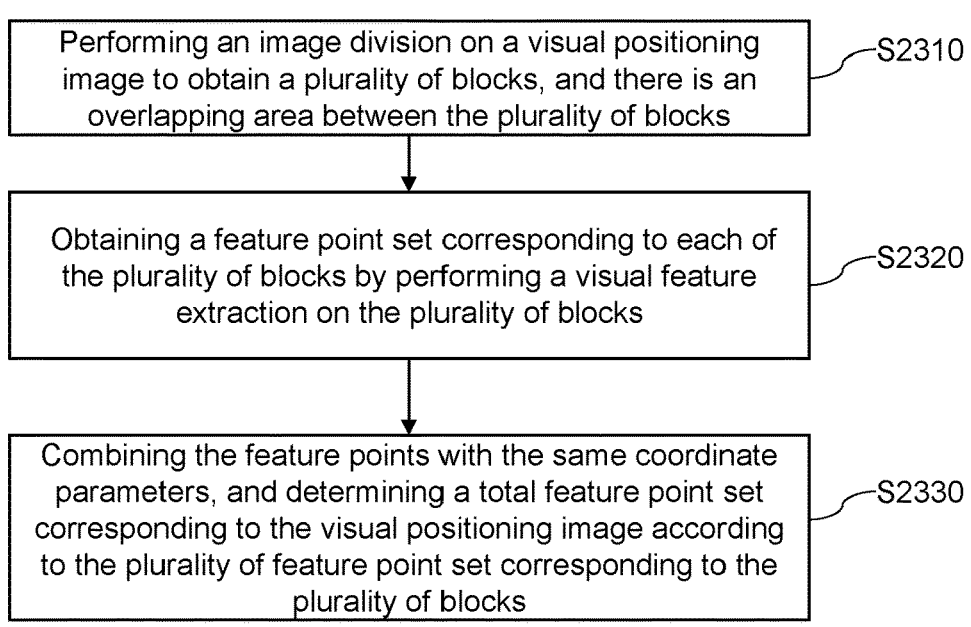
FIG. 23 is a flowchart illustrating an exemplary method for extracting visual feature points of an image according to some embodiments of the present disclosure.
Figure 31:
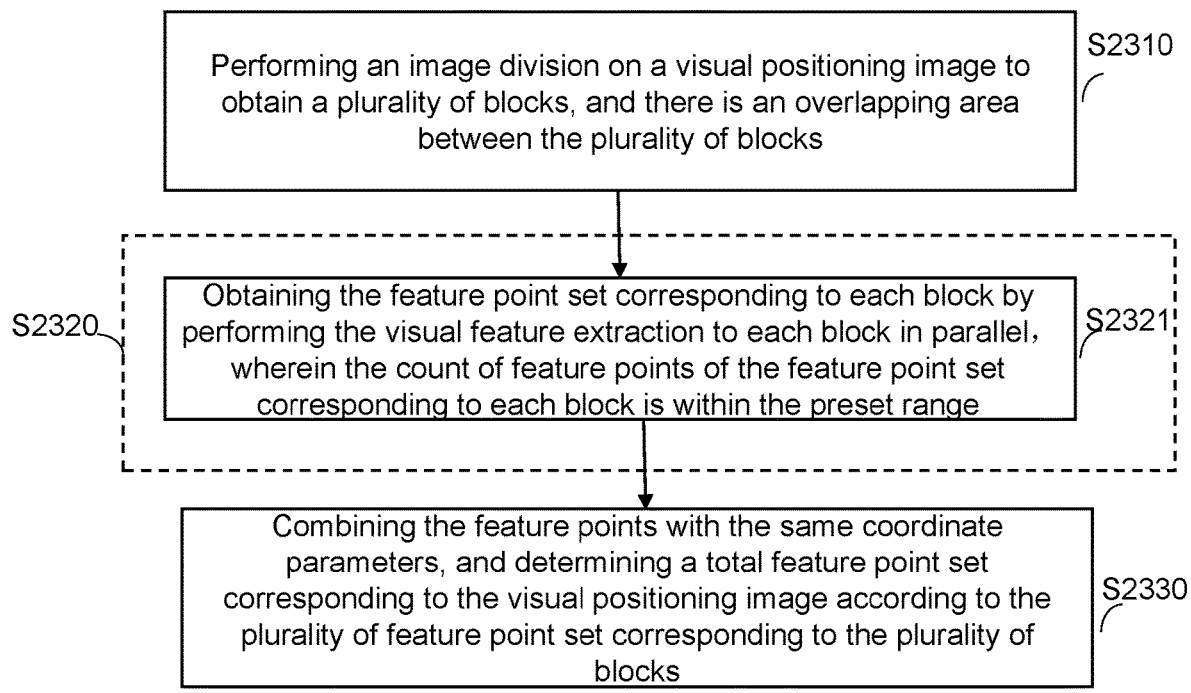
FIG. 31 is a flowchart illustrating an exemplary method for extracting visual feature points of an image according to some embodiments of the present disclosure.
Figure 32:
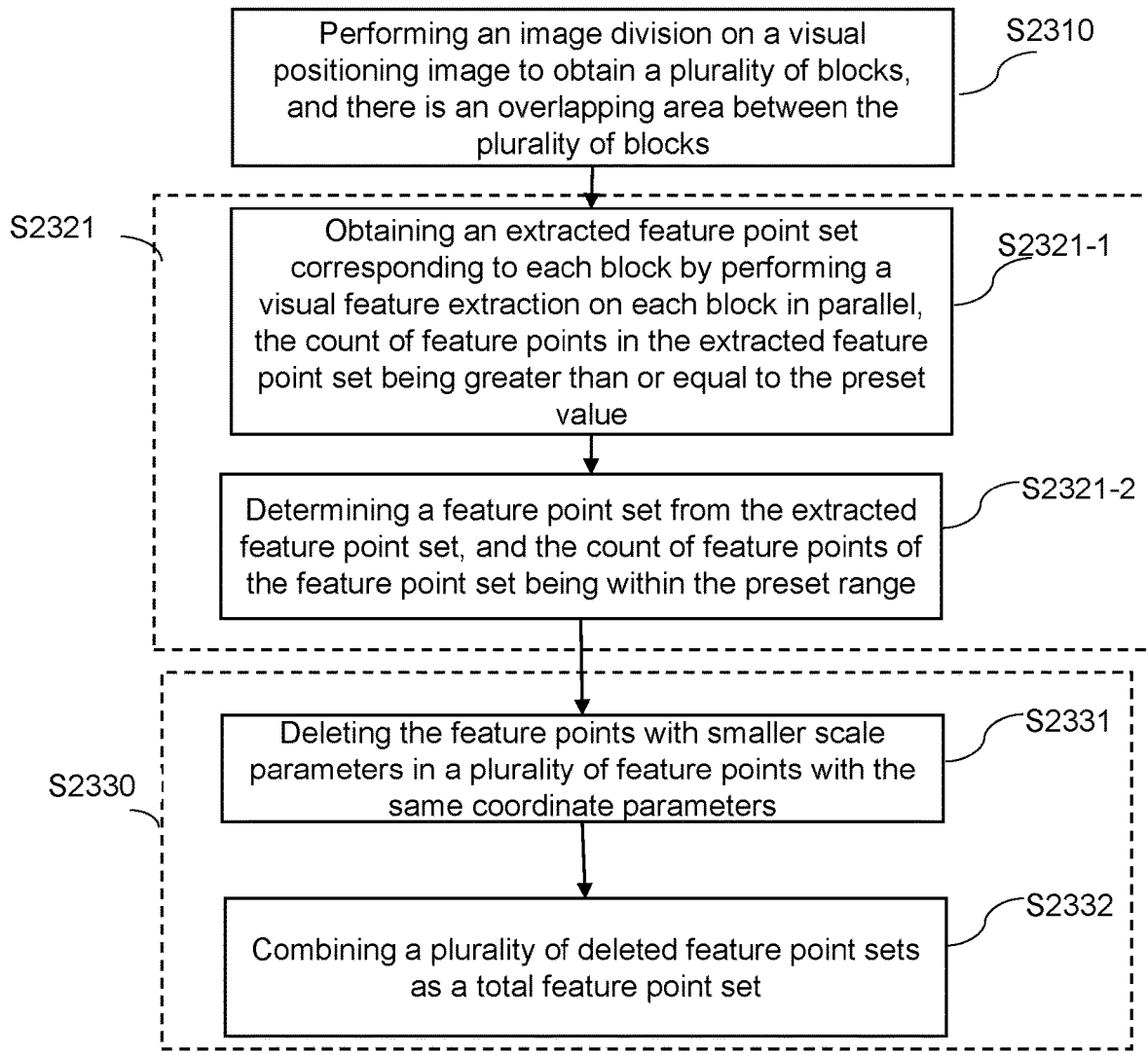
FIG. 32 is a flowchart illustrating an exemplary method for extracting visual feature points of an image according to some embodiments of the present disclosure.

More descriptions for the obtaining of the feature point sets by performing visual feature extractions to the plurality of blocks may be found in FIG. 23, FIG. 31, and FIG. 32, and the descriptions of which are not repeated here.

In 2030, at least one visual feature point in the positioning image may be determined based on a plurality of feature point sets corresponding to the plurality of blocks.

In some embodiments, the processing device may determine at least one visual feature point in the positioning image based on a plurality of feature points corresponding to the plurality of blocks. Each feature point corresponds to a scale parameter. In some embodiments, the processing device may delete feature points with smaller scale parameters among a plurality of feature points with the same coordinate parameters in the plurality of feature point sets, and combine deleted feature point sets into a total feature point set. For example, the processing device may delete feature points whose scale parameter orders are greater than a threshold (e.g., 1) among the plurality of feature points with the same coordinate parameters in the plurality of feature point sets. By deleting the feature points whose scale parameter orders are greater than 1, the remaining feature points other than the feature points whose scale parameter orders are greater than 1 may be determined as the feature points under the coordinate parameters. More descriptions for deleting feature points with smaller scale parameters and combining deleted feature point sets may be found in FIG. 32, and the descriptions of which are not repeated here.

The method for extracting visual feature points of the positioning image will be described in detail below.

In the process of implementing the technical solution of the embodiments of the present disclosure, the inventor of the present disclosure discovered some operations.

Figure 21:
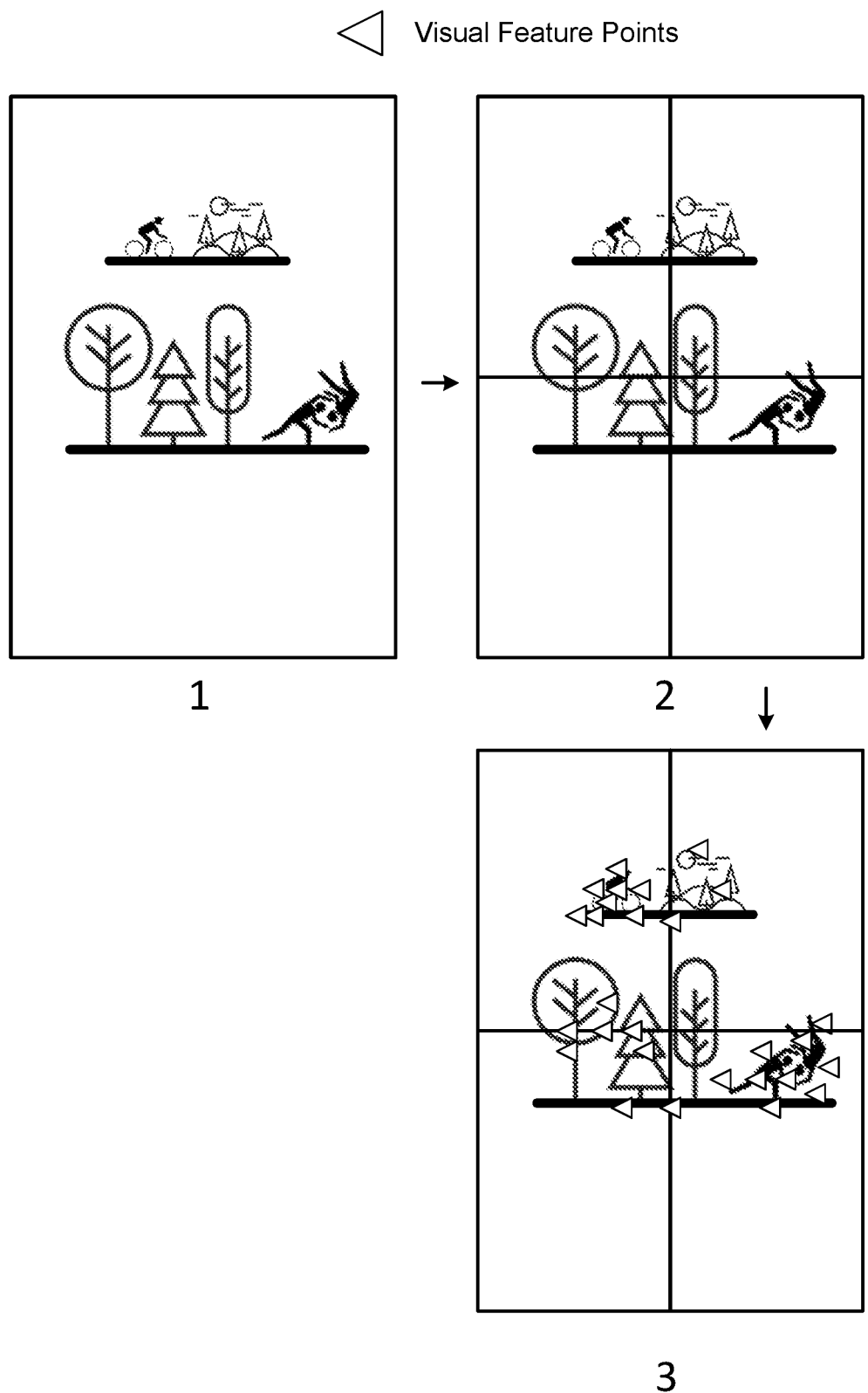
FIG. 21 is a schematic diagram for extracting visual feature points of an image according to some embodiments of the present disclosure.

At present, the image is usually preprocessed before visual feature points are extracted from the image. For example, FIG. 21 is a schematic diagram for extracting visual feature points of an image according to some embodiments of the present disclosure. As shown in FIG. 21, an image shown in 1 is divided into a 2×2 grid image shown in 2. Then visual feature extraction may be performed to the preprocessed image through extraction techniques (e.g., a SIFT, an ORB, etc.). For example, as shown in FIG. 21, a visual feature extraction may be performed on the image shown in 2 to obtain an image shown in 3. As existing image preprocessing methods are very simple, and a visual feature point needs to be extracted according to features within a preset range near the visual feature point, visual feature points near dividing lines of an image are often mismatched or failed to match because features within preset ranges near the visual feature points are not extracted (e.g., the visual feature points near the dividing lines in the image shown in 3).

Therefore, in the process of extracting visual feature points through existing extraction techniques to complete the task of visual positioning, as the image preprocessing methods are very simple, the visual feature points near the dividing lines of the image are often mismatched or failed to match, which further results in a sharp decrease of the accuracy of positioning or even failure of the visual positioning.

Therefore, in order to make up the above defects, the present disclosure provides method for extracting visual feature points of an image and related device, which may enhance the accuracy of the extraction of visual feature points. It should be noted that the above problems of the existing technique solutions are obtained through practice and detailed study by the inventor. Therefore, the process of finding the above defects and the solutions proposed focusing on the above problems as follows in the embodiments of the present disclosure shall both be regarded as the contributions made to the present disclosure in the process of the present disclosure by the inventor.

First, a method for extracting visual feature points of an image provided by the embodiments of the present disclosure may be applied in an electronic device. A type of the electronic device may be a server, a mobile phone, a tablet, a laptop, an ultra-mobile personal computer (UMPC), a hand-held computer, a netbook, a personal digital assistant (PDA), a wearable electronic device, a visual reality device, a car central console, etc., which is not limited in the present disclosure.

It should be understood that the method for extracting visual feature points of an image provided by the present disclosure may be applied to any electronic device (e.g., a server, a mobile phone, a tablet, etc.) with the functions of obtaining and processing data.

Figure 22:
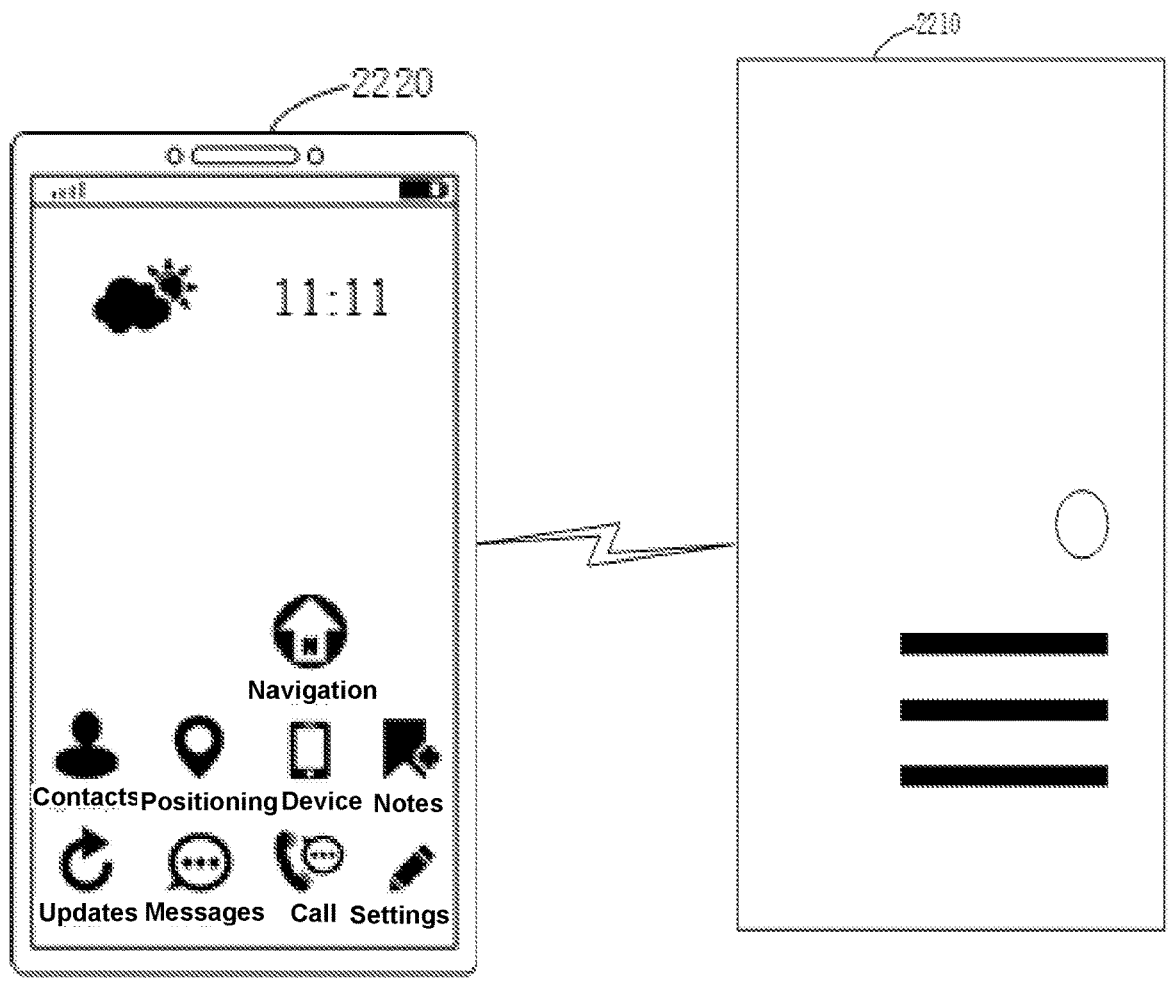
FIG. 22 is a schematic diagram illustrating an exemplary application scenario according to some embodiments of the present disclosure.

For the convenience of understanding, a server may be taken as an example. Referring to FIG. 22, FIG. 22 is a schematic diagram illustrating an exemplary application scenario according to some embodiments of the present disclosure. As shown in FIG. 22, a server 2210 may communicate with a mobile phone 2220, and the server 2210 may include a processor. The process may process information and/or data related to the extraction of the visual feature points of the image to execute one or more functions described in the present disclosure. For example, the processor may obtain data related to the visual positioning image from the mobile phone, and extract visual feature points of the visual positioning image, and thereby implement the extraction method of the visual feature points of the image provided by the present disclosure. In some embodiments, the processor may include one or more processing cores (e.g., a single core processor or multi-core processor). Merely by way of example, the processor may include a central processing unit (CPU), an application specific integrated circuit (ASIC), an application specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction set computing (RISC), or a microprocessor, or the like, or any combination thereof.

For the convenience of understanding, the following embodiments of the present disclosure will take the server and the mobile phone shown in FIG. 22 as an example, to describe the method for extracting visual feature points of an image provided by the embodiments of the present disclosure in combination with accompanying drawings and application scenarios (a user performs an AR navigation by an electronic device, such as a mobile phone). It should be understood that the server 2210 may be the server 110 in FIG. 1, the mobile phone 2220 may be the first user terminal 120 and/or the second user terminal 140 in FIG. 1.

Figure 24:
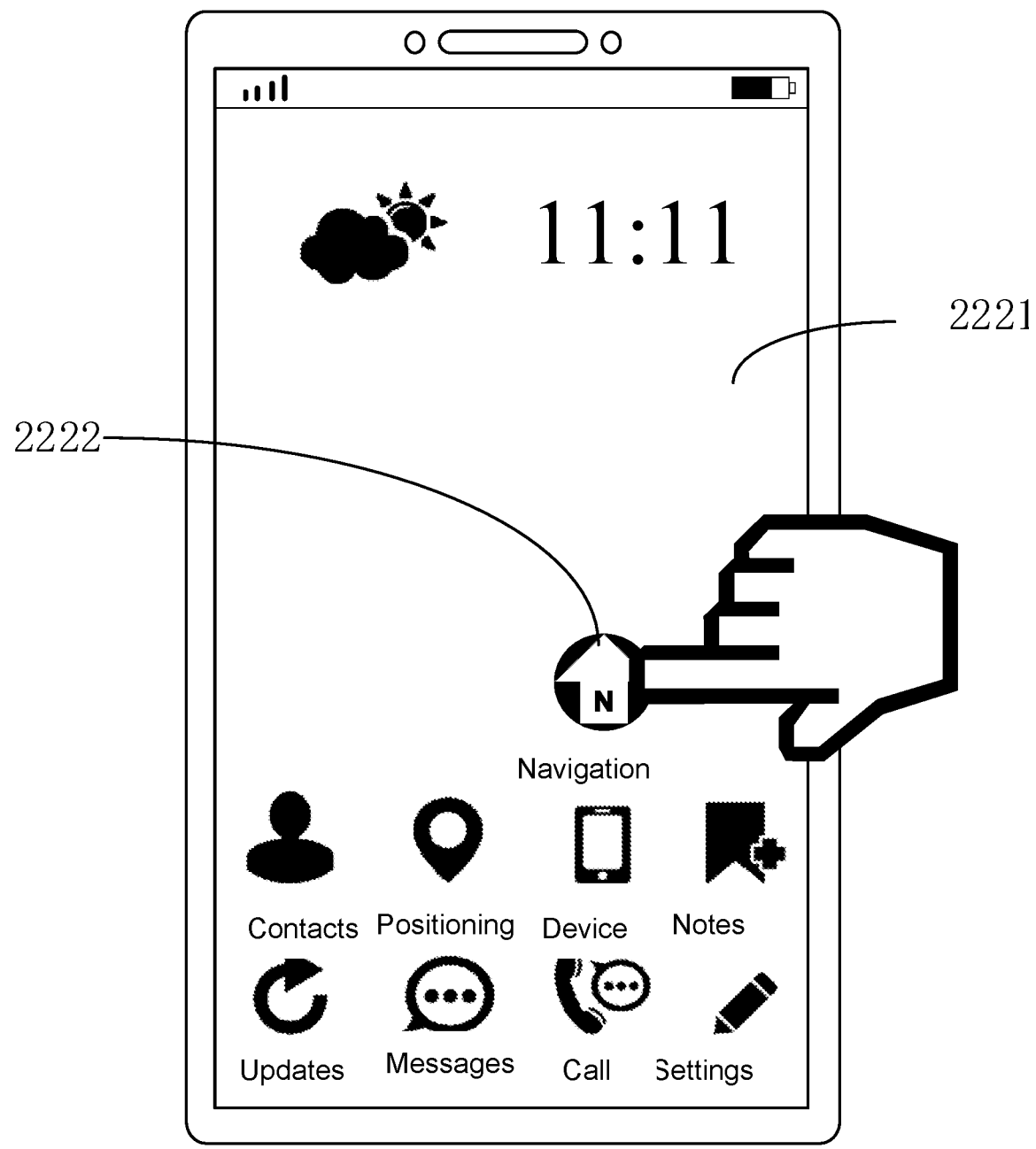
FIG. 24 is a schematic diagram illustrating an exemplary user interface of a mobile phone in a process of extracting visual feature points of an image according to some embodiments of the present disclosure.
Figure 25:
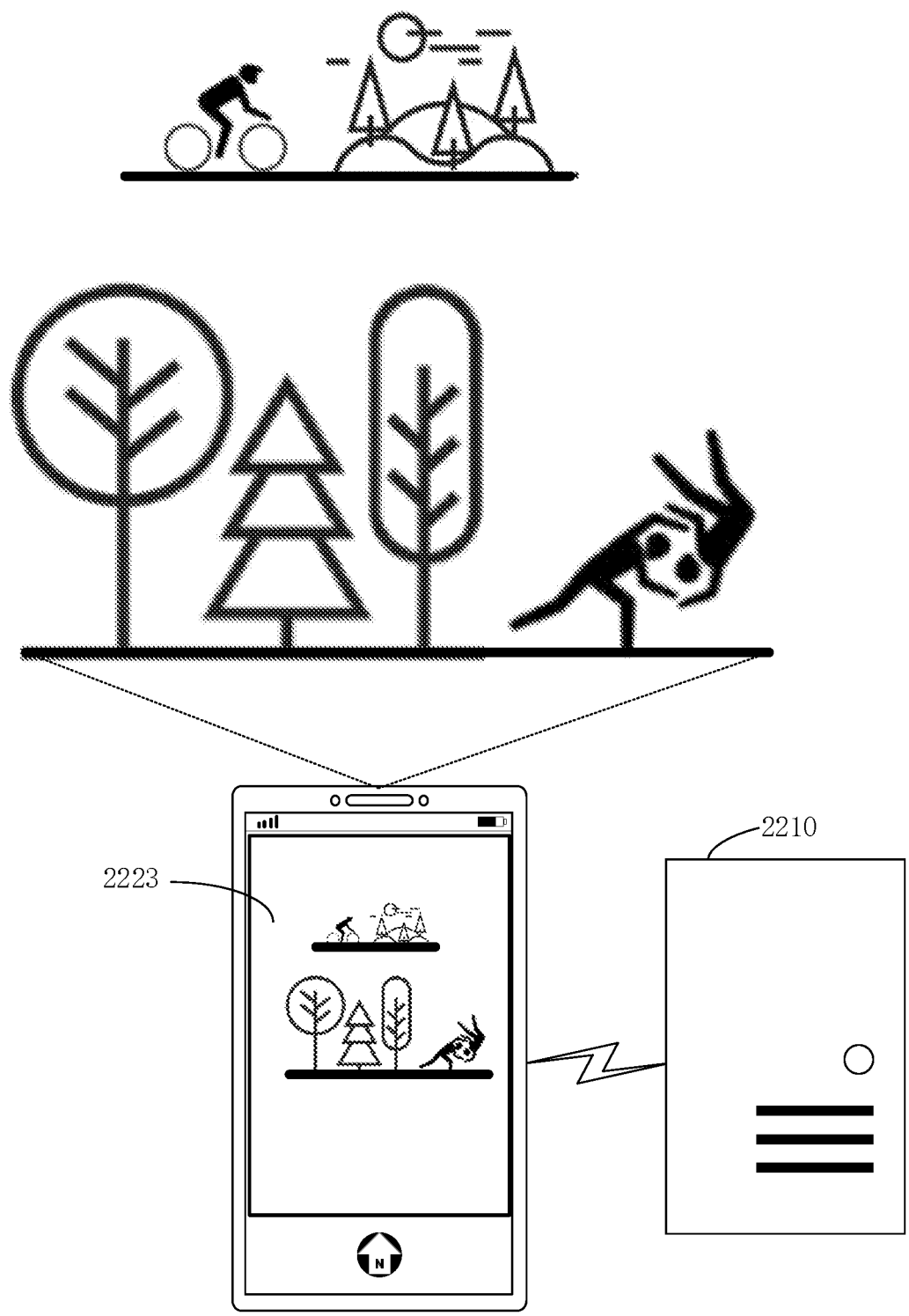
FIG. 25 is a schematic diagram illustrating another exemplary user interface of a mobile phone in a process of extracting visual feature points of an image according to some embodiments of the present disclosure.

Referring to FIG. 23-FIG. 25, FIG. 23 is a flowchart illustrating an exemplary method for extracting visual feature points of an image according to some embodiments of the present disclosure. FIG. 24 is a schematic diagram illustrating an exemplary user interface of a mobile phone in a process of extracting visual feature points of an image according to some embodiments of the present disclosure. FIG. 25 is a schematic diagram illustrating another exemplary user interface of a mobile phone in a process of extracting visual feature points of an image according to some embodiments of the present disclosure. The method may be applied to the aforementioned electronic device (e.g., a server), which may include the following operations.

In S2310, a plurality of blocks may be obtained by performing an image division on a visual positioning image, and there is an overlapping area between the plurality of blocks.

In some possible embodiments, based on the mobile phone and the server shown in FIG. 22, and combining the application scenario of "a user performs an AR navigation by an electronic device, such as a mobile phone", as shown in FIG. 24, a screen display system of the mobile phone displays a current interface 2221 which is a main interface of the mobile phone. The main interface shows a plurality of application programs, such as "Contacts," "Positioning," "Device," "Notes," "Updates," "Messages", "Call," "Settings," and "Navigation." It should be understood that the interface 2221 may further include other application programs, which is not limited in the present disclosure.

When the user needs to inquire about a route, the AR navigation may be performed by the mobile phone (i.e., the user may implement the AR navigation by operating the mobile phone). At this time, the mobile phone may respond to the user's operation. When the mobile phone detects that the user clicked on an icon of "Navigation" application program on the main interface, it may start the "Navigation" application program and after that, as shown in FIG. 25, the interface 2221 of the mobile phone may display the interface 2223. Meanwhile, the mobile phone may turn on a camera, and capture an image of an environment the camera is facing, and display the image of the environment on the screen.

Figure 26:
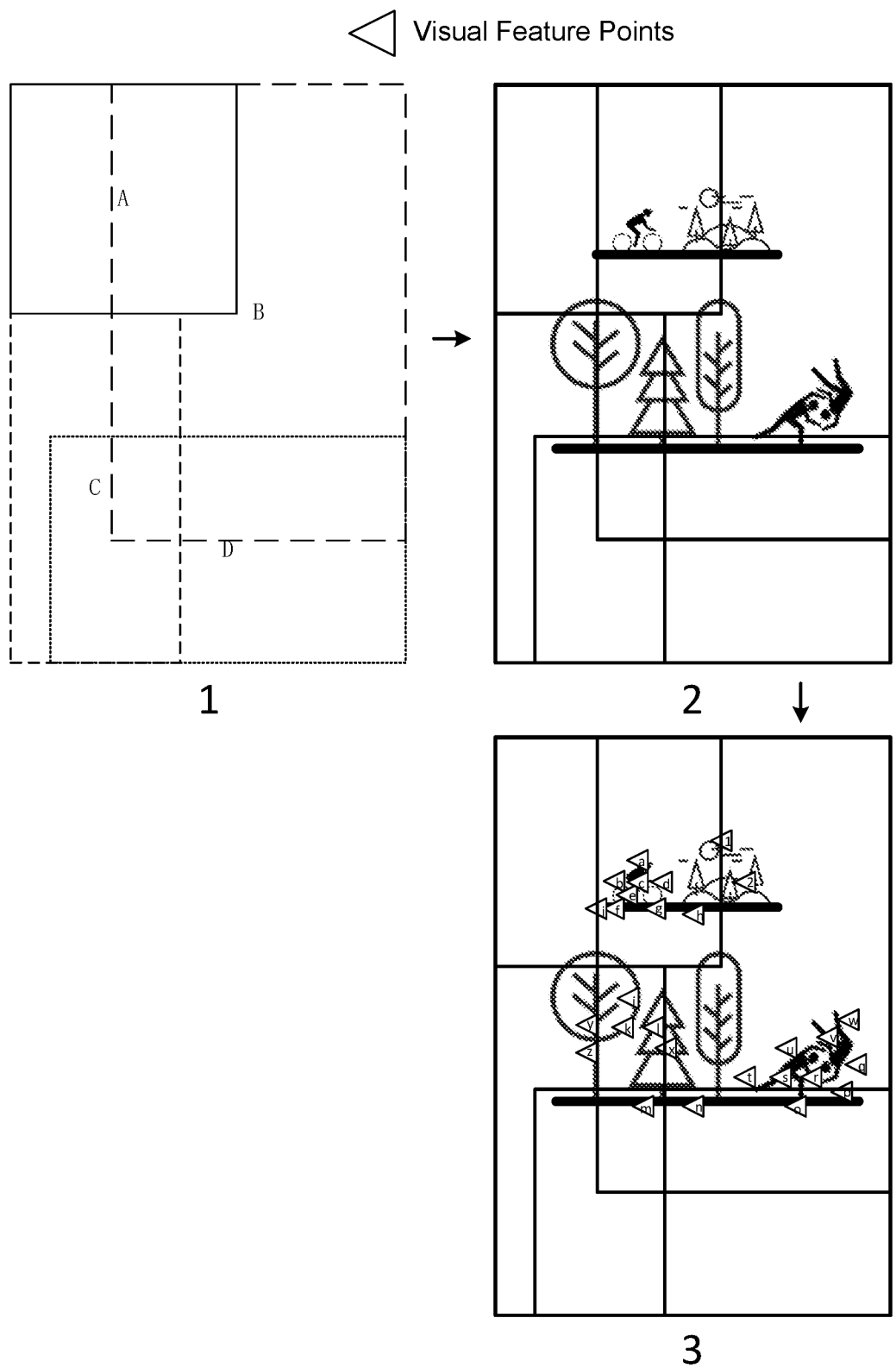
FIG. 26 is a schematic diagram for extracting visual feature points of an image according to some embodiments of the present disclosure.

After the mobile phone obtains the image, the image may be used as a visual positioning image, which may be sent to the server through a network, and the server may perform an image division on the visual positioning image to obtain a plurality of blocks. For example, FIG. 26 is a schematic diagram for extracting visual feature points of an image according to some embodiments of the present disclosure. As shown in FIG. 26, after the visual positioning image sent by the mobile phone is obtained, the server may first perform the image division to the visual positioning image according to a dividing way shown in 1 to obtain the plurality of blocks (i.e., the plurality of image blocks) shown in 2. Four blocks A, B, C, and D may be obtained according to the dividing way shown in 1. The block A is an area enclosed by solid lines, and blocks B, C and D are areas enclosed by dotted lines with different densities. An overlapping relation of the four blocks is that the block A has an overlapping area with the block B, the block B has overlapping areas with the blocks A and D, the block D has overlapping areas with the block blocks B and C, the block C has overlapping areas with the blocks D and B. The server may obtain four blocks (A', B', C', D', which are not shown in FIG. 26) corresponding to the four blocks after the image division may be performed to the visual positioning image.

It should be noted that the server may divide the visual positioning image according to the division method shown in FIG. 26, or according to the actual application scenario, as long as ensuring that there is at least one overlapping area between the plurality of blocks, which is not limited in the present disclosure. Further, the above "there is an overlapping area between the plurality of blocks" may be understood as that there is at least one overlapping area between the plurality of blocks. That is, two specific blocks in the plurality of blocks may not overlap.

In some embodiments, image division may be performed based on a count of features of the visual positioning image. For example, the more the count of features of the visual positioning image is, the more blocks the image may be divided into. The count of blocks may be determined according to the count of features, which is not limited in the present disclosure.

What needs to be added is that after the image of the environment is obtained, the mobile phone may directly take it as the visual positioning image, and extracting visual feature points of the visual positioning image. It may be further understood that the present disclosure makes no limitation on the specific type of electronic device to which the method provided is applied.

It should be understood that before operation S2310 is performed, the method provided by the present disclosure further may include obtaining the visual positioning image, which may be the data for representing an image or a video (i.e., data of a plurality of images), which is not limited in the present disclosure.

In S2320, a feature point set corresponding to each of the plurality of blocks may be obtained by performing a visual feature extraction on the plurality of blocks.

In some possible embodiments, continue to refer to FIG. 26, after a plurality of blocks (i.e., the plurality of blocks as shown in 2) are obtained by performing the image division on the visual positioning image, the server may further perform visual feature extraction to each block to obtain the visual feature points as shown in 3, wherein common feature points a-m may be understood as feature points with same coordinate parameters. Specifically, among blocks A', B', C', and D', the feature point set corresponding to the block A' includes 9 feature points, wherein feature points a-i are the common feature points in the overlapping area between the block A' and the block B The feature point set corresponding to block B' includes 25 feature points, wherein feature points a-i are the common feature points in the overlapping area between the block A' and the block B', feature points j-m are the common feature points in the overlapping area between the block B' and the block C', and feature points m-o are the common feature points in the overlapping area between the block B' and the block D'. The feature point set corresponding to block C' includes 6 feature points, wherein feature point m is the common feature point in the overlapping area between the block C' and the block D'. The feature point set corresponding to block D' includes 3 feature points, wherein feature points m-o are the common feature points in the overlapping area between the block D' and the block B', feature point m is the common feature point in the overlapping area between the block D' and the block C'. It may be understood that the common feature points described above are actually repeatedly extracted feature points.

It should be noted that the visual feature extraction method may be an ORB extraction method, a SIFT extraction method, a SIFTGPU extraction method, etc.

It should be understood that as there are overlapping areas between the plurality of blocks, the feature points with the same coordinate parameters in the overlapping area of two overlapping blocks may be repeatedly extracted. When a feature point in the overlapping area of one of the two overlapping blocks is located at or near the boundary of the block, the feature point is not actually located at or near the boundary of the other of the two overlapping blocks, that is, there is always a feature point which is not near the boundary of the block among the feature points with the same coordinate parameters.

In some embodiments, different extraction parameters (e.g., a gradient) may be used to extract feature points in different blocks. In some embodiments, a low standard extraction parameter (e.g., a small gradient) may be used to the blocks with fewer features in the image to extract more feature points. In some embodiments, a high standard extraction parameter (e.g., a great gradient) may be used to the blocks with more features in the image to extract fewer feature points.

In S2330, the feature points with the same coordinate parameters in the overlapping area may be combined, and a total feature point set corresponding to the visual positioning image may be determined according to the plurality of feature point set corresponding to the plurality of blocks.

In some possible embodiments, refer to FIG. 26, as there are repeatedly extracted feature points in the overlapping area (e.g., the feature point sets corresponding to block A' and block B' both includes the feature points a-i), after the feature point set corresponding to each block is obtained, the server may further combine the feature points with the same coordinate parameters in the overlapping area. Taking combining the feature points with the same coordinate parameters (i.e., the common feature points) in the overlapping area between the block A' and the block B' as an example, the server may randomly keep one of the feature point a in the feature point set corresponding to the block A' and the feature point a in the feature point set corresponding to the block B', which means randomly keep one of the feature points with the same coordinate parameters so as to combine the feature points with the same coordinate parameters in the overlapping area.

After the feature points with the same coordinate parameters are combined in the overlapping area, the server may combine combined four feature point sets corresponding to the blocks A' to D' to form a feature point set as the total feature point set corresponding to the visual positioning image.

In some possible embodiments, after the server determines the total feature point set, visual positioning points of the image may be determined according to the total feature point set, and azimuth identification data corresponding to user's demands may be determined according to the visual positioning points, so as to efficiently complete the visual positioning task. Then, the azimuth identification data may be sent to the mobile phone to support the mobile phone to perform the AR navigation, and the mobile phone may display a corresponding route indication on the screen according to the azimuth identification data, so as to satisfy the user's request for the route and achieve the AR navigation by the user operating the mobile phone. For example, FIG. 27 is a schematic diagram illustrating an exemplary user interface of a mobile phone in a process of extracting visual feature points of an image according to some embodiments of the present disclosure. As shown in FIG. 27, the mobile phone may display "navigation information: go straight for 30 meters and get to the destination" on the screen according to the azimuth identification data.

It should be understood that as there are overlapping areas between the plurality of blocks, feature points with the same coordinate parameters in the overlapping area of two overlapped areas may be repeatedly extracted and among the feature points with the same coordinate parameters, there is always a feature point which is not near the boundary of the blocks. So, through combining the feature points with the same coordinate parameters in the overlapping area, correct extraction of features in a preset range near the feature points may be implemented, and further, the overlapping area in the plurality of blocks may ensure that the visual feature points near division lines of two blocks may be correctly extracted. Therefore, the present disclosure may enhance the accuracy of the extraction of the visual feature points.

Further, based on FIG. 23, the following provides a possible implementation way of the whole solution. Referring to FIG. 28, FIG. 28 is a flowchart illustrating an exemplary dialogue data processing method for multiple dialogues according to some embodiments of the present disclosure.

On how to perform the image division to the visual positioning image to further enhance the accuracy of the extraction of visual feature points, the operation S2310 may include the following operations.

In S2311, a plurality of blocks may be obtained by performing an image division on a visual positioning image, the plurality of blocks having an overlapping area, wherein there is an overlapping area between each two adjacent blocks.

Figure 30:
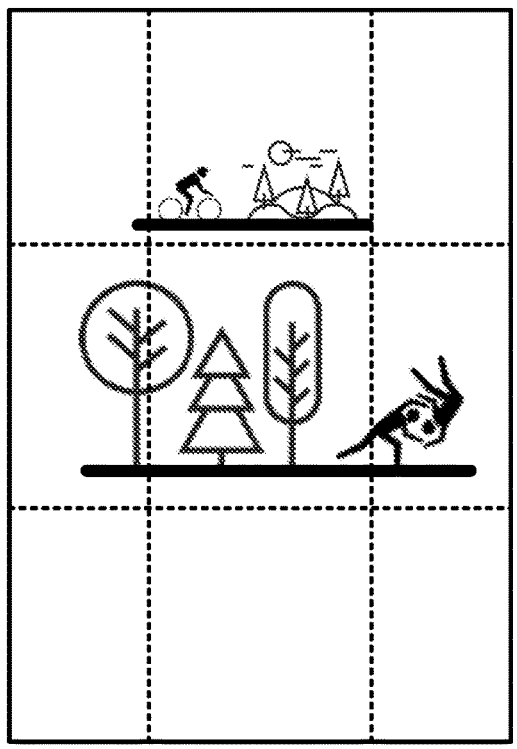
FIG. 30 is another schematic diagram for extracting visual feature points of an image according to some embodiments of the present disclosure.

In some possible embodiments, referring to FIG. 29 and FIG. 30, FIG. 29 is a schematic diagram for extracting visual feature points of an image according to some embodiments of the present disclosure. FIG. 30 is another schematic diagram for extracting visual feature points of an image according to some embodiments of the present disclosure. As shown in FIG. 29, based on the visual positioning image in the application scenario shown in FIG. 25, the server may respectively divide the visual positioning image according to the blocks (1 to 4) as shown in 1, 2, 3, 4 into a plurality of blocks (1 to 4) as shown in FIG. 30, wherein the block 1 is adjacent to blocks 2 and 3, and there are overlapping areas between the block 1 and the blocks 2 and 3; the block 2 is adjacent to the blocks 1 and 4, and there is are overlapping areas between the block 2 and the blocks 1 and 4; the block 3 is adjacent to the blocks 1 and 4, and there are overlapping areas between the block 3 and the blocks 1 and 4; the block 4 is adjacent to the blocks 2 and 3, and there are overlapping areas between the block 4 and the blocks 2 and 3. That is, there is an overlapping area between each two adjacent blocks among the blocks as shown in FIG. 30.

As there is an overlapping area between each two adjacent blocks, any feature point near or at the boundary of the blocks always may have a corresponding feature point with the same coordinate parameters that is not near the boundary of the blocks, which may avoid a situation that the visual feature points near the division lines of the image are incorrectly matched or fail to match because the features within the preset range near the visual feature points are not extracted, thereby improving the accuracy of the extraction of the visual feature points.

Further, to reasonably perform the image division to the visual positioning image, the size of each block obtained by the server performing the image division on the visual positioning image may be M×N, the size of the overlapping area may be m×n, and m×n=γM×γN, wherein γ is a preset coefficient smaller than 1 and greater than 0. Alternatively, a range of γ may be ⅕ to ½, i.e., 0.2 to 0.5. In some embodiments, the size of each block may be M×N, the size of the overlapping area may be m×n, and m×n=ρM×γN, ρ and γ are preset coefficients smaller than 1 and greater than 0. Alternatively, ρ and γ may be any value between 0.2 and 0.5.

What needs to be added is that the count of the plurality of blocks described above may be N1×N2, wherein ranges of N1 and N2 may be 3 to 8, and N1, N2 may not be equal. In some embodiments, the ranges of N1 and N2 may be any value other than 3 to 8, and may be adjusted according to different situations, which is not limited in the present disclosure.

In some embodiments, the processing device may divide the image based on other methods. In some embodiments, the processing device may divide the image into a plurality of triangles. In some embodiments, the processing device may divide the image into a plurality of diamonds. In some embodiments, the processing device may divide the image into a plurality of circles. In some embodiments, the processing device may take a variety of forms of divisions on the image, and the divided images may include, but are not limited to, triangles, diamonds, circles, etc.

It should be understood that the above parameters are all reasonable values obtained by the inventor through experiments. By the setting of above parameters reasonably, the visual positioning image can be reasonably divided and the accuracy and efficiency of the extraction of the visual feature points may be enhanced.

In addition, in the process of implementing the technical solution of the embodiments of the present disclosure, the inventor of the present disclosure also discovered the following problems.

In actual application scenarios, there are usually a large count of invalid feature areas (e.g., pedestrians, dynamic objects, etc.) in the image. When textures of these areas are relatively abundant, the visual features points extracted by existing extraction technique focus on these areas. As shown in FIG. 21, when visual feature points of the image shown in 3 are extracted using a visual feature point extraction algorithm such as a SIFT or an ORB etc., a usual distribution of the extracted visual feature points is shown in 3, the visual feature points in the image shown in 3 concentrate on dynamic objects such as pedestrians, and didn't perfectly represent total features of the image.

Therefore, in the process of extracting visual feature points of the image using existing extraction techniques to complete the visual positioning tasks, the extracted visual feature points often are concentrates on invalid feature areas such as pedestrians, dynamic objects, etc., which may lead to mass mismatches or match failures, and cause sharp decrease on the accuracy of visual positioning, or even positioning failure.

Therefore, to make up the above defects, the visual positioning method provided by the embodiments of the present disclosure may further improve the accuracy of the extraction of visual feature points. It should be noted that the above problems of the existing technique solutions are obtained through practice and detailed study by the inventor. Therefore, the process of finding the above defects and the solutions proposed focusing on the above problems as follows in the embodiments of the present disclosure shall both be regarded as the contributions made to the present disclosure in the process of the present disclosure by the inventor.

On the basis of FIG. 23, in order to solve the technic problems that the visual feature points of images extracted by existing extraction techniques often are concentrates on invalid feature areas such as pedestrians, dynamic objects, etc., referring to FIG. 31, FIG. 31 is a flowchart illustrating an exemplary method for extracting visual feature points of an image according to some embodiments of the present disclosure. As shown in FIG. 31, the operation S2320 may include the following operations. The feature point set corresponding to each block may be obtained by performing the visual feature extraction to each block in parallel. The count of feature points of the feature point set corresponding to each block may be within the preset range.

In some possible embodiments, to improve the speed of the extraction of visual feature points of the visual positioning image, after a plurality of blocks are obtained by performing the image division on the visual positioning image, the server may further perform the visual feature extraction to each block in parallel to obtain the feature point set corresponding to each block, the count of feature points in the feature point set may be within the preset range.

It should be understood that as the visual feature extraction is performed to each block in parallel, the present disclosure may also increase the speed of the extraction of visual feature points and improve the efficiency of the extraction of visual feature points. As the count of feature points in the feature point set corresponding to each block is within the preset range, that is, the count of feature points in the feature points set of each block is similar, the distribution of feature points in the whole visual positioning image may be quite even, and the situation of the extracted visual feature points often concentrating on invalid feature areas such as pedestrians, dynamic objects, etc. may be avoided. Therefore, the total feature point set extracted in the present disclosure may represent the total features of the image and the accuracy of the extraction of visual feature points may be further improved.

Further, on the basis of FIG. 31, referring to FIG. 32, FIG. 32 is a flowchart illustrating an exemplary method for extracting visual feature points of an image according to some embodiments of the present disclosure. As shown in FIG. 32, to perform a visual feature extraction to each block in parallel and obtain the feature point set corresponding to each block, the operation S2321 may include the following operations.

In S2321-1, an extracted feature point set corresponding to each block may be obtained by performing a visual feature extraction on each block in parallel, and the count of feature points in the extracted feature point set may be greater than or equal to the preset value.

In some possible embodiments, if the preset value is 250, then the server may extract at least 250 feature points as the extracted feature point set corresponding to the block when the visual feature extraction is performed on each block in parallel.

In S2321-2, a feature point set may be determined from the extracted feature point set, and the count of feature points of the feature point set may be within the preset range.

In some possible embodiments, if the preset range is 125±5, after the extracted feature point set corresponding to each block is obtained, taking determining the feature point set from the extracted feature point set corresponding to one block as an example, the server may extract 125 feature points from the extracted feature point set as the feature point set.

What needs to be specified is that the above preset range may be simplified into a preset value (e.g., 125).

Further, each feature point corresponds to a feature parameter, the determining of the feature point set from the extracted feature point set may include determining q (corresponding to the fifth count in FIG. 20) feature points from the extracted feature point set as the feature point set according to the feature parameters of the feature points, wherein the feature parameters include one or both of a response value and a scale parameter.

When the parameters include the response value, in some embodiments, the determining of q feature points from the extracted feature point set as the feature point set according to the feature parameters of the feature points may include determining a set of the first q feature points in the extracted feature point set as the feature point set according to the response value in descending order. For example, if the preset range is 125±5 and the extracted feature point set extracted from a block A includes 250 feature points, the 250 feature points may be arranged in order according to their response value in descending order and the first 125 feature points may be determined as the feature point set.

When the feature parameters include the scale parameter, in some embodiments, the determining of q feature points from the extracted feature point set as the feature point set according to the feature parameters of the feature points may include determining a set of the first q feature points in the extracted feature point set as the feature point set according to the scale parameter in descending order. For example, if the preset range is 125±5 and the extracted feature point set extracted from a block A includes 250 feature points, the 250 feature points may be arranged in order according to their scale parameter in descending order and the first 125 feature points may be determined as the feature point set.

When the feature parameters include both response value and scale parameter, in some embodiments, the determining of q feature points from the extracted feature point set as the feature point set according to the feature parameter of the feature points may include determining a set of the first q feature points in the extracted feature point set as the feature point set according to the response value in descending order, then determining a set of the first q2 feature points in the first q1 feature point set as the feature point set according to the scale parameter in descending order, wherein q1 is greater than q2, q2 is within the preset range. For example, if the preset range is 125±5 and the extracted feature point set extracted from block A includes 250 feature points, the 250 feature points may be arranged in order according to their response value in descending order, then the first 200 feature points may be obtained. The 200 feature points may be arranged in order according to their scale parameter in descending order, and the first 125 feature points may be determined as the feature point set.

In some embodiments, the feature parameters may also include a pixel value, a brightness value, a contrast value, etc. In some embodiments, the q feature points may be determined from the extracted feature point set as the feature point set according to the pixel value, the brightness value, or the contrast value of the feature point. The method of determining the feature point set according to the pixel value, the brightness value, or the contrast value of the feature point may be similar to the method of determining the feature point set according to the response value and the scale parameter, which is not be repeated in the present disclosure.

Based on the above possible embodiments, it may be understood that the present disclosure makes no limitation on the specific form of determining q feature points from the extracted feature point set as the feature point set according to their feature parameters. In the real application scenarios, q feature points may be determined from the extracted feature point set as the feature point set according to their feature parameters using different implement ways according to real demands.

Alternatively, if the count of the plurality of blocks is N1×N2, and the count of feature points needs to be extracted in one visual positioning image is Q, then the count of visual feature points need to be extracted for each block may be Q/(N1×N2), and the preset value may be α×Q/(N1×N2), wherein the range of a may be 1.0 to 2.0, the range of Q may be 500 to 4000. It should be understood that the above parameters are all reasonable values obtained by the inventor through experiments. By the setting of above parameters reasonably, the visual positioning image can be reasonably divided and the accuracy and efficiency of the extraction of the visual feature points may be improved. In some embodiments, the range of a may be less than 1.0 or greater than 2.0, and the range of Q may be less than 500 or greater than 4000, and which is not limited in the present disclosure.

To combine the feature points with the same coordinate parameters in the overlapping area and determine the total feature point set corresponding to the visual positioning image according to the plurality of feature point sets corresponding to the plurality of blocks, if each feature point corresponds to a scale parameter, when there are a plurality of feature points with the same coordinate parameters on the plurality of feature point sets, the operation S2330 may include the following operations.

In S2331, the feature points with smaller scale parameters in a plurality of feature points with the same coordinate parameters may be deleted.

Figure 33:
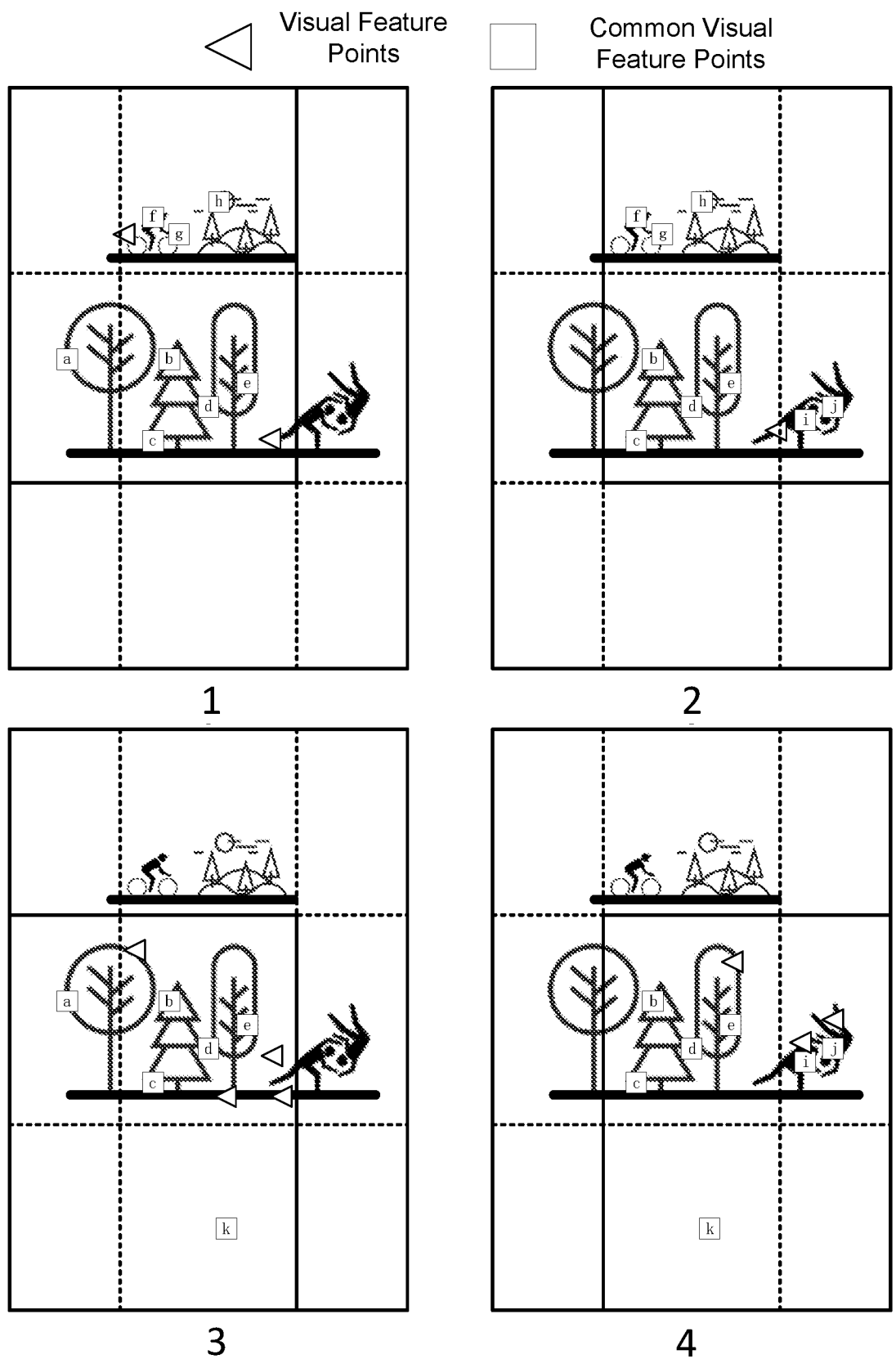
FIG. 33 is a schematic diagram for extracting visual feature points of an image according to some embodiments of the present disclosure.

In some possible embodiments, referring to FIG. 33, FIG. 33 is a schematic diagram for extracting visual feature points of an image according to some embodiments of the present disclosure. As shown in FIG. 33, blocks shown in 1 include feature points a to h (i.e., common visual feature point), blocks shown in 2 include feature points b to j, blocks shown in 3 include feature points a to e, and k, blocks shown in 4 include feature points b to e, l, and j. That is, when the server performs visual feature extraction to each block, there are feature points with the same coordinate parameters in the plurality of feature point sets. For example, the feature point a included in a block shown in 1 and the feature point a included in a block shown in 3 have the same coordinate parameters. It should be understood that the feature point a shown in 1 and the feature point a shown in 3 only share the same coordinate parameters.

Taking deleting the one with a smaller scale parameter between the feature point a included in the block shown in 1 and the feature point a included in the block shown in 3 as an example, the feature point with the smaller scale parameter may be deleted and the other may be kept. In some embodiments, the deleting of feature points with the smaller scale parameters may include deleting feature points whose scale parameter orders are greater than a threshold (e.g., 1) among the plurality of feature points with the same coordinate parameters in the feature point sets. By deleting the feature points whose scale parameter orders are greater than 1, the remaining feature points other than the feature points whose scale parameter orders are greater than 1 may be determined as the feature points under the coordinate parameters. In some embodiments, if the coordinate parameters of the same feature points are the same, one feature point may be randomly deleted.

In S2332, a plurality of deleted feature point sets may be combined as a total feature point set.

In some possible embodiments, after the feature points with smaller scale parameters among the plurality of feature points with the same coordinate parameters may be deleted, or one of feature points with the same scale parameter among the plurality of feature points with the same coordinate parameters may be randomly kept (i.e., other feature points with the same scale parameter may be randomly deleted), it may be understood that in the plurality of deleted feature point sets, there is now only one feature point for one coordinate parameter, and all the feature points in the plurality of deleted feature point sets may further be determined directly as the total feature point set.

It should be understood that the present disclosure obtains the extracted feature point set corresponding to each block by performing visual feature extraction to each block in parallel, and the counts of feature points in the feature point set in each block are similar, so that the feature points are distributed quite evenly on the whole visual positioning image, thereby avoiding the problem that the extracted visual feature points often concentrate on invalid feature areas such as pedestrians, dynamic objects, etc. Further, through combining the feature points with the same coordinate parameters in the overlapping area, the present disclosure may perform correct extraction to the features in the preset range near the feature point, so that the visual feature points near the dividing lines of two overlapping blocks may be correctly extracted, which makes the present disclosure greatly improve the accuracy and efficiency of the extraction of visual feature points.

Figure 34:
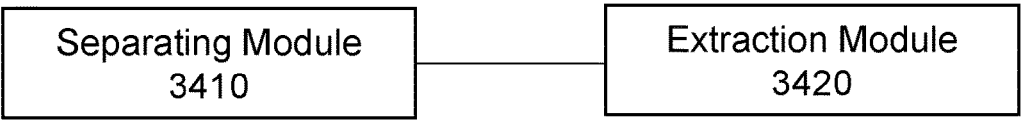
FIG. 34 is schematic diagram illustrating an exemplary device for extracting visual feature points of an image according to some embodiments of the present disclosure.

In order to perform the above-described embodiments and corresponding operations in each possible way, an implementation 2311 of a device for extracting visual feature points of an image is described as below. Referring to FIG. 34, FIG. 34 is a schematic diagram illustrating an exemplary device for extracting visual feature points of an image according to some embodiments of the present disclosure. What needs to be specified is that the basic principle and the technic effects of the device 3400 for extracting visual feature points of an image are the same with the above embodiments, for brief description, for those not mentioned in the present embodiment, refer to the corresponding contents of the above embodiments. The device 3400 for extracting visual feature points of an image may include a separating module 3410 and an extraction module 3420.

Alternatively, the modules may be stored in a memory or fixed in an operating system (OS) in a form of software or firmware, and may be executed by a processor in an electronic device. At the same time, the data required for the modules, the code of programs, etc. may be stored in the memory.

The separating module 3410 may be configured to support the electronic device to execute the operations S2310, S2311, etc., and/or other processes for the techniques described herein.

The extraction module 320 may be configured to support the electronic device to execute the operations S2320, S2330, S2321, S2321-1, S2321-2, S2331, S2332, etc., and/or other processes for the techniques described herein.

What needs to be specified is that all related contents of the various operations involved in the above method embodiments may be quoted to the functional description of the corresponding function module, and will not be described herein.

Figure 35:
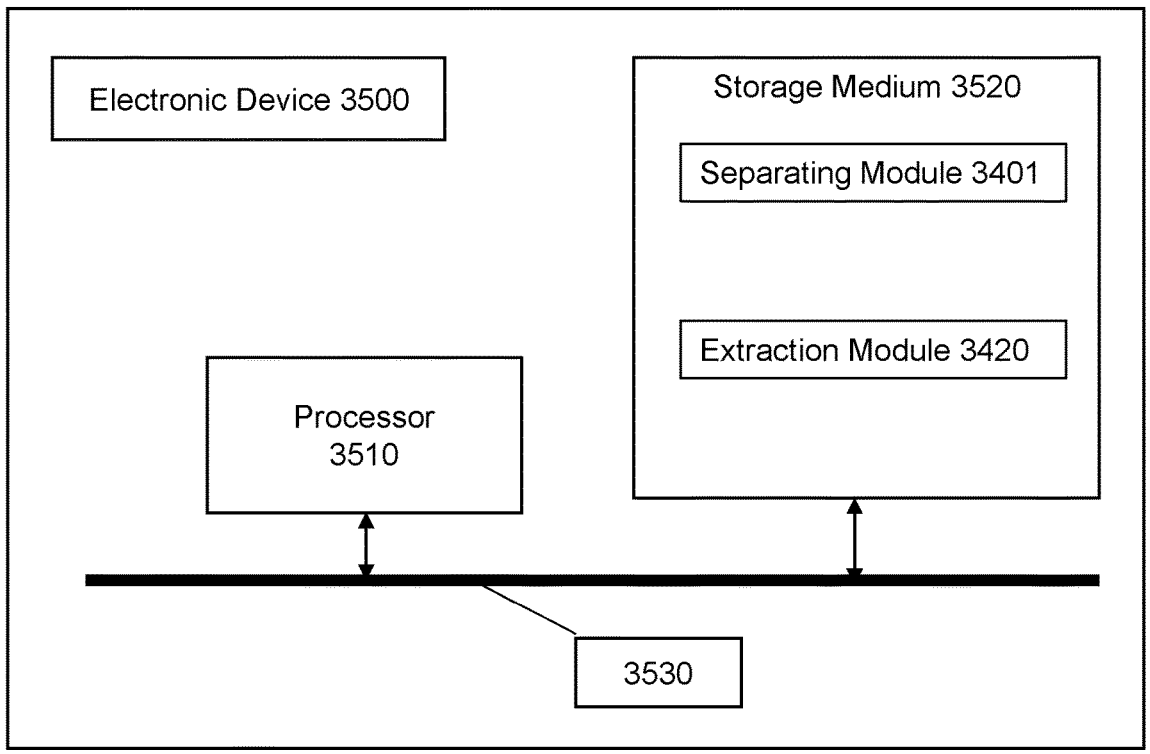
FIG. 35 is a schematic diagram illustrating an exemplary electronic device 3500 according to some embodiments of the present disclosure.

Based on the above method embodiments, the embodiments of the present disclosure further provide an electronic device 3500. FIG. 35 is a schematic diagram illustrating an exemplary electronic device 3500 according to some embodiments of the present disclosure. As shown in FIG. 35, the electronic device 3500 may include a processor 3510, a storage medium 3520, and a bus 3530. The storage medium 3520 may be used to store one or more computer programs including instructions (e.g., the execution instructions corresponding to the separating module 3410 and the extraction module 3420 in the device 3400 in FIG. 34, etc.). When the electronic device 3500 operates, the processor 3510 and the storage medium 3520 may communicate via the bus 3530. By operating the instructions stored in the storage medium 3520, the processor 3510 may enable the electronic device 3500 to perform the extraction of visual feature points of the image and various functional application and data processing provided by some embodiments of the present disclosure. It should be understood that the electronic device 3500 is an electronic device that may implement the visual positioning system 100 in FIG. 1.

Based on the method embodiments, the embodiments of the present disclosure further provide a computer-readable storage medium storing computer programs. When the computer programs are operated by the processor, the operations of the extraction of the visual feature points of the image may be executed.

Specifically, the storage medium may be a general storage medium, such as a removable disk, a hard disk, etc. When the computer programs on the storage medium is operated, the extraction of the visual feature points of the image may be executed, so as to solve the technical problem of improving the accuracy of the extraction of visual feature points, which is waiting to be solved, and further improve the accuracy of visual positioning.

In summary, the embodiments of the present disclosure provide a method and a related device for extracting visual feature points of an image and a related device. The method may include obtaining a plurality of blocks by performing image division on the visual positioning image, wherein there is at least one overlapping area between the plurality of blocks; obtaining a feature point set corresponding to each block by performing a visual feature extraction to each block; combining the feature points with the same coordinate parameters in the overlapping area, and determining a total feature point set corresponding to the visual positioning image according to the plurality of feature point sets corresponding to the plurality of blocks. As there is at least one overlapping area between the plurality of blocks, the feature points with the same coordinate parameters may be repeatedly extracted in the overlapping area of two overlapping blocks, while in the feature points with the same coordinate parameters, there is always a feature point which is not near the boundaries of blocks. By combining the feature points with the same coordinate parameters in the overlapping area, the feature points near division lines of two overlapping blocks may be correctly extracted. Therefore, the present disclosure may improve the accuracy of the extraction of visual feature points.

The benefits of the present disclosure may include, but are not limited to: (1) that the search range of the 3D point cloud map may be narrowed in the positioning process by one or more restricting conditions, so that the time needed for positioning is shortened and the calculating resource is saved; (2) that by simultaneously extracting feature points with semantic annotations and feature point pairs without semantic annotations in the image, it may avoid that algorithms focus only on the feature points with semantic annotations, which may cause errors in the result obtained using the random sampling consensus algorithm; (3) that the feature points at the edges of the blocks may be extracted correctly by dividing the image into the plurality of blocks with overlapping areas. What needs to be specified is that the beneficial effects generated in different embodiments may be different, in different embodiments, the beneficial effects generated may be any one or more of the above, or any other beneficial effect may be obtained as well.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±1%, ±5%, ±10%, or ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A visual positioning system, comprising:
   at least one storage medium including a set of instructions for visual positioning;
   at least one processor configured to communicate with the at least one storage medium, wherein when executing the set of instructions, the at least one processor is configured to direct the system to:
   obtain a positioning image collected by an imaging device;
   obtain a three-dimensional (3D) point cloud map associated with an area where the imaging device is located;
   determine, based on the positioning image, a target area associated with the positioning image from the 3D point cloud map; and
   determine, based on the positioning image and the target area, positioning information of the imaging device, wherein to determine, based on the positioning image and the target area, positioning information of the imaging device, the at least one processor is configured to direct the system to:
extract at least one visual feature point in the positioning image;
match the at least one visual feature point with feature points in the target area to obtain at least one feature point pair, the at least one feature point pair including at least one of at least one feature point pair with a semantic annotation or at least one feature point pair without a semantic annotation; and
calculate, based on the at least one feature point pair, the positioning information of the imaging device.

2. The system of claim 1, wherein to determine, based on the positioning image, a target area associated with the positioning image from the 3D point cloud map, the at least one processor is configured to direct the system to:
determine, based on the positioning image, one or more restricting conditions associated with a range of the target area; and
determine, based on the one or more restricting conditions, the target area from the 3D point cloud map, wherein the one or more restricting conditions are related to at least one of a scene corresponding to the positioning image, an initial estimated position of the imaging device, or azimuth information of the imaging device.

3. The system of claim 2, wherein to determine, based on the one or more restricting conditions, the target area from the 3D point cloud map, the at least one processor is configured to direct the system to:
obtain a first area that matches the scene corresponding to the positioning image in the 3D point cloud map by performing a scene recognition for the positioning image; and
determine, based on the first area, the target area.

4. The system of claim 3, wherein to determine, based on the first area, the target area, the at least one processor is configured to direct the system to:
obtain the initial estimated position of the imaging device by a positioning module associated with the imaging device;
determine, based on the initial estimated position of the imaging device, a second area from the first area, the second area being an area in the first area that is within a distance from the initial estimated position; and
determine the target area according to the second area.

5. The system of claim 4, wherein to determine the target area according to the second area, the at least one processor is configured to direct the system to:
obtain a moving direction of the imaging device;
determine, based on the moving direction, the azimuth information of the imaging device, the azimuth information including an angular range of the moving direction; and
determine, based on the angular range, a third area within the angular range from the second area; and
designate the third area as the target area.

6. The system of claim 3, wherein to obtain a first area that matches the scene corresponding to the positioning image in the 3D point cloud map by performing a scene recognition for the positioning image, the at least one processor is configured to direct the system to:
obtain a plurality of reconstructed images for reconstructing the 3D point cloud map, each of the plurality of reconstructed images corresponding to a scene area; and
determine, from the plurality of scene areas, the first area according to similarities between the positioning image and the reconstructed images.

7. The system of claim 3, wherein to obtain a first area that matches the scene corresponding to the positioning image in the 3D point cloud map by performing a scene recognition for the positioning image, the at least one processor is configured to direct the system to:
obtain the first area by processing the positioning image and the 3D point cloud map using a scene recognition model, the scene recognition model being obtained through training.

8. The system of claim 1, wherein the 3D point cloud map includes a semantic 3D point cloud map, and to obtain the semantic 3D point cloud map, the at least one processor is configured to direct the system to:
obtain a trained neural network model;
obtain one or more images that are not labeled with reference objects;
input the one or more images that are not labeled with reference objects to the trained neural network model to obtain one or more images labeled with reference objects; and
determine, based on the one or more images labeled with reference objects, the semantic 3D point cloud map, wherein the trained neural network model is obtained by training a plurality of groups of training samples, and each group of the plurality of groups of training samples includes one or more sample images that are not labeled with reference objects and training labels including sample images labeled with reference objects.

9. The system of claim 1, wherein the 3D point cloud map includes a semantic 3D point cloud map, and to obtain the semantic 3D point cloud map, the at least one processor is configured to direct the system to:
obtain a plurality of images including one or more images labeled with reference objects and one or more images that are not labeled with reference objects;
extract visual feature points in the one or more images that are not labeled with reference objects, the visual feature points being associated with the reference objects in the images labeled with reference objects; and
obtain, based on the visual feature points in the one or more images that are not labeled with reference objects, the one or more images labeled with reference objects by labeling the images that are not labeled with the reference objects;
determine, based on the plurality of images labeled with reference objects, the semantic 3D point cloud map.

10. The system of claim 1, wherein to calculate, based on the at least one feature point pair, the positioning information of the imaging device, the at least one processor is configured to direct the system to:
obtain a first count of feature point pairs from the at least one feature point pair to form a solution set, the solution set including feature point pairs without semantic annotations;
perform at least one iterative calculation on the solution set using a random sampling consensus algorithm to obtain a pose and a count of interior points corresponding to each iterative calculation, wherein an interior point represents a visual feature point whose reprojection value between the visual feature point and a feature point corresponding to the visual feature point in the 3D point cloud map is within a reprojection deviation; and determine the positioning information of the imaging device according to the pose and the count of interior points.

11. The system of claim 10, wherein the solution set further includes feature point pairs with semantic annotations, and to obtain a first count of feature point pairs from the at least one feature point pair to form a solution set, the at least one processor is configured to direct the system to:
  determine whether a count of feature point pairs with semantic annotations in the at least one feature point pair is greater than or equal to a threshold count;
  in response to determining that the count of feature point pairs with semantic annotations in the at least one feature point pair is greater than or equal to the threshold count, obtain a second count of feature point pairs with semantic annotations from the at least one feature point pair, add the second count of feature point pairs with semantic annotations into the solution set, obtain a third count of feature point pairs without semantic annotations, and add the third count of feature point pairs without semantic annotations into the solution set, the second count and the third count being determined according to an attention rate and the first count; or
  in response to determining that the count of feature point pairs with semantic annotations in the at least one feature point pair is less than the threshold count, add all the feature point pairs with semantic annotations in the at least one feature point pair into the solution set, obtain a fourth count of feature point pairs without semantic annotations, and add the fourth count of feature point pairs without semantic annotations into the solution set, the fourth count being a difference between the first count and the count of feature point pairs with semantic annotations in the at least one feature point pair.

12. The system of claim 10, wherein to obtain a first count of feature point pairs from the at least one feature point pair to form a solution set, the at least one processor is configured to direct the system to:
  determine whether a count of the at least one feature point pair is greater than or equal to the first count;
  in response to determining that the count is greater than or equal to the first count, obtain the solution set from the at least one feature point pair; or
  in response to determining that the count is less than the first count, determine that a positioning of the imaging device is failed.

13. The system of claim 10, wherein to determine the positioning information of the imaging device according to the pose and the count of interior points, the at least one processor is configured to direct the system to:
  determine whether a current count of iterative calculations is equal to an iterative count threshold;
  in response to determining that the current count of iterative calculations is equal to the count of the iterative count threshold, determine a pose and a position corresponding to an iterative calculation with the most interior points among the at least one iterative calculation as the positioning information of the imaging device.

14. The system of claim 1, wherein to extract at least one visual feature point in the positioning image, the at least one processor is configured to direct the system to:
  obtain a plurality of blocks by performing an image division on the positioning image, at least two blocks of the plurality of blocks having an overlapping area;
  obtain a feature point set corresponding to each of the plurality of blocks by performing a visual feature extraction on the plurality of blocks, a count of feature points in the feature point set corresponding to each of the plurality of blocks being within a preset range; and
  determine, based on a plurality of feature point sets corresponding to the plurality of blocks, at least one visual feature point in the positioning image.

15. The system of claim 14, wherein a size of each of the plurality of blocks is M×N, a size of the overlapping area is m×n, and m×n=ρM×γN, wherein ρ and γ are preset coefficients less than 1 and greater than 0.

16. The system of claim 14, wherein to obtain a feature point set corresponding to each of the plurality of blocks by performing a visual feature extraction on the plurality of blocks, the at least one processor is configured to direct the system to:
  obtain a plurality of candidate feature point sets corresponding to the plurality of blocks by performing the visual extraction to each of the plurality of blocks, a count of the plurality of candidate feature point sets being greater than or equal to a preset value; and
  determine a fifth count of feature points from the candidate feature point sets as the feature point set according to feature parameters of the feature points, wherein the fifth count is within the preset range, and the feature parameters include one or both of a response value and a scale parameter.

17. The system of claim 14, wherein each feature point corresponds to a scale parameter, to determine, based on a plurality of feature point sets corresponding to the plurality of blocks, at least one visual feature point in the positioning image, the at least one processor is configured to direct the system to:
  delete feature points whose scale parameter orders are greater than a threshold among a plurality of feature point sets with same coordinate parameters in the plurality of feature point sets;
  combine a plurality of deleted feature point sets into a total feature point set; and
  determine the at least one visual feature point from the total feature point set.

* * * * *